(12) United States Patent
Muir et al.

(10) Patent No.: US 12,092,948 B2
(45) Date of Patent: Sep. 17, 2024

(54) LOW PARALLAX IMAGING SYSTEM WITH AN INTERNAL SPACE FRAME

(71) Applicant: Circle Optics, Inc., Rochester, NY (US)

(72) Inventors: Christopher M. Muir, Rochester, NY (US); Andrew F. Kurtz, Macedon, NY (US); Thomas Bidwell, Bergen, NY (US); Adam Inskip, Wingerworth (GB); Karen Leap, Niskayuna, NY (US); Nils Kingston, White River Junction, VT (US)

(73) Assignee: Circle Optics, Inc., Rochester, NY (US)

( * ) Notice: Subject to any disclaimer, the term of this patent is extended or adjusted under 35 U.S.C. 154(b) by 0 days.

(21) Appl. No.: 18/012,162

(22) PCT Filed: Jun. 22, 2021

(86) PCT No.: PCT/US2021/038552
§ 371 (c)(1),
(2) Date: Dec. 21, 2022

(87) PCT Pub. No.: WO2021/262768
PCT Pub. Date: Dec. 30, 2021

(65) Prior Publication Data
US 2023/0236493 A1      Jul. 27, 2023

Related U.S. Application Data

(63) Continuation of application No. PCT/US2021/017284, filed on Feb. 9, 2021, which is
(Continued)

(51) Int. Cl.
*G03B 37/04* (2021.01)
*G02B 7/00* (2021.01)
(Continued)

(52) U.S. Cl.
CPC ............. *G03B 37/04* (2013.01); *G02B 7/004* (2013.01); *G02B 13/06* (2013.01); *G03B 17/12* (2013.01);
(Continued)

(58) Field of Classification Search
None
See application file for complete search history.

(56) References Cited

U.S. PATENT DOCUMENTS

| 3,524,697 A | 8/1970 | Masaki et al. |
| 4,930,864 A | 6/1990 | Kuster et al. |

(Continued)

FOREIGN PATENT DOCUMENTS

| DE | 102017011352 A1 | 6/2019 |
| WO | WO2020263865 A1 | 12/2020 |

OTHER PUBLICATIONS

International Search Report and Written Opinion for PCT Application No. PCT/US21/38552, mailed Oct. 14, 2021, 11 pages.
(Continued)

*Primary Examiner* — Paul M Berardesca
(74) *Attorney, Agent, or Firm* — Lee & Hayes, P.C.

(57) ABSTRACT

A frame for a low parallax imaging device includes a plurality of interconnected faces configured to mount cameras. The faces are mounted along peripheral edges using kinematic connections. The frame provides a structure on which the mounted cameras provide a combined field of view of up to about 360-degrees with minimal parallax between adjacent cameras.

20 Claims, 31 Drawing Sheets

Related U.S. Application Data a continuation of application No. PCT/US2020/066702, filed on Dec. 22, 2020, which is a continuation of application No. PCT/US2020/039197, filed on Jun. 23, 2020, which is a continuation of application No. PCT/US2020/039200, filed on Jun. 23, 2020, which is a continuation of application No. PCT/US2020/039201, filed on Jun. 23, 2020.

(60) Provisional application No. 63/183,961, filed on May 4, 2021.

(51) Int. Cl.
  *G02B 13/00* (2006.01)
  *G02B 13/06* (2006.01)
  *G03B 17/12* (2021.01)
  *H04N 23/50* (2023.01)
  *H04N 23/55* (2023.01)
  *H04N 23/57* (2023.01)
  *H04N 23/90* (2023.01)
  *G03B 7/00* (2021.01)

(52) U.S. Cl.
  CPC ............. *H04N 23/50* (2023.01); *H04N 23/55* (2023.01); *H04N 23/57* (2023.01); *H04N 23/90* (2023.01); *G02B 13/0095* (2013.01)

(56) References Cited

U.S. PATENT DOCUMENTS

| | | | | |
|---|---|---|---|---|
| 5,023,725 | A | * | 6/1991 | McCutchen ............. G06T 3/08 |
| | | | | 348/383 |
| 7,515,177 | B2 | | 4/2009 | Yoshikawa |
| 9,451,162 | B2 | | 9/2016 | Van Hoff et al. |
| 9,911,454 | B2 | | 3/2018 | Van Hoff et al. |
| 10,291,828 | B1 | * | 5/2019 | Hsu ...................... H04N 23/698 |
| 2007/0182812 | A1 | | 8/2007 | Ritchey |
| 2014/0153916 | A1 | * | 6/2014 | Kintner ................ H04N 13/243 |
| | | | | 396/419 |
| 2014/0267596 | A1 | * | 9/2014 | Geerds ................... H04N 23/51 |
| | | | | 348/38 |
| 2015/0316835 | A1 | * | 11/2015 | Scott ..................... G03B 37/00 |
| | | | | 396/419 |
| 2016/0349599 | A1 | * | 12/2016 | Macmillan ............. G03B 37/04 |
| 2016/0352982 | A1 | * | 12/2016 | Weaver ................ H04N 23/695 |
| 2017/0004622 | A1 | | 1/2017 | Adsumilli et al. |
| 2017/0059966 | A1 | | 3/2017 | Wallace |
| 2017/0331986 | A1 | * | 11/2017 | Houba ................. H04N 23/698 |
| 2018/0007245 | A1 | | 1/2018 | Rantala et al. |
| 2018/0059515 | A1 | * | 3/2018 | Greenthal ............. F16M 11/08 |
| 2019/0098276 | A1 | * | 3/2019 | Duggan ............... H04N 23/698 |

OTHER PUBLICATIONS

Search Report and Written Opinion for European Application No. 21829393.4, Dated Aug. 2, 2024, 9 pages.

* cited by examiner

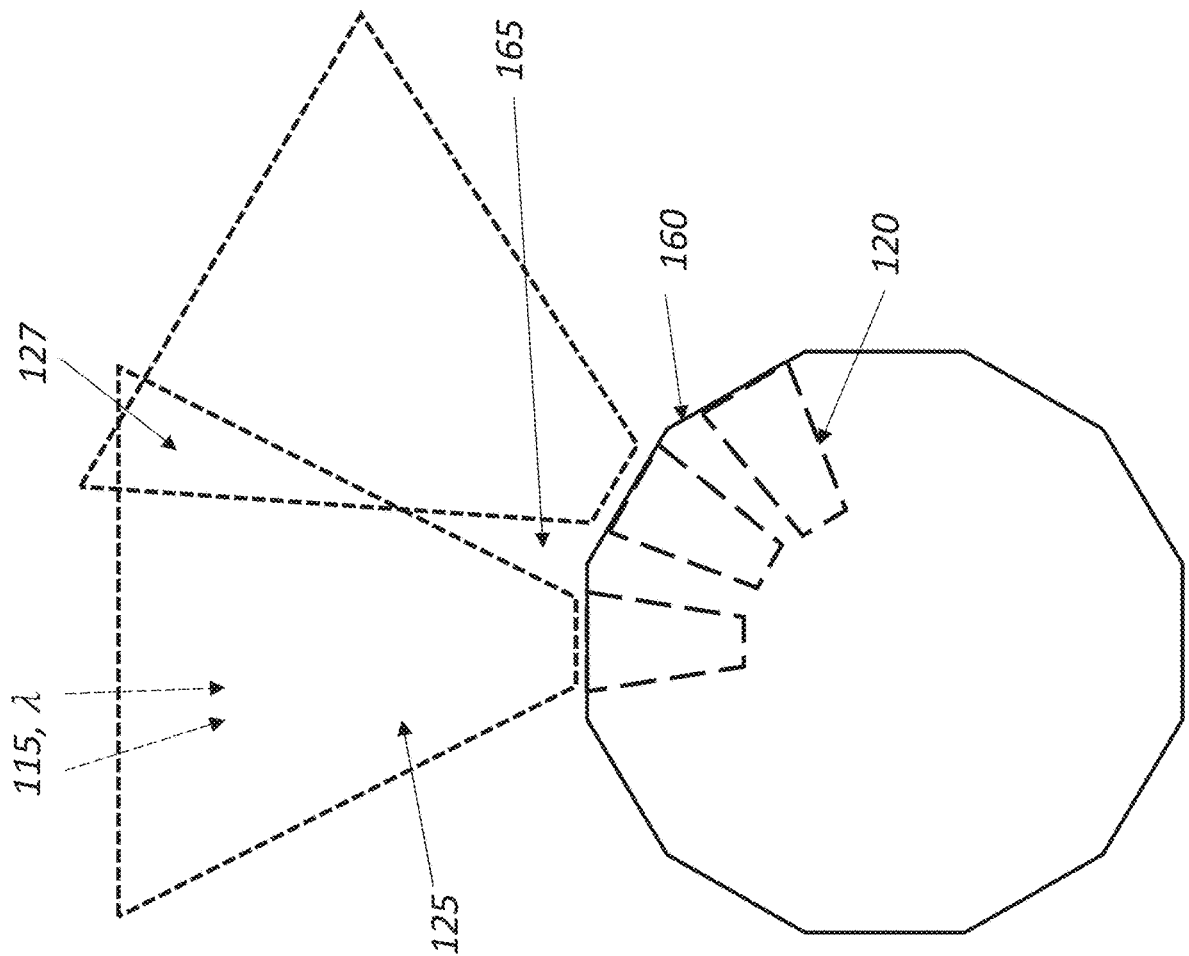

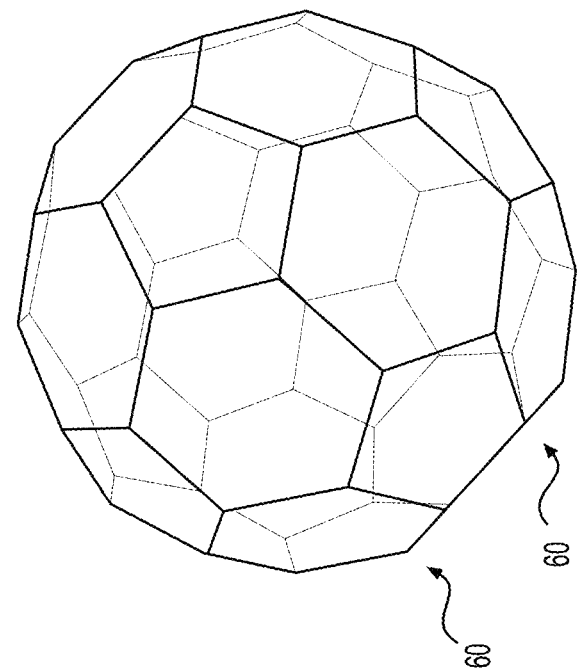
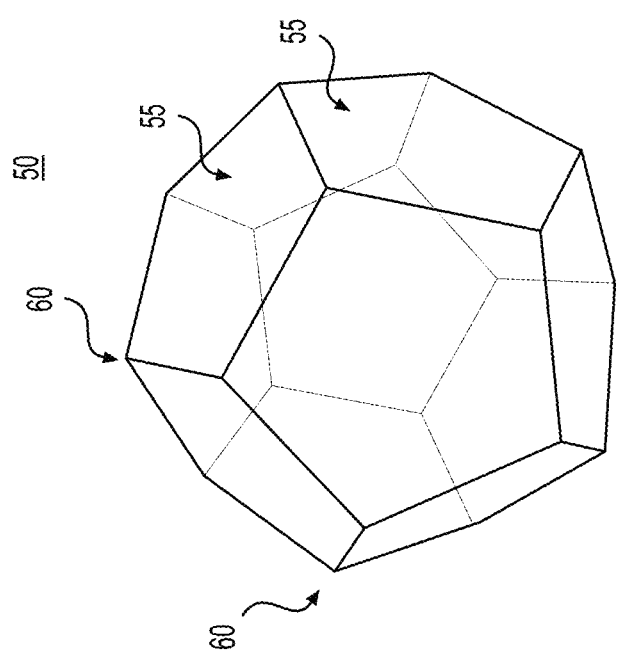
FIG. 4

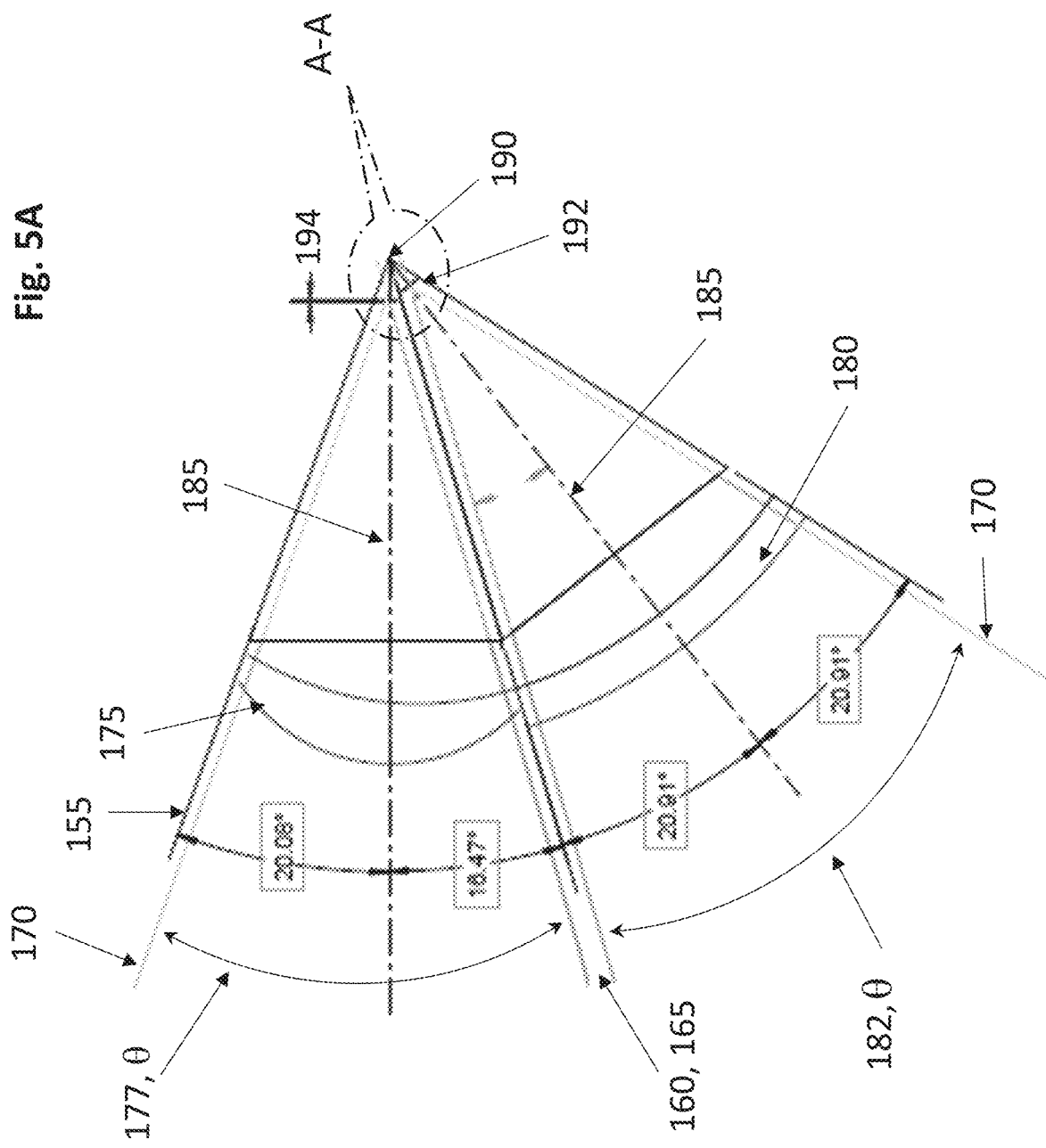

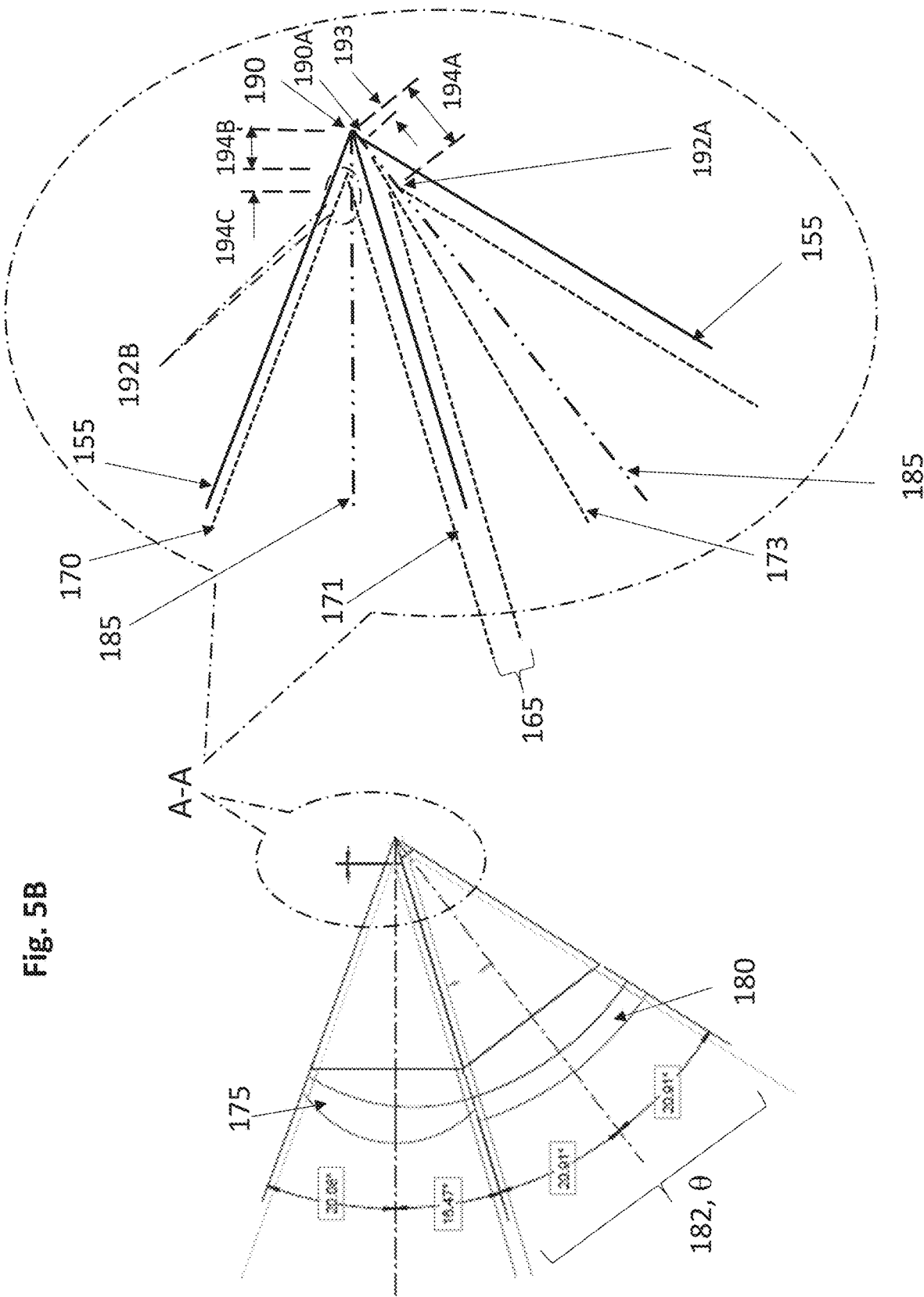

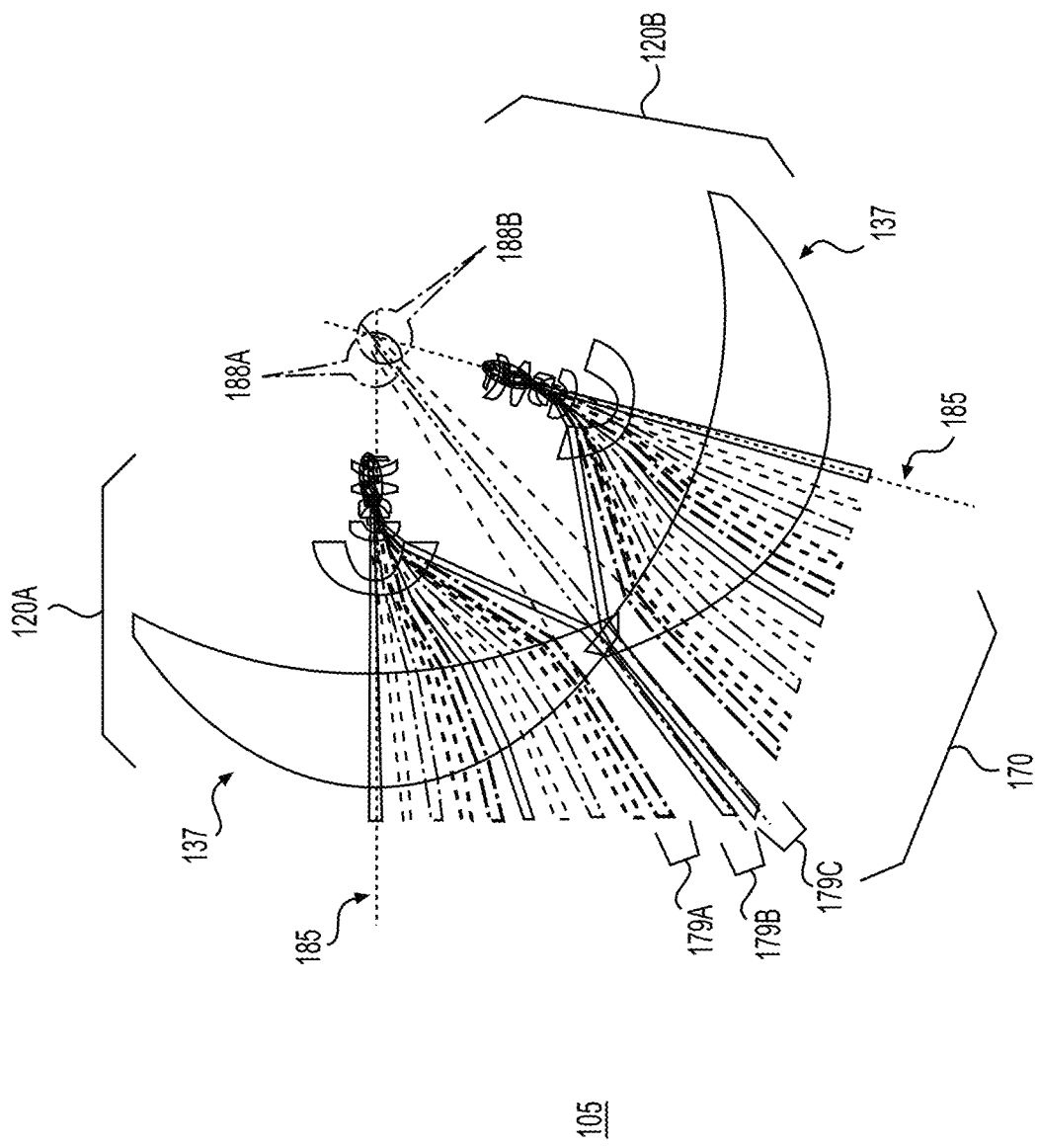

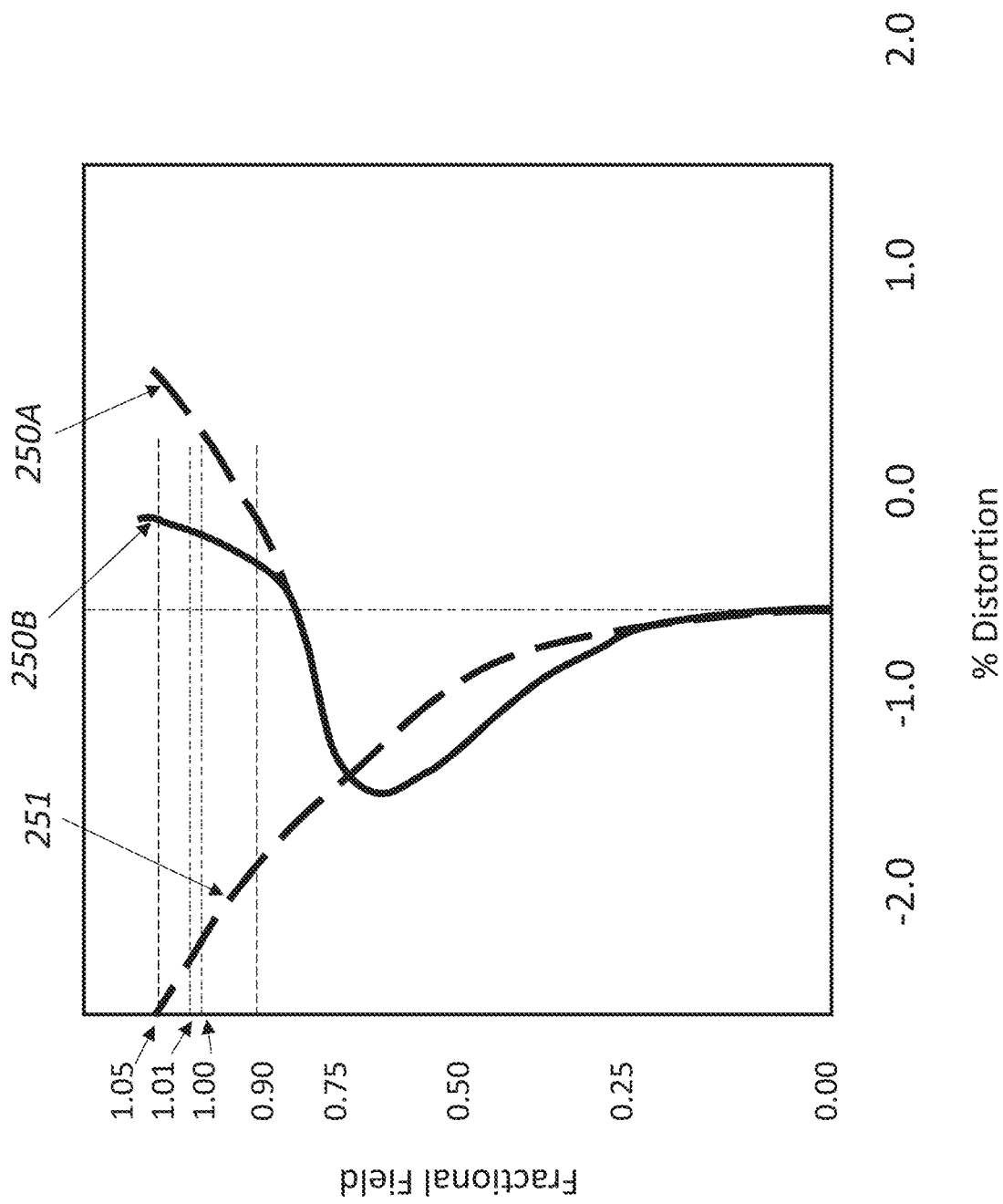

600

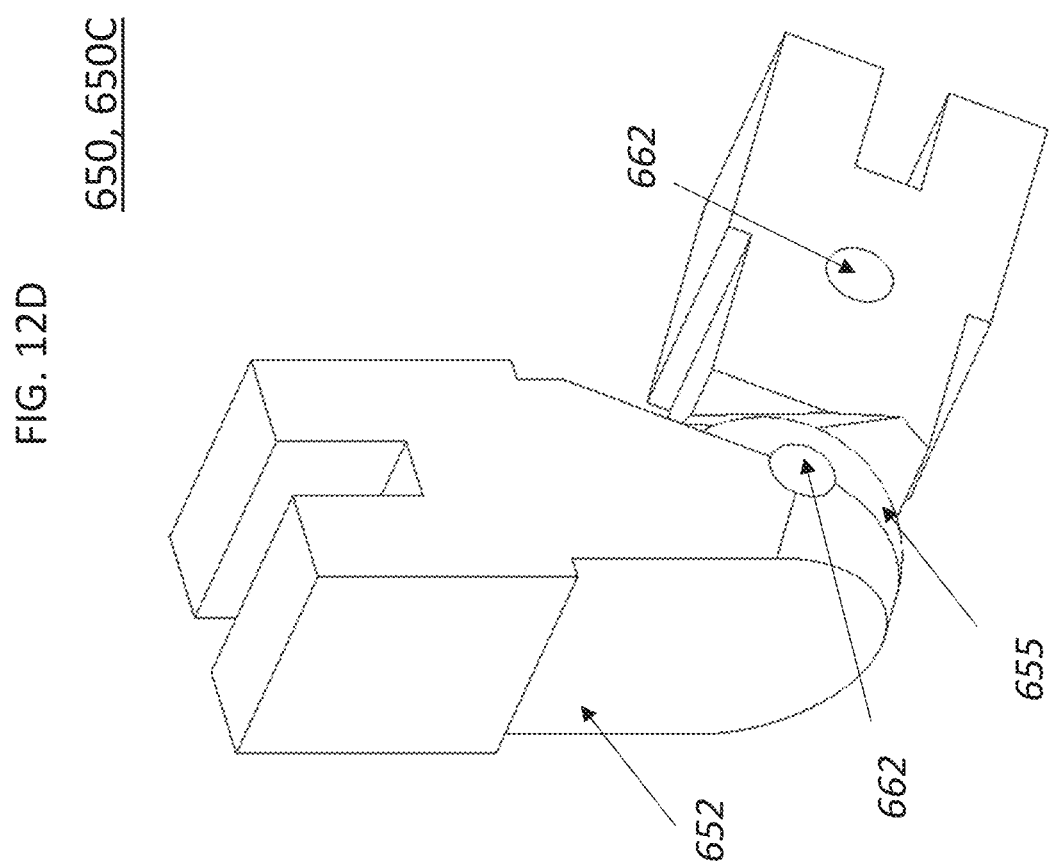

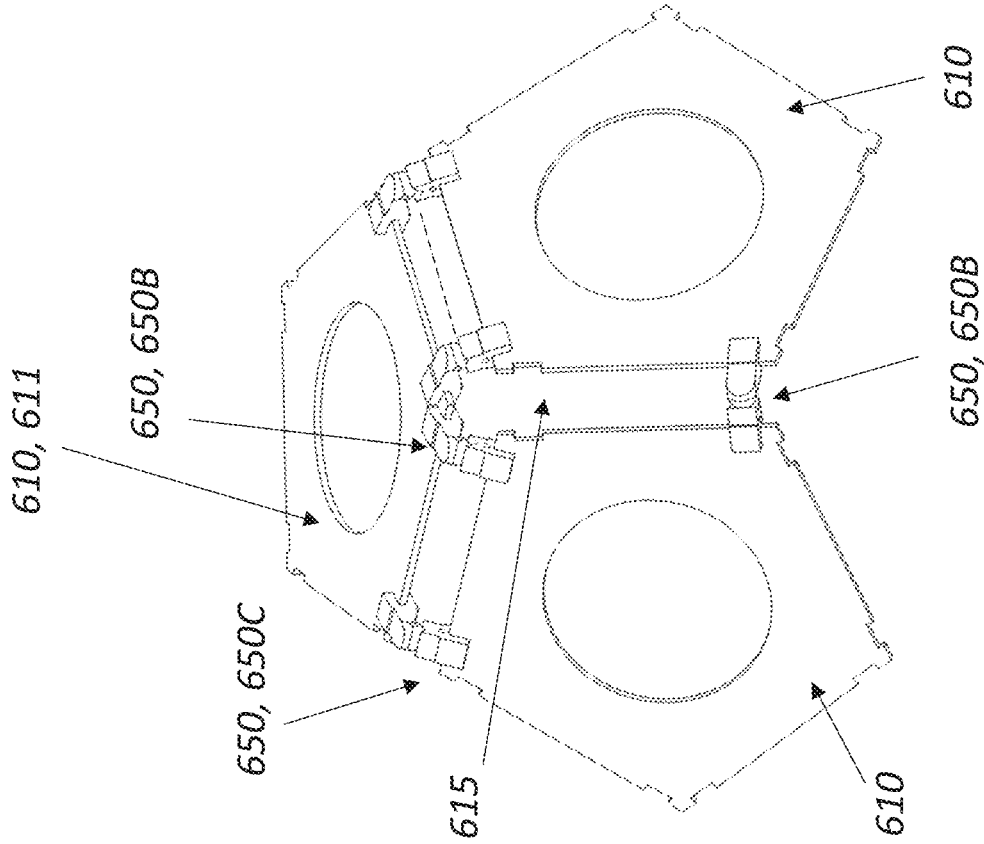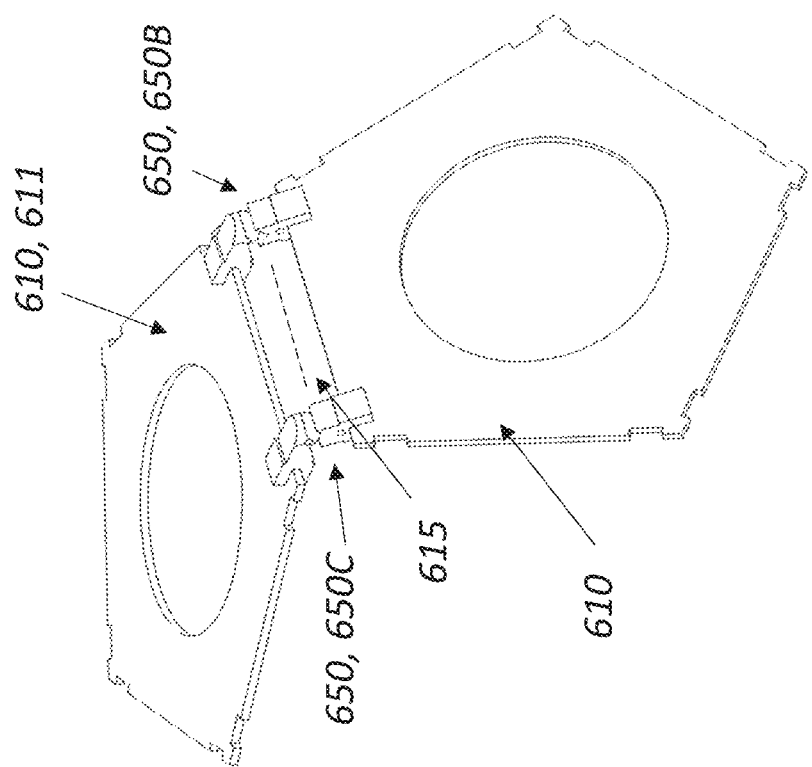
FIG. 12E

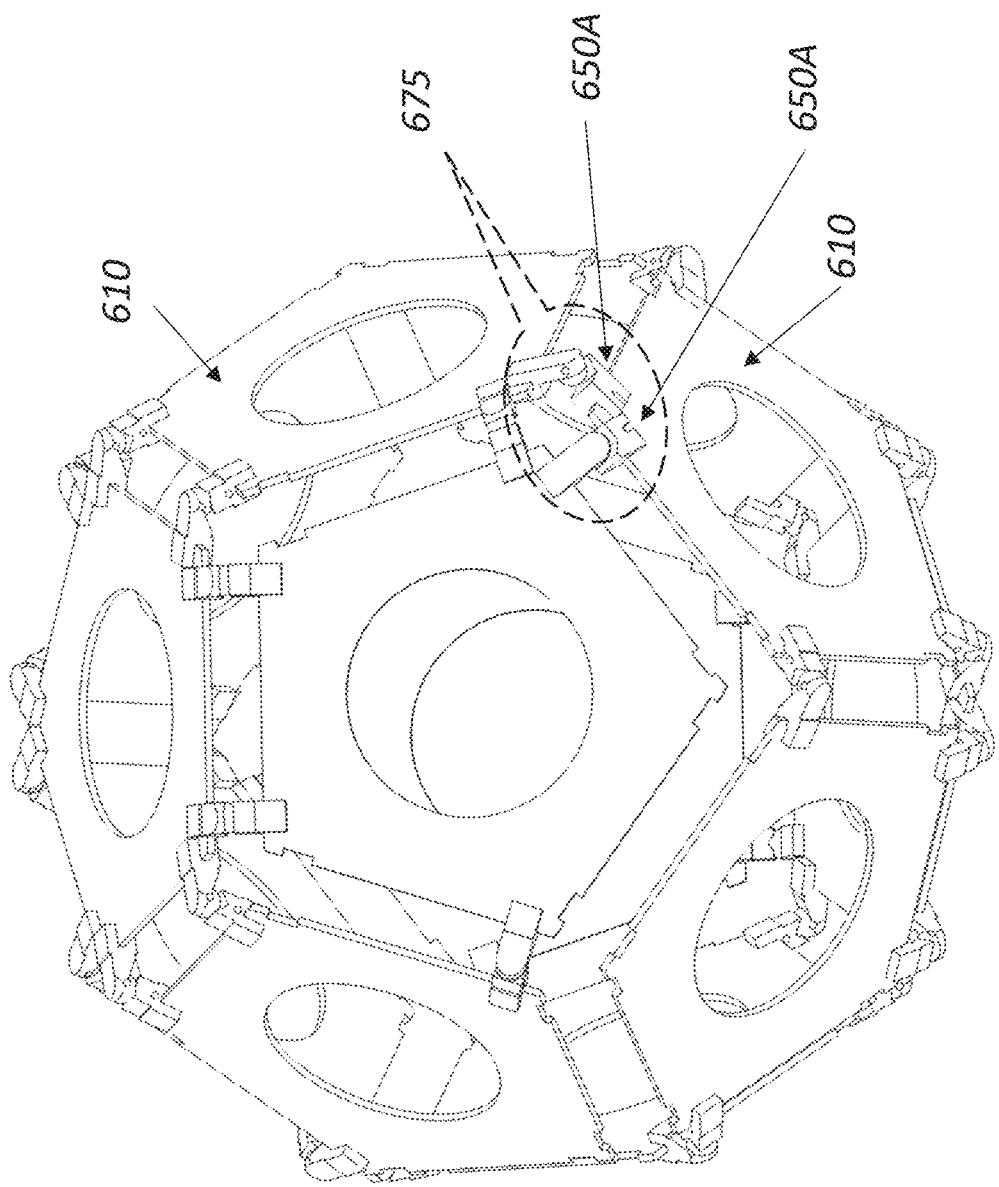

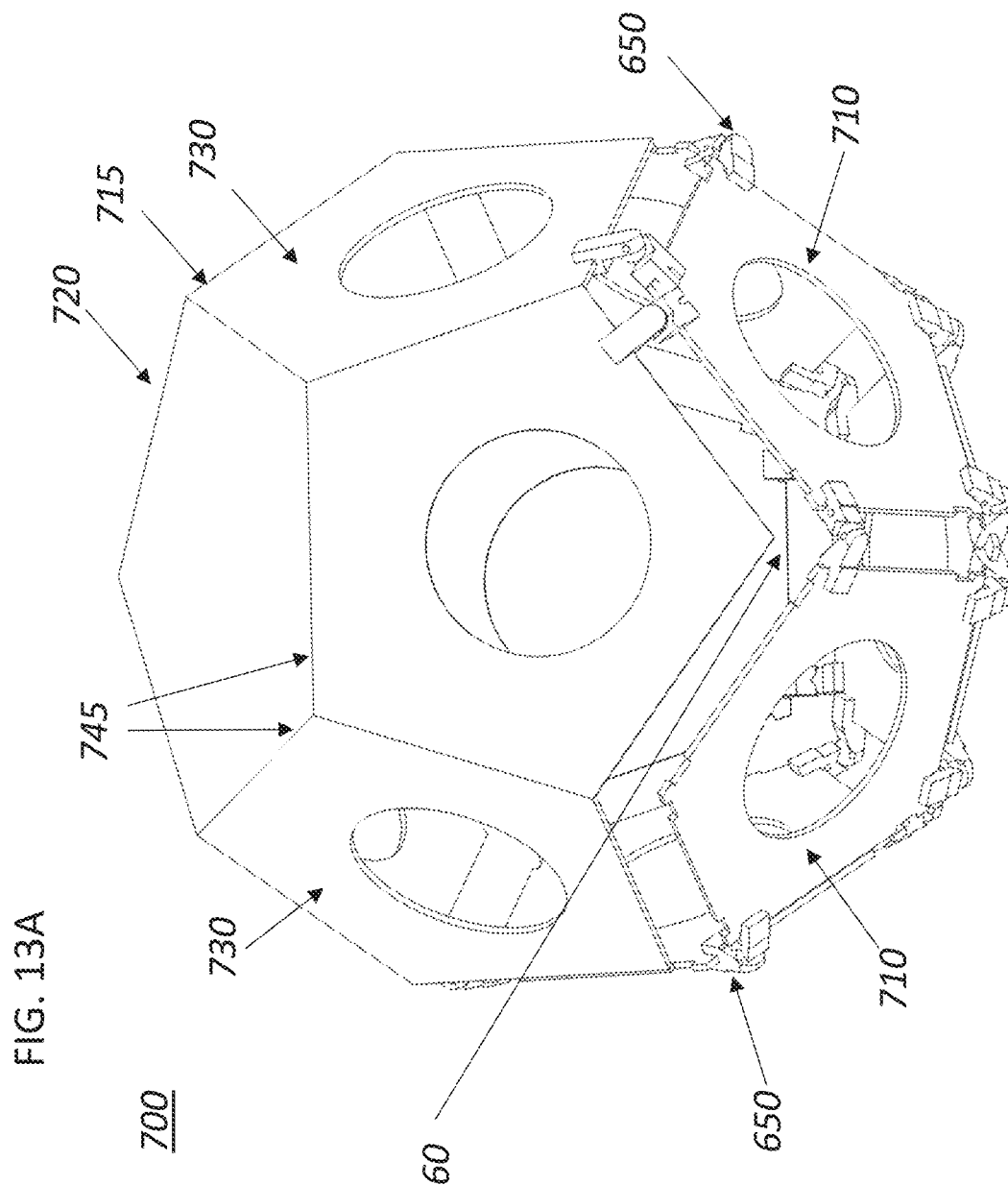

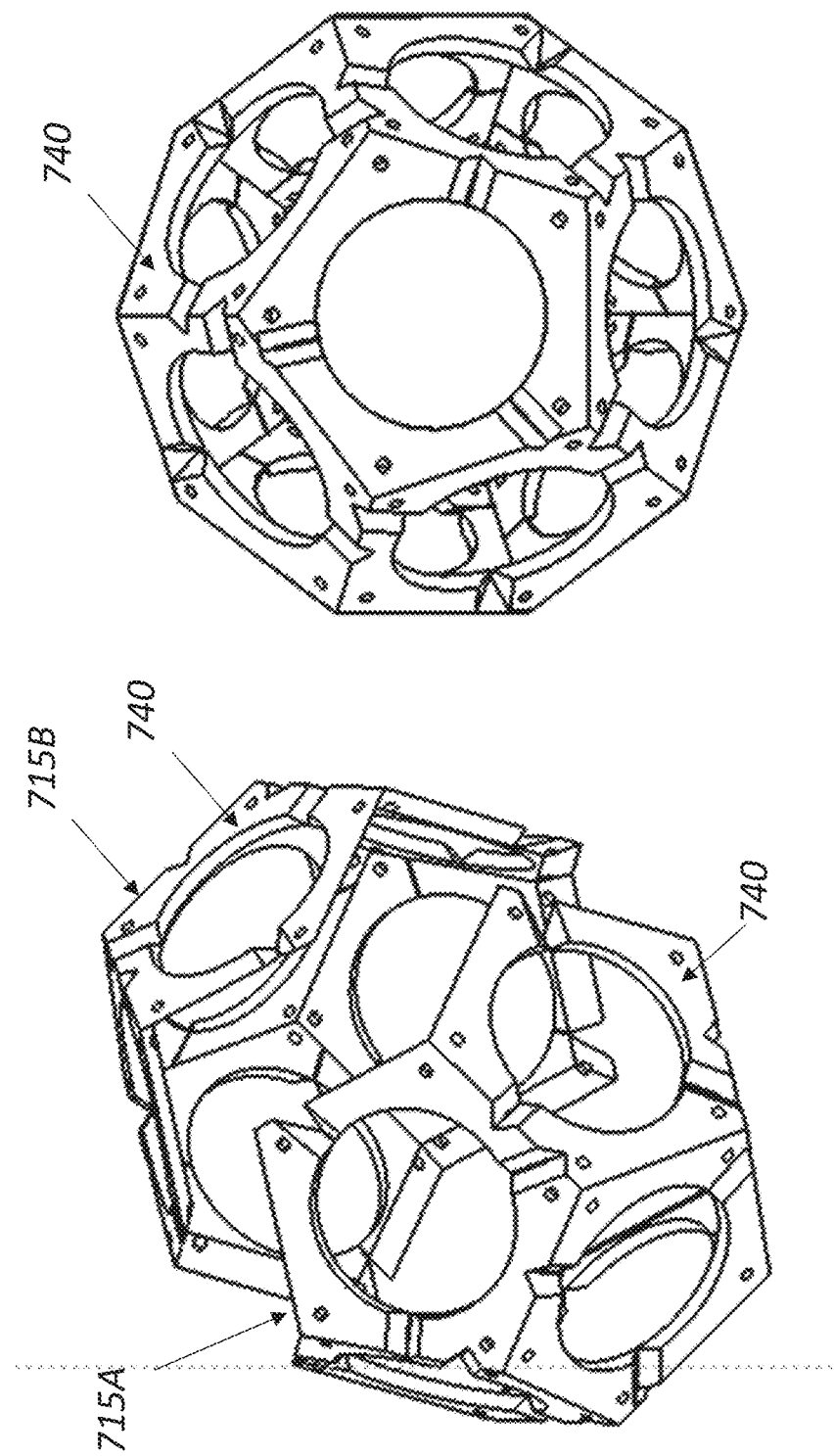

LOW PARALLAX IMAGING SYSTEM WITH AN INTERNAL SPACE FRAME

CROSS REFERENCE TO RELATED APPLICATIONS

This application is the National Stage of International Application No. PCT/US21/38552, filed Jun. 22, 2021, which claims benefit of priority of: (1) U.S. Provisional Patent Application Ser. No. 63/183,961, filed May 4, 2021, entitled "Low Parallax Imaging System with an Internal Space Frame;" (2) International Patent Application No. PCT/US21/17284, filed Feb. 9, 2021, entitled "Panoramic Camera System for Enhanced Sensing;" (3) International Application No. PCT/US20/66702, filed Dec. 22, 2020, entitled "Mounting Systems for Multi-Camera Imagers;" (4) International Patent Application No. PCT/US20/39197, filed Jun. 23, 2020, entitled "Opto-Mechanics of Panoramic Capture Devices with Abutting Cameras;" (5) International Patent Application No. PCT/US20/39200, filed Jun. 23, 2020, entitled "Multi-camera Panoramic Image Capture Devices with a Faceted Dome;" and (6) International Patent Application No. PCT/US20/39201, filed Jun. 23, 2020, entitled "Lens Design for Low Parallax Panoramic Camera Systems." The last four listed International applications each claims priority to U.S. Provisional Patent Application Ser. No. 62/952,973, filed Dec. 23, 2019, entitled "Opto-Mechanics of Panoramic Capture Devices with Abutting Cameras;" and to U.S. Provisional Patent Application Ser. No. 62/952,983, filed Dec. 23, 2019, entitled "Multi-camera Panoramic Image Capture Devices with a Faceted Dome." The last three listed International Applications above each also claims priority to U.S. Provisional Patent Application Ser. No. 62/865,741, filed Jun. 24, 2019. The entirety of each of the International Applications and of each of the US Provisional Patent Applications listed above is hereby incorporated by reference herein.

TECHNICAL FIELD

The present disclosure relates to panoramic low-parallax multi-camera capture devices having a plurality of adjacent and abutting polygonal cameras. The disclosure also relates the opto-mechanical design of cameras that capture incident light from a polygonal shaped field of view to form a polygonal shaped image, and particularly to versions thereof using an internal space frame.

BACKGROUND

Panoramic cameras have substantial value because of their ability to simultaneously capture wide field of view images. The earliest such example is the fisheye lens, which is an ultra-wide-angle lens that produces strong visual distortion while capturing a wide panoramic or hemispherical image. While the field of view (FOV) of a fisheye lens is usually between 100 and 180 degrees, the approach has been extended to yet larger angles, including into the 220-270° range, as provided by Y. Shimizu in U.S. Pat. No. 3,524,697. As an alternative, there are mirror or reflective based cameras that capture annular panoramic images, such as the system suggested by P. Greguss in U.S. Pat. No. 4,930,864. While these technologies have continued to evolve, it is difficult for them to provide a full hemispheric or spherical image with the resolution and image quality that modern applications are now seeking.

As another alternative, panoramic multi-camera devices, with a plurality of cameras arranged around a sphere or a circumference of a sphere, are becoming increasingly common. However, in most of these systems, including those described in U.S. Pat. Nos. 9,451,162 and 9,911,454, both to A. Van Hoff et al., of Jaunt Inc., the plurality of cameras are sparsely populating the outer surface of the device. In order to capture complete 360-degree panoramic images, including for the gaps or seams between the adjacent individual cameras, the cameras then have widened FOVs that overlap one to another. In some cases, as much as 50% of a camera's FOV or resolution may be used for camera to camera overlap, which also creates substantial parallax differences between the captured images. Parallax is the visual perception that the position or direction of an object appears to be different when viewed from different positions. Then in the subsequent image processing, the excess image overlap and parallax differences both complicate and significantly slow the efforts to properly combine, tile or stitch, and synthesize acceptable images from the images captured by adjacent cameras.

There are also panoramic multi-camera devices in which a plurality of cameras is arranged around a sphere or a circumference of a sphere, such that adjacent cameras are abutting along a part or the whole of adjacent edges. As an example, U.S. Pat. No. 7,515,177 by K. Yoshikawa depicts an imaging device with a multitude of adjacent image pickup units (cameras). Images are collected from cameras having overlapping fields of view, so as to compensate for mechanical errors.

More broadly, in a multi-camera device, mechanical variations in the assembly and alignment of individual cameras, and of adjacent cameras to each other, can cause real physical variations to both the cameras themselves, and to the seam widths and parallelism of the camera edges along the seams. These variations can then affect the FOVs captured by the individual cameras, the parallax errors in the images captured by adjacent cameras, the extent of "blind spots" in the FOV corresponding to the seams, the seam widths, and the amount of image overlap that is needed to compensate. Thus, there are opportunities to improve panoramic multi-camera devices and the low-parallax cameras thereof, relative to the optical and opto-mechanical designs, and other aspects as well.

BRIEF DESCRIPTION OF DRAWINGS

FIG. 3 depicts a cross-sectional view of a portion of a standard multi-camera capture device showing FOV overlap, fields of view, overlap, seams, and blind regions.

FIG. 4 depicts two polyhedron shapes, that of a regular dodecahedron and a truncated icosahedron, to which a multi-camera capture device can be designed and fabricated.

FIGS. 5A and FIG. 5B depict the optical geometry for fields of view for adjacent hexagonal and pentagonal lenses, as can occur with a device having the geometry of a truncated icosahedron.

FIG. 5B depicts an expanded area of FIG. 5A with greater detail.

FIG. 5D depicts parallax differences for two adjacent cameras, relative to a center of perspective.

FIG. 6 depicts distortion correction curves plotted on a graph showing a percentage of distortion relative to a fractional field.

FIG. 12D depicts perspective views of a kinematic element that can be used in a kinematic space frame.

FIG. 12E depicts two perspective views for partial assemblies of a kinematic space frame.

FIG. 12G depicts another perspective view of a partial assembly of a kinematic space frame.

FIG. 13A, FIG. 13B, and FIG. 13C each depict an alternative kinematic space frame structure.

DETAILED DESCRIPTION

Figure 1:
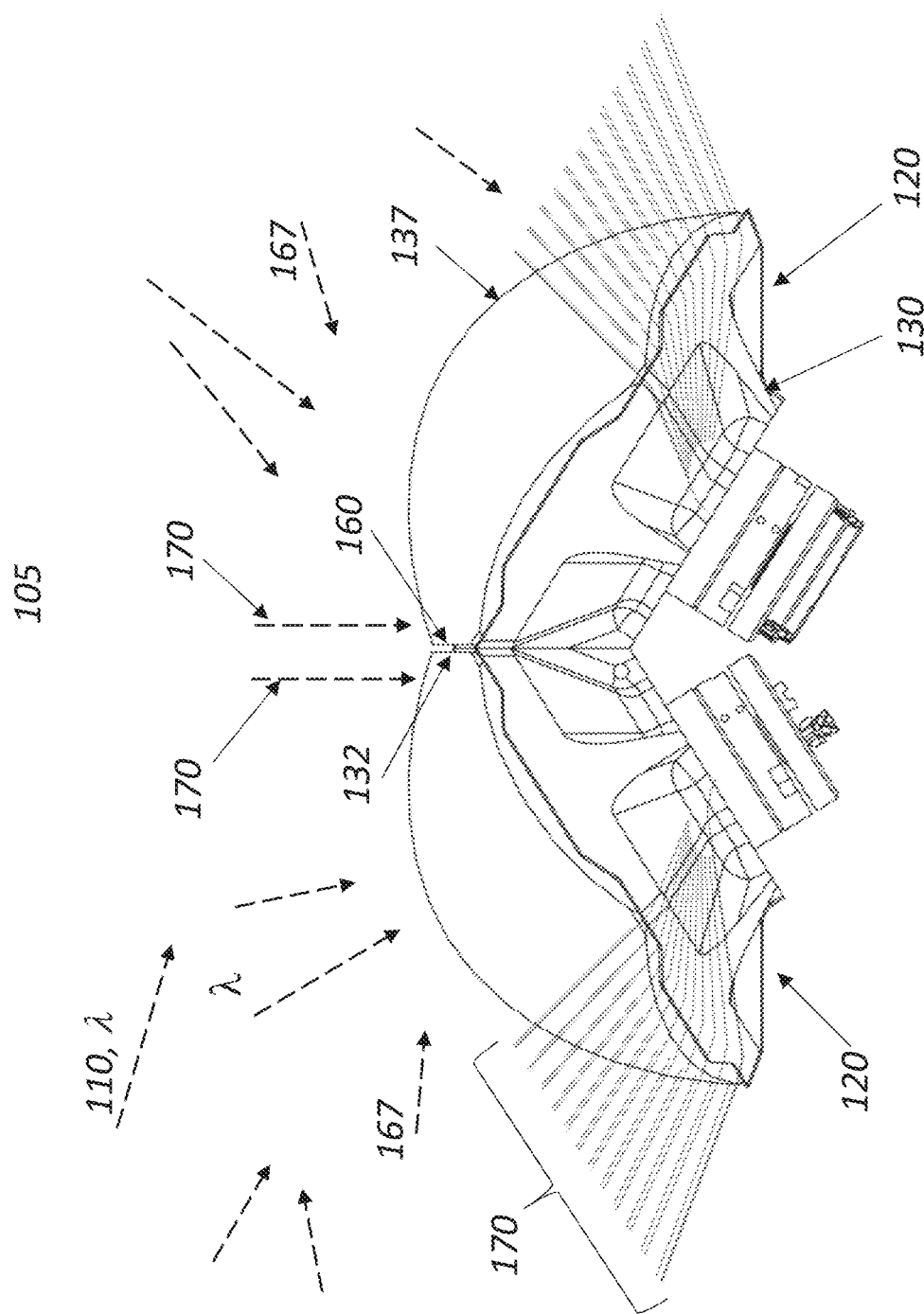
FIG. 1 depicts a 3D view of a portion of a multi-camera capture device, and specifically two adjacent cameras thereof.

As is generally understood in the field of optics, a lens or lens assembly typically comprises a system or device having multiple lens elements which are mounted into a lens barrel or housing, and which work together to produce an optical image. An imaging lens captures a portion of the light coming from an object or plurality of objects that reside in object space at some distance(s) from the lens system. The imaging lens can then form an image of these objects at an output "plane"; the image having a finite size that depends on the magnification, as determined by the focal length of the imaging lens and the conjugate distances to the object(s) and image plane, relative to that focal length. The amount of image light that transits the lens, from object to image, depends in large part on the size of the aperture stop of the imaging lens, which is typically quantified by one or more values for a numerical aperture (NA) or an f-number (F # or F/#).

The image quality provided by the imaging lens depends on numerous properties of the lens design, including the selection of optical materials used in the design, the size, shapes (or curvatures) and thicknesses of the lens elements, the relative spacing of the lens elements one to another, the spectral bandwidth, polarization, light load (power or flux) of the transiting light, optical diffraction or scattering, and/or lens manufacturing tolerances or errors. The image quality is typically described or quantified in terms of lens aberrations (e.g., spherical, coma, or distortion), or the relative size of the resolvable spots provided by the lens, which is also often quantified by a modulation transfer function (MTF).

In a typical electronic or digital camera, an image sensor is nominally located at the image plane. This image sensor is typically a CCD or CMOS device, which is physically attached to a heat sink or other heat removal means, and also includes electronics that provide power to the sensor, and read-out and communications circuitry that provide the image data to data storage or image processing electronics. The image sensor typically has a color filter array (CFA), such as a Bayer filter within the device, with the color filter pixels aligned in registration with the image pixels to provide an array of RGB (Red, Green, Blue) pixels. Alternative filter array patterns, including the CYGM filter (cyan, yellow, green, magenta) or an RGBW filter array (W=white), can be used instead.

In typical use, many digital cameras are used by people or remote systems in relative isolation, to capture images or pictures of a scene, without any dependence or interaction with any other camera devices. In some cases, such as surveillance or security, the operation of a camera may be directed by people or algorithms based on image content seen from another camera that has already captured overlapping, adjacent, or proximate image content. In another example, people capture panoramic images of a scene with an extended or wide FOV, such as a landscape scene, by sequentially capturing a sequence of adjacent images, while manually or automatically moving or pivoting to frame the adjacent images. Afterwards, image processing software, such as Photoshop or Lightroom, can be used to stitch, mosaic, or tile the adjacent images together to portray the larger extended scene. Image stitching or photo stitching is the process of combining multiple photographic images with overlapping fields of view to produce a segmented panorama or high-resolution image. Image quality improvements, including exposure or color corrections, can also be applied, either in real time, or in a post processing or image rendering phase, or a combination thereof.

Unless the objects in a scene are directionally illuminated and/or have a directional optical response (e.g., such as with reflectance), the available light is plenoptic, meaning that there is light travelling in every direction, or nearly so, in a given space or environment. A camera can then sample a subset of this light, as image light, with which it provides a resulting image that shows a given view or perspective of the different objects in the scene at one or more instants in time. If the camera is moved to a different nearby location and used to capture another image of part of that same scene, both the apparent perspectives and relative positioning of the objects will change. In the latter case, one object may now partially occlude another, while a previously hidden object becomes at least partially visible. These differences in the apparent position or direction of an object are known as parallax. In particular, parallax is a displacement or difference in the apparent position of an object viewed along two different lines of sight and is measured by the angle or semi-angle of inclination between those two lines.

In a stereoscopic image capture or projection system, dual view parallax is a cue, along with shadowing, occlusion, and perspective, that can provide a sense of depth. For example, in a stereo (3D) projection system, polarization or spectrally encoded image pairs can be overlap projected onto a screen to be viewed by audience members wearing appropriate glasses. The amount of parallax can have an optimal range, outside of which, the resulting sense of depth can be too small to really be noticed by the audience members, or too large to properly be fused by the human visual system.

Whereas, in a panoramic image capture application, parallax differences can be regarded as an error that can complicate both image stitching and appearance. In the example of an individual manually capturing a panoramic sequence of landscape images, the visual differences in perspective or parallax across images may be too small to notice if the objects in the scene are sufficiently distant (e.g., optically at infinity). An integrated panoramic capture device with a rotating camera or multiple cameras has the potential to continuously capture real time image data at high resolution without being dependent on the uncertainties of manual capture. But such a device can also introduce its own visual disparities, image artifacts, or errors, including those of parallax, perspective, and exposure. Although the resulting images can often be successfully stitched together with image processing algorithms, the input image errors complicate and lengthen image processing time, while sometimes leaving visually obvious residual errors.

To provide context, FIG. 1 depicts a portion of an improved integrated panoramic multi-camera capture device 100 having two adjacent cameras 120 in housings 130 which are designed for reduced parallax image capture. These cameras are alternately referred to as image pick-up units, or camera channels, or objective lens systems. The cameras 120 each have a plurality of lens elements (see FIG. 2) that are mounted within a lens barrel or housing 130. The adjacent outer lens elements 137 have adjacent beveled edges 132 and are proximately located, one camera channel to another, but which may not be in contact, and thus are separated by a gap or seam 160 of finite width. Some portion of the available light (X), or light rays 110, from a scene or object space 105 will enter a camera 120 to become image light that was captured within a constrained FOV and directed to an image plane, while other light rays will miss the cameras entirely. Some light rays 110 will propagate into the camera and transit the constituent lens elements as edge-of-field chief rays 170, or perimeter rays, while other light rays can potentially propagate through the lens elements to create stray or ghost light and erroneous bright spots or images. As an example, some light rays (167) that are incident at large angles to the outer surface of an outer lens element 137 can transit a complex path through the lens elements of a camera and create a detectable ghost image at the image plane 150.

Figure 2A:
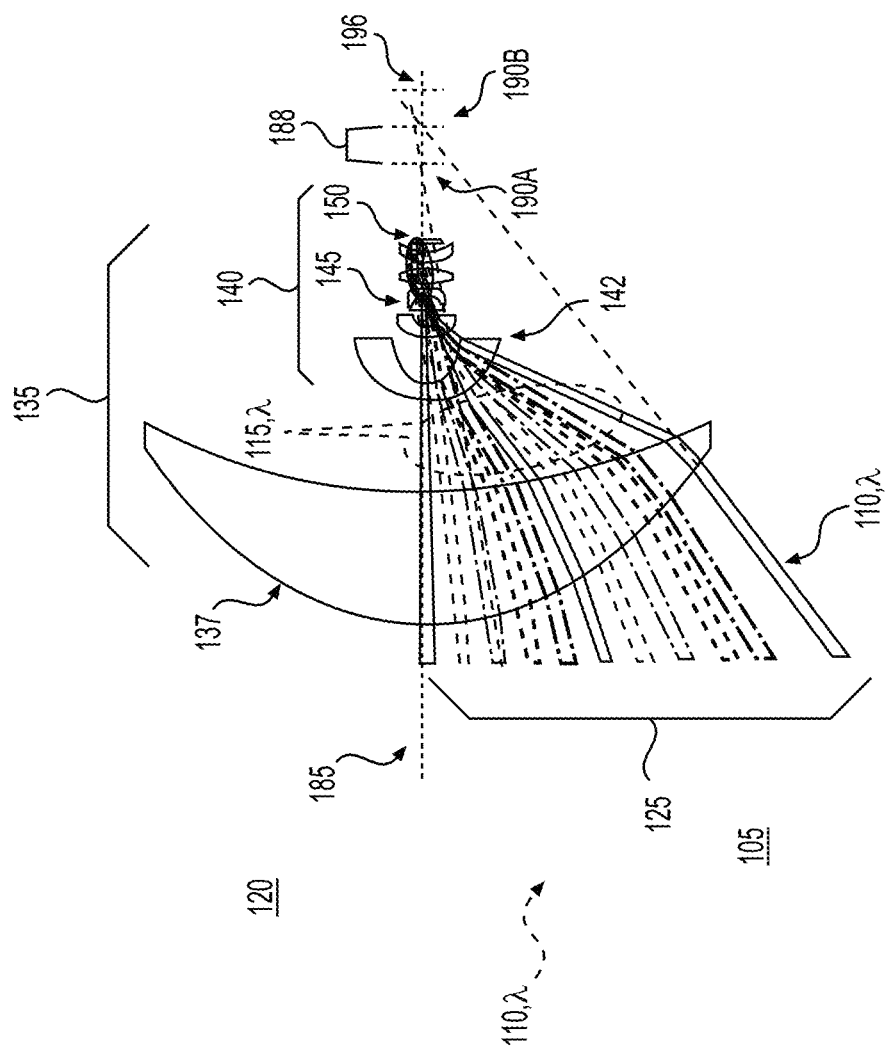
FIGS. 2A and 2B depict portions of camera lens assemblies in cross-section, including lens elements and ray paths.
Figure 2B:
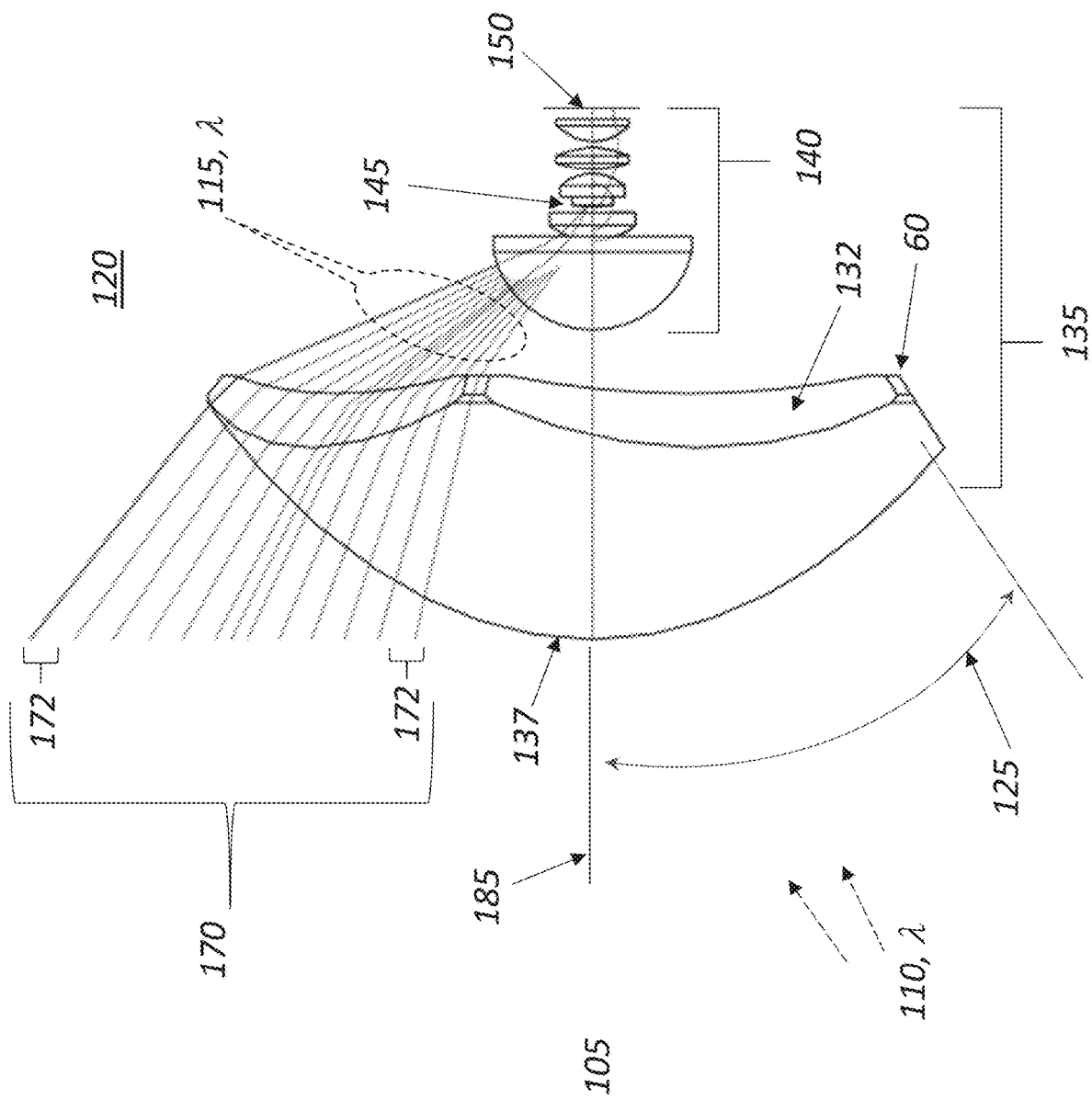

In greater detail, FIG. 2A depicts a cross-section of part of a camera 120 having a set of lens elements 135 mounted in a housing (130, not shown) within a portion of an integrated panoramic multi-camera capture device 100. A fan of light rays 110 from object space 105, spanning the range from on axis to full field off axis chief rays, are incident onto the outer lens element 137, and are refracted and transmitted inwards. This image light 115 that is refracted and transmitted through further inner lens elements 140, through an aperture stop 145, converges to a focused image at or near an image plane 150, where an image sensor (not shown) is typically located. The lens system 120 of FIG. 2A can also be defined as having a lens form that consists of outer lens element 137 or compressor lens element, and inner lens elements 140, the latter of which can also be defined as consisting of a pre-stop wide angle lens group, and a post-stop eyepiece-like lens group. This compressor lens element (137) directs the image light 115 sharply inwards, compressing the light, to both help enable the overall lens assembly to provide a short focal length, while also enabling the needed room for the camera lens housing or barrel to provide the mechanical features necessary to both hold or mount the lens elements and to interface properly with the barrel or housing of an adjacent camera. The image light that transited a camera lens assembly from the outer lens element 137 to the image plane 150 will provide an image having an image quality, that can be quantified by an image resolution, image contrast, a depth of focus, and other attributes, whose quality was defined by the optical aberrations (e.g., astigmatism, distortion, or spherical) and chromatic or spectral aberrations, encountered by the transiting light at each of the lens elements (137, 140) within a camera 120. FIG. 2B depicts a fan of chief rays 170, or perimeter rays, incident along or near a beveled edge 132 of the outer lens element 137 of the camera optics (120) depicted in FIG. 2A. FIG. 2B also depicts a portion of a captured, polygonal shaped or asymmetrical, FOV 125, that extends from the optical axis 185 to a line coincident with an edge ray.

In the camera lens design depicted in FIG. 2A, the outer lens element 137 functions as a compressor lens element that redirects the transiting image light 115 towards a second lens element 142, which is the first lens element of the group of inner lens elements 140. In this design, this second lens element 142 has a very concave shape that is reminiscent of the outer lens element used in a fish-eye type imaging lens. This compressor lens element directs the image light 115 sharply inwards, or bends the light rays, to both help enable the overall lens assembly to provide a short focal length, while also enabling the needed room for the camera lens housing 130 or barrel to provide the mechanical features necessary to both hold or mount the lens elements 135 and to interface properly with the barrel or housing of an adjacent camera. However, with a good lens and opto-mechanical design, and an appropriate sensor choice, a camera 120 can be designed with a lens assembly that supports an image resolution of 20-30 pixels/degree, to as much as 110 pixels/degree, or greater, depending on the application and the device configuration.

The resultant image quality from these cameras will also depend on the light that scatters at surfaces, or within the lens elements, and on the light that is reflected or transmitted at each lens surface. The surface transmittance and camera lens system efficiency can be improved by the use of anti-reflection (AR) coatings. The image quality can also depend on the outcomes of non-image light. Considering again FIG. 1, other portions of the available light can be predominately reflected off of the outer lens element 137. Yet other light that enters a camera 120 can be blocked or absorbed by some combination of blackened areas (not shown) that are provided at or near the aperture stop, the inner lens barrel surfaces, the lens element edges, internal baffles or light trapping features, a field stop, or other surfaces. Yet other light that enters a camera can become stray light or ghost light 167 that is also potentially visible at the image plane.

The aggregate image quality obtained by a plurality of adjacent cameras 120 within an improved integrated panoramic multi-camera capture device 100 (e.g., FIG. 1) can also depend upon a variety of other factors including the camera to camera variations in the focal length and/or track length, and magnification, provided by the individual cameras. These parameters can vary depending on factors including the variations of the glass refractive indices, variations in lens element thicknesses and curvatures, and variations in lens element mounting. As an example, images that are tiled or mosaiced together from a plurality of adjacent cameras will typically need to be corrected, one to the other, to compensate for image size variations that originate with camera magnification differences (e.g., ±2%).

The images produced by a plurality of cameras in an integrated panoramic multi-camera capture device 100 can also vary in other ways that effect image quality and image mosaicing or tiling. In particular, the directional pointing or collection of image light through the lens elements to the image sensor of any given camera 120 can vary, such that the camera captures an angularly skewed or asymmetrical FOV (FOV↔) or mis-sized FOV (FOV±). The lens pointing variations can occur during fabrication of the camera (e.g., lens elements, sensor, and housing) or during the combined assembly of the multiple cameras into an integrated panoramic multi-camera capture device 100, such that the alignment of the individual cameras is skewed by misalignments or mounting stresses. When these camera pointing errors are combined with the presence of the seams 160 between cameras 120, images for portions of an available landscape or panoramic FOV that may be captured, may instead be missed or captured improperly. The variabilities of the camera pointing, and seams can be exacerbated by mechanical shifts and distortions that are caused by internal or external environmental factors, such as heat or light (e.g., image content), and particularly asymmetrical loads thereof.

In comparison to the FIG. 1 system, in a typical commercially available panoramic camera, the seams between cameras are outright gaps that can be 30-50 mm wide, or more. In particular, as shown in FIG. 3, a panoramic multi-camera capture device 101 can have adjacent cameras 120 or camera channels separated by large gaps or seams 160, between which there are blind spots or regions 165 from which neither camera can capture images. The actual physical seams 160 between adjacent camera channels or outer lens elements 137 (FIG. 1 and FIG. 3) can be measured in various ways; as an actual physical distance between adjacent lens elements or lens housings, as an angular extent of lost FOV, or as a number of "lost" pixels. However, the optical seam, as the distance between outer chief rays of one camera to another can be larger yet, due to any gaps in light acceptance caused by vignetting or coating limits. For example, anti-reflection (AR) coatings are not typically deposited to the edges of optics, but an offsetting margin is provided, to provide a coated clear aperture (CA).

To compensate for both camera misalignments and the large seams 160, and to reduce the size of the blind regions 165, the typical panoramic multi-camera capture devices 101 (FIG. 3) have each of the individual cameras 120 capture image light 115 from wide FOVs 125 that provide overlap 127, so that blind regions 165 are reduced, and the potential capturable image content that is lost is small. As another example, in most of the commercially available multi-camera capture devices 101, the gaps are 25-50+ mm wide, and the compensating FOV overlap between cameras is likewise large; e.g., the portions of the FOVs 125 that are overlapping and are captured by two adjacent cameras 120 can be as much as 10-50% of a camera's FOV. The presence of such large image overlaps from shared FOVs 125 wastes potential image resolution and increases the image processing and image stitching time, while introducing significant image parallax and perspective errors. These errors complicate image stitching, as the errors must be corrected or averaged during the stitching process. In such systems, the parallax is not predictable because it changes as a function of object distance. If the object distance is known, the parallax can be predicted for given fields of view and spacing between cameras. But because the object distance is not typically known, parallax errors then complicate image stitching. Optical flow and common stitching algorithms determine an object depth and enable image stitching, but with processing power and time burdens.

Similarly, in a panoramic multi-camera capture device 100, of the type of FIG. 1, with closely integrated cameras, the width and construction at the seams 160 can be an important factor in the operation of the entire device. However, the seams can be made smaller than in FIG. 3, with the effective optical seam width between the FOV edges of two adjacent cameras determined by both optical and mechanical contributions. For example, by using standard optical engineering practices to build lens assemblies in housings, the mechanical width of the seams 160 between the outer lens elements 137 of adjacent cameras might be reduced to 4-6 mm. For example, it is standard practice to assemble lens elements into a lens barrel or housing that has a minimum radial width of 1-1.5 mm, particularly near the outermost lens element. Then accounting for standard coated clear apertures or coating margins, and accounting for possible vignetting, aberrations of the entrance pupil, front color, chip edges, and trying to mount adjacent lens assemblies or housings in proximity by standard techniques. Thus, when accounting for both optics and mechanics, an optical seam width between adjacent lenses can easily be 8-12 mm or more.

But improved versions of the panoramic multi-camera capture device (300) of the type of FIG. 1, with optical and opto-mechanical designs that enable significantly smaller seams, and with further improved parallax performance, are possible. As a first example, for the present technology for improved polygonal shaped cameras, during early stages of fabrication of outer lens elements 137, these lenses can have a circular shape and can be AR coated to at or near their physical edges. When these lenses are subsequently processed to add the polygonal shape defining beveled edges 132 (e.g., FIG. 2B), a result can be that the AR coatings will essentially extend to the beveled lens edges. The effective optical or coated clear apertures can then defined by any allowances for mechanical mounting or for the standard edge grind that is used in optics manufacturing to avoid edge chipping. With this approach, and a mix of other techniques that will be subsequently discussed, the optical seams can be reduced to 1-5 mm width.

Figure 8:
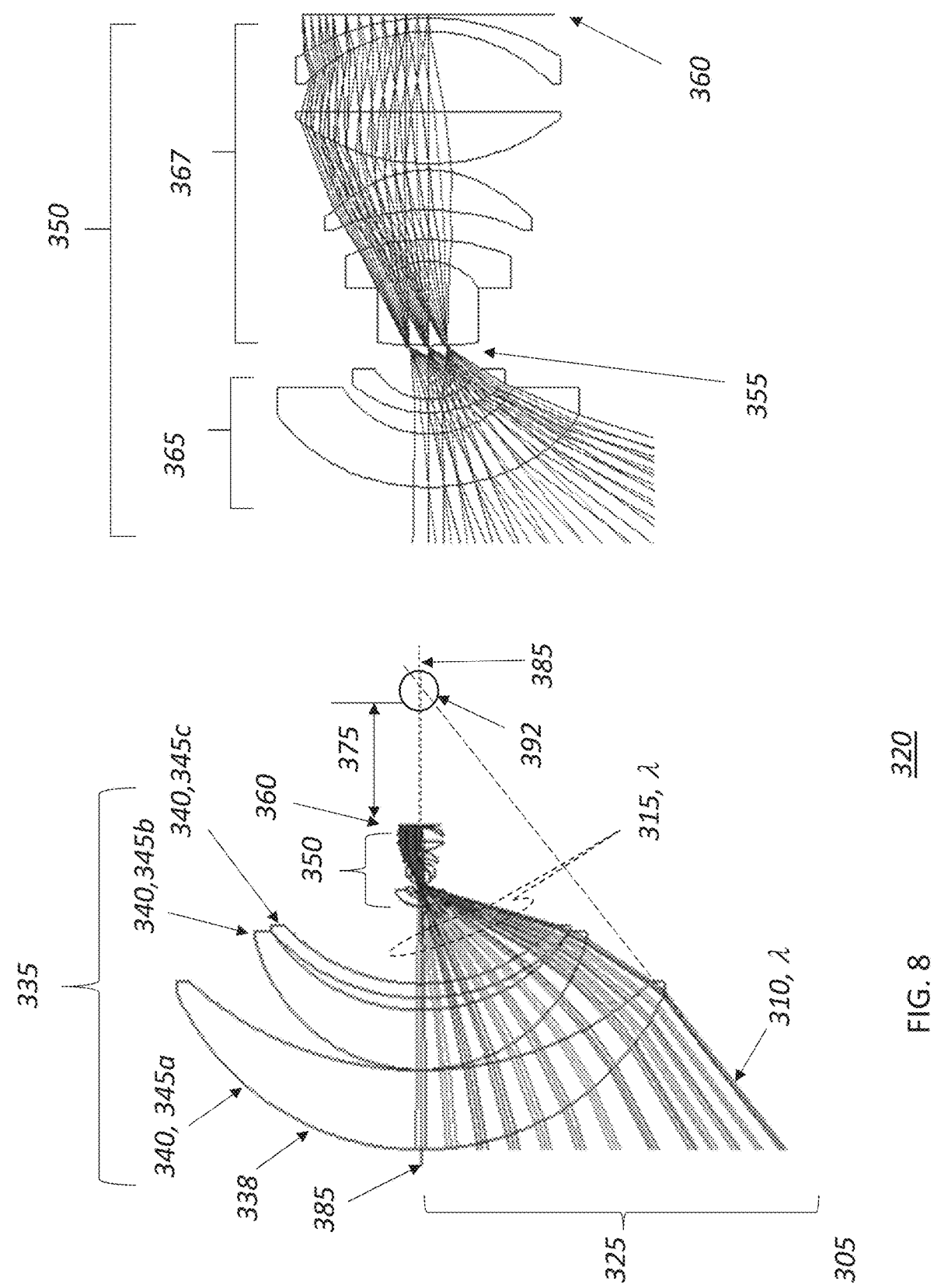
FIG. 8 depicts an improved design for a low-parallax camera lens or objective lens with a multi-compressor lens group.
Figure 9:
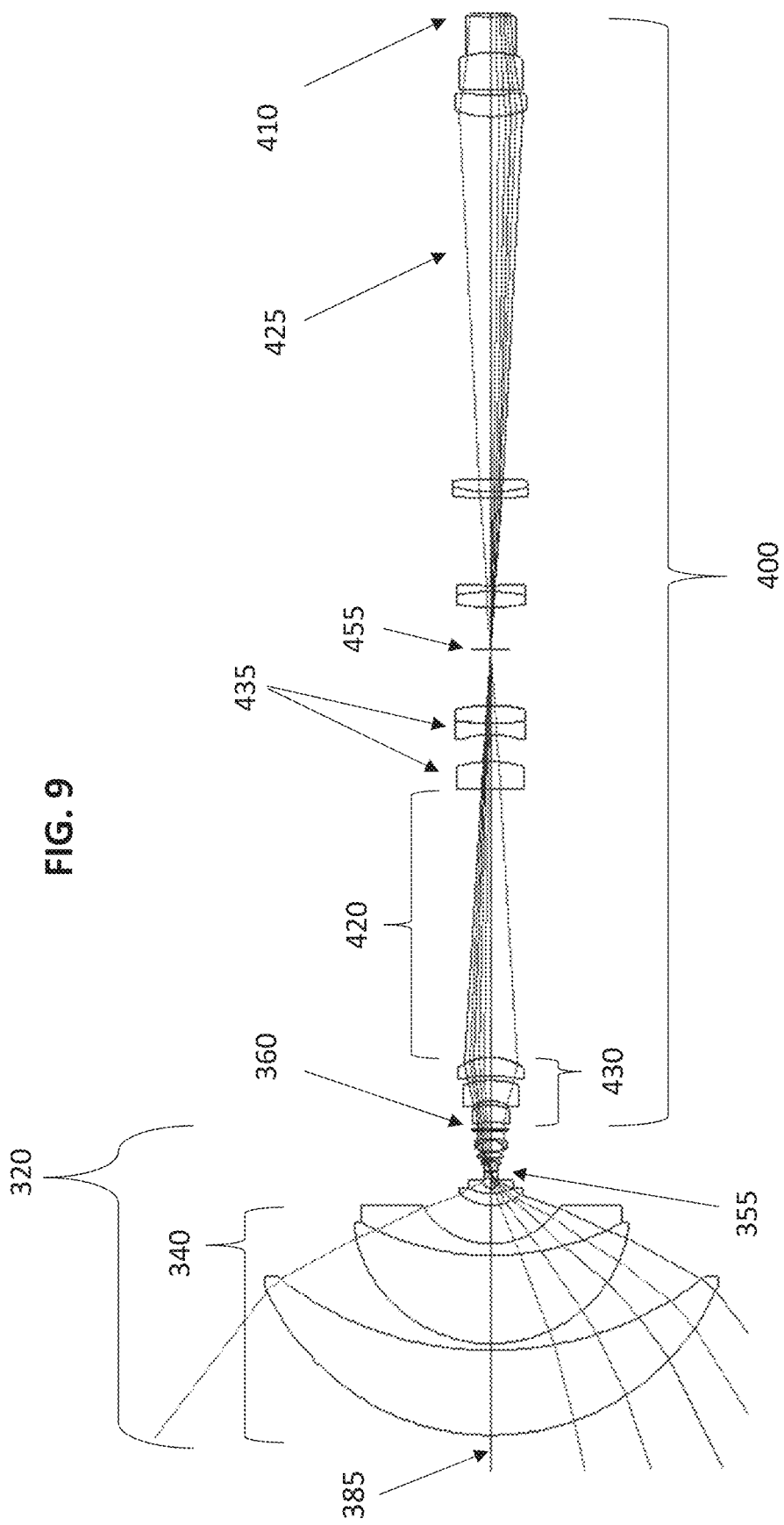
FIG. 9 depicts an improved camera lens design, acting as an objective lens, in combination with a refractive relay optical imaging system.

Aspects of the present disclosure produce high quality low-parallax panoramic images from an improved multi-camera panoramic capture device (300), for which portions of a first example are shown in FIG. 8 and FIG. 9. This broad goal can be enabled by developing a systemic range of design strategies to inform both the optical and opto-mechanical lens design efforts, and the opto-mechanical device design and fabrication efforts, as well as strategies for improved image capture and processing. This goal can also be enabled by providing for both initial and ongoing camera and device calibration. In broad terms, the image processing or rendering of images is a method to generate quality images from the raw captured image data that depends on the camera intrinsics (geometric factors such as focal length and distortion), the camera extrinsics (geometric factors such as camera orientation to object space), other camera parameters such as vignetting and transmission, and illumination parameters such as color and directionality. With respect to an improved multi-camera panoramic capture device 300, the use of fiducials in determining and tracking a center pixel or an image centroid, exposure correction, and knowledge of the camera intrinsics for any given camera 320 in a device, are all assists towards completing reliable and repeatable tiling of images obtained from a plurality of adjacent cameras. Thus, the subsequent discussions are broadly focused on providing optical (camera or objective lens) designs that can enable the desired image quality, as well as camera and device assembly approaches, management of key tolerances, camera calibration, knowledge of camera intrinsics and extrinsics, and other factors that can likewise affect the resultant device performance. The improved panoramic multi-camera capture devices of the present invention can be used to support a wide variety of applications or markets, including cinematic image capture, augmented reality or virtual reality (VR) image capture, surveillance or security imaging, sports or event imaging, mapping or photogrammetry, vehicular navigation, and robotics.

Before exploring opto-mechanical means for enabling improved panoramic multi-camera capture devices (300), means for providing cameras 120 that are improved for use in these systems are developed. Accordingly, the goals include providing improved cameras (320) having both reduced parallax errors and image overlap. As one aspect of the present approach, a goal is to reduce the residual parallax error for the edge chief rays collected respectively by each camera in an adjacent pair. The parallax error is defined as the change in parallax with respect to object distance (e.g., that the chief ray trajectory with respect to a near distance (e.g., 3 feet) from the device, versus a far distance (e.g., 1 mile), is slightly different). For example, as one goal or target for reduced parallax, or to have effectively no parallax error, or to be "parallax-free", is that the chief rays of adjacent cameras should deviate from parallelism to each other by ≤0.5-2.0 deg., and preferably by ≤0.01-0.1 deg. Alternately, or equivalently, the parallax error, as assessed as a perspective error in terms of location on the image plane, should be reduced to ≤2 pixels, and preferably to ≤0.5 pixel. As another aspect of the present approach, the width of the seams 160 between adjacent cameras (e.g., 120, 320) assembled into their own lens housings are to be reduced. The goal is to reduce the width of the seams, both in terms of their absolute physical width, and their optical width or an effective width. For example, a goal is to reduce a seam 160 between adjacent outer lens elements 137 to having a maximum gap or an actual physical seam width in a range of only 0.5-3.0 mm, and to then reduce the maximum optical seam width to a range of about only 1-6 mm. As an example, these reduced seams widths can translate to a reduced angular extent of lost FOV of only 0.25-1.0°, or a number of "lost" pixels of only 2-20 pixels. For example, for a device providing 8k pixels around a 360-degree panorama equirectangular image, a loss of only 2-4 pixels at the seams can be acceptable as the residual image artifacts can be difficult to perceive. The actual details or numerical targets for effectively no-parallax error, or for the maximum optical seam width, depend on many factors including the detailed opto-mechanical designs of the improved cameras 320 and overall device 300, management of tolerances, possible allowances for a center offset distance or an amount of extended FOV (215) and the targets for low parallax therein, and the overall device specifications (e.g., diameter, sensor resolution or used sensor pixels within an imaged FOV or a Core FOV 205 (FIG. 7)). Further goals, enabled by some combination of the above improvements, are for each camera to reliably and quickly provide output images from an embedded sensor package that are cropped down to provide core FOV images, and then that each cropped image can be readily seamed or tiled with cropped images provided by adjacent cameras, so as to readily provide panoramic output images from an improved multi-camera capture device (300) in real time.

In the present application for an improved multi-camera capture device (300), an improved camera 320 provided therein includes a camera lens or lens system consisting of a plurality of lens elements for providing an image, and a camera lens housing for supporting the lens elements and interfacing with a support structure (e.g., a space frame). A camera (320) will also be equivalently referred to as a camera lens (320) or a camera channel (320).

Figure 15A:
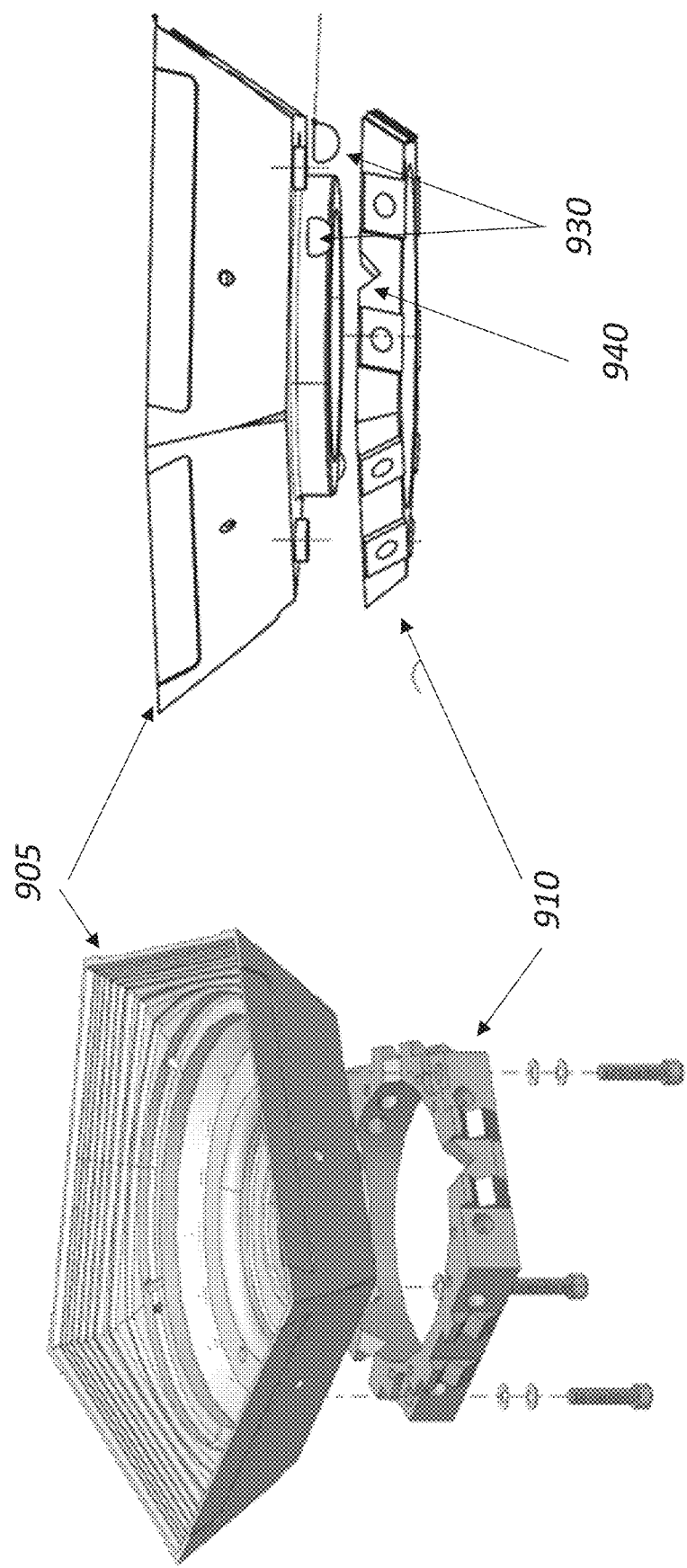
FIG. 15A depicts both a perspective and side view of portions of a camera lens housing and features to interface it to a space frame facet.
Figure 15C:
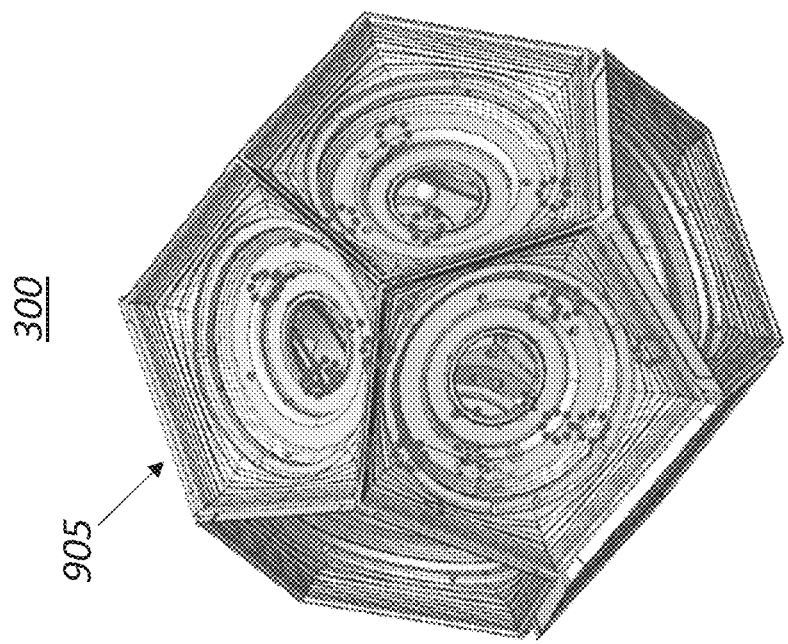
FIG. 15B and FIG. 15C depict the assembly of camera lens housings to a space frame.

An improved panoramic multi-camera capture device 300, such as that of FIG. 15C, can have a plurality of camera channels 320 arranged around a circumference of a sphere to capture a 360-degree annular FOV, including as suggested in FIG. 15C with camera channels 920 or lens housings 905. Alternately, a panoramic multi-camera capture device can have a plurality of cameras arranged around a spherical or polyhedral shape. A polyhedron is a three-dimensional solid consisting of a collection of polygons that are contiguous at the edges. One polyhedral shape, as shown in FIG. 4, is that of a dodecahedron 50, which has 12 sides or faces, each shaped as a regular pentagon 55, and 20 vertices or corners (e.g., a vertex 60). A panoramic multi-camera capture device formed to the dodecahedron shape has cameras with a pentagonally shaped outer lens elements that nominally image a 69.1° full width field of view. Another shape is that of a truncated icosahedron, like a soccer ball, which as is also shown in FIG. 4, and has a combination of 12 regular pentagonal sides or faces, 20 regular hexagonal sides or faces, 60 vertices, and 90 edges. More complex shapes, with many more sides, such as regular polyhedra, Goldberg polyhedra, or shapes with octagonal sides, or even some irregular polyhedral shapes, can also be useful. For example, a Goldberg chamfered dodecahedron is similar to the truncated icosahedron, with both pentagonal and hexagonal facets, totaling 42 sides. But in general, the preferred polyhedrons for the current purpose have sides or faces that are hexagonal or pentagonal, which are generally roundish shapes with beveled edges 132 meeting at obtuse corners. Other polyhedral shapes, such as an octahedron or a regular icosahedron can be used, although they have triangular facets. Polyhedral facets with more abrupt or acute corners, such as square or triangular faces, can be easier to fabricate, as compared to facets with pentagonal and or hexagonal facets, as they have fewer edges to cut to provide polygonal edges on the outermost lens element, so as to define a captured polygonal FOV. However, greater care can then be needed in cutting, beveling, and handling the optic because of those acute corners. Additionally, for lens facets with large FOVs and acute facet angles, it can be more difficult to design the camera lenses and camera lens housings for optical and opto-mechanical performance. Typically, a 360° polyhedral camera will not capture a full spherical FOV as at least part of one facet is sacrificed to allow for support features and power and communications cabling, such as via a mounting post. However, if the device communicates wirelessly, and is also hung by a thin cable to a vertex, the FOV lost to such physical connections can be reduced.

As depicted in FIG. 1 and FIG. 2B, a camera channel 120 can resembles a frustum, or a portion thereof, where a frustum is a geometric solid (normally a cone or pyramid)

that lies between one or two parallel planes that cut through it. In that context, a fan of chief rays 170 corresponding to a polygonal edge, can be refracted by an outer compressor lens element 137 to nominally match the frustum edges in polyhedral geometries.

To help illustrate some issues relating to camera geometry, FIG. 5A illustrates a cross-sections of a pentagonal lens 175 capturing a pentagonal FOV 177 and a hexagonal lens 180 capturing a hexagonal FOV 182, representing a pair of adjacent cameras whose outer lens elements have pentagonal and hexagonal shapes, as can occur with a truncated icosahedron, or soccer ball type panoramic multi-camera capture devices (e.g., 100, 300). The theoretical hexagonal FOV 182 spans a half FOV of 20.9°, or a full FOV of 41.8° ($\theta_1$) along the sides, although the FOV near the vertices is larger. The pentagonal FOV 177 supports 36.55° FOV ($\theta_2$) within a circular region, and larger FOVs near the corners or vertices. Notably, in this cross-section, the pentagonal FOV 177 is asymmetrical, supporting a 20-degree FOV on one side of an optical axis 185, and only a 16.5-degree FOV on the other side of the optical axis.

Optical lenses are typically designed using programs such as ZEMAX or Code V. Design success typically depends, in part, on selecting the best or most appropriate lens parameters, identified as operands, to use in the merit function. This is also true when designing a lens system for an improved low-parallax multi-camera panoramic capture device (300), for which there are several factors that affect performance (including, particularly parallax) and several parameters that can be individually or collectively optimized, so as to control it. One approach targets optimization of the "NP" point, or more significantly, variants thereof.

As background, in the field of optics, there is a concept of the entrance pupil, which is a projected image of the aperture stop as seen from object space, or a virtual aperture which the imaged light rays from object space appear to propagate towards before any refraction by the first lens element. By standard practice, the location of the entrance pupil can be found by identifying a paraxial chief ray from object space 105, that transits through the center of the aperture stop, and projecting or extending its object space direction forward to the location where it hits the optical axis 185. In optics, incident Gauss or paraxial rays are understood to reside within an angular range ≤10° from the optical axis, and correspond to rays that are directed towards the center of the aperture stop, and which also define the entrance pupil position. Depending on the lens properties, the entrance pupil may be bigger or smaller than the aperture stop, and located in front of, or behind, the aperture stop.

By comparison, in the field of low-parallax cameras, there is a concept of a no-parallax (NP) point, or viewpoint center. Conceptually, the "NP Point" has been associated with a high FOV chief ray or principal ray incident at or near the outer edge of the outermost lens element, and projecting or extending its object space direction forward to the location where it hits the optical axis 185. For example, depending on the design, camera channels in a panoramic multi-camera capture device can support half FOVs with non-paraxial chief rays at angles >31° for a dodecahedron type system (FIG. 4) or >20° for a truncated icosahedron type system (see FIG. 4 and FIG. 5A). This concept of the NP point projection has been applied to the design of panoramic multi-camera capture devices, relative to the expectations for chief ray propagation and parallax control for adjacent optical systems (cameras). It is also stated that if a camera is pivoted about the NP point, or a plurality of camera's appear to rotate about a common NP point, then parallax errors will be reduced, and images can be aligned with little or no parallax error or perspective differences. But in the field of low parallax cameras, the NP point has also been equated to the entrance pupil, and the axial location of the entrance pupil that is estimated using a first order optics tangent relationship between a projection of a paraxial field angle and the incident ray height at the first lens element (see FIGS. 2A, 2B).

Thus, confusingly, in the field of designing of low-parallax cameras, the NP point has also been previously associated with both with the projection of edge of FOV chief rays and the projection of chief rays that are within the Gauss or paraxial regime. As will be seen, in actuality, they both have value. In particular, an NP point associated with the paraxial entrance pupil can be helpful in developing initial specifications for designing the lens, and for describing the lens. An NP point associated with non-paraxial edge of field chief rays can be useful in targeting and understanding parallax performance and in defining the conical volume or frustum that the lens assembly can reside in.

The projection of these non-paraxial chief rays can miss the paraxial chief ray defined entrance pupil because of both lens aberrations and practical geometry related factors associated with these lens systems. Relative to the former, in a well-designed lens, image quality at an image plane is typically prioritized by limiting the impact of aberrations on resolution, telecentricity, and other attributes. Within a lens system, aberrations at interim surfaces, including the aperture stop, can vary widely, as the emphasis is on the net sums at the image plane. Aberrations at the aperture stop are often somewhat controlled to avoid vignetting, but a non-paraxial chief ray need not transit the center of the aperture stop or the projected paraxially located entrance pupil.

To expand on these concepts, and to enable the design of improved low parallax lens systems, it is noted that the camera lens system 120 in FIG. 2A depicts both a first NP point 190A, corresponding to the entrance pupil as defined by a vectoral projection of paraxial chief rays from object space 105, and an offset second NP point 190B, corresponding to a vectoral projection of a non-paraxial chief rays from object space. Both of these ray projections cross the optical axis 185 in locations behind both the lens system and the image plane 150. As will be subsequently discussed, the ray behavior in the region between and proximate to the projected points 190A and 190B can be complicated and neither projected location or point has a definitive value or size. A projection of a chief ray will cross the optical axis at a point, but a projection of a group of chief rays will converge towards the optical axis and cross at different locations, that can be tightly clustered (e.g., within a few or tens of microns), where the extent or size of that "point" can depends on the collection of proximate chief rays used in the analysis. Whereas, when designing low parallax imaging lenses that image large FOVs, the axial distance or difference between the NP points 190A and 190B that are provided by the projected paraxial and non-paraxial chief rays can be significantly larger (e.g., millimeters). Thus, as will also be discussed, the axial difference represents a valuable measure of the parallax optimization (e.g., a low parallax volume 188) of a lens system designed for the current panoramic capture devices and applications. As will also be seen, the design of an improved device (300) can be optimized to position the geometric center of the device, or device center 196, outside, but proximate to this low parallax volume 188, or alternately within it, and preferably proximate to a non-paraxial chief ray NP point.

As one aspect, FIG. 5A depicts the projection of the theoretical edge of the fields of view (FOV edges 155), past the outer lens elements (lenses 175 and 180) of two adjacent cameras, to provide lines directed to a common point (190). These lines represent theoretical limits of the complex "conical" opto-mechanical lens assemblies, which typically are pentagonally conical or hexagonally conical limiting volumes. Again, ideally, in a no-parallax multi-camera system, the entrance pupils or NP points of two adjacent cameras are co-located. But to avoid mechanical conflicts, the mechanics of a given lens assembly, including the sensor package, should generally not protrude outside a frustum of a camera system and into the conical space of an adjacent lens assembly. However, real lens assemblies in a multi-camera panoramic capture device are also separated by seams 160. Thus, the real chief rays 170 that are accepted at the lens edges, which are inside of both the mechanical seams and a physical width or clear aperture of a mounted outer lens element (lenses 175 and 180), when projected generally towards a paraxial NP point 190, can land instead at offset NP points 192, and be separated by an NP point offset distance 194.

This can be better understood by considering the expanded area A-A in proximity to a nominal or ideal point NP 190, as shown in detail in FIG. 5B. Within a hexagonal FOV 182, light rays that propagate within the Gauss or paraxial region (e.g., paraxial ray 173), and that pass through the nominal center of the aperture stop, can be projected to a nominal NP point 190 (corresponding to the entrance pupil), or to an offset NP point 190A at a small NP point difference or offset 193 from a nominal NP point 190. Whereas, the real hexagonal lens edge chief rays 170 associated with a maximum inscribed circle within a hexagon, can project to land at a common offset NP point 192A that can be at a larger offset distance (194A). The two adjacent cameras in FIGS. 5A,B also may or may not share coincident NP points (e.g., 190). Distance offsets can occur due to various reasons, including geometrical concerns between cameras (adjacent hexagonal and pentagonal cameras), geometrical asymmetries within a camera (e.g., for a pentagonal camera), or from limitations from the practical widths of seams 160, or because of the directionality difference amongst aberrated rays.

As just noted, there are also potential geometric differences in the projection of incident chief rays towards a simplistic nominal "NP point" (190). First, incident imaging light paths from near the corners or vertices or mid-edges (mid-chords) of the hexagonal or pentagonal lenses may or may not project to common NP points within the described range between the nominal paraxial NP point 190 and an offset NP point 192B. Also, as shown in FIG. 5B, just from the geometric asymmetry of the pentagonal lenses, the associated pair of edge chief rays 170 and 171 for the real accepted FOV, can project to different nominal NP points 192B that can be separated from both a paraxial NP point (190) by an offset distance 194B and from each other by an offset distance 194C.

As another issue, during lens design, the best performance typically occurs on axis, or near on axis (e.g., ≤0.3 field (normalized)), near the optical axis 185. In many lenses, good imaging performance, by design, often occurs at or near the field edges, where optimization weighting is often used to force compliance. The worst imaging performance can then occur at intermediate fields (e.g., 0.7-0.8 of a normalized image field height). Considering again FIG. 5A,B, intermediate off axis rays, from intermediate fields (θ) outside the paraxial region, but not as extreme as the edge chief rays (10°<θ<20.9°), can project towards intermediate NP points between a nominal NP point 190 and an offset NP point 192B. But other, more extreme off axis rays, particularly from the 0.7-0.8 intermediate fields, that are more affected by aberrations, can project to NP points at locations that are more or less offset from the nominal NP point 190 than are the edge of field offset NP points 192B. Accounting for the variations in lens design, the non-paraxial offset "NP" points can fall either before (closer to the lens) the paraxial NP point (the entrance pupil) as suggested in FIG. 5B, or after it (as shown in FIG. 2A).

Figure 5C:
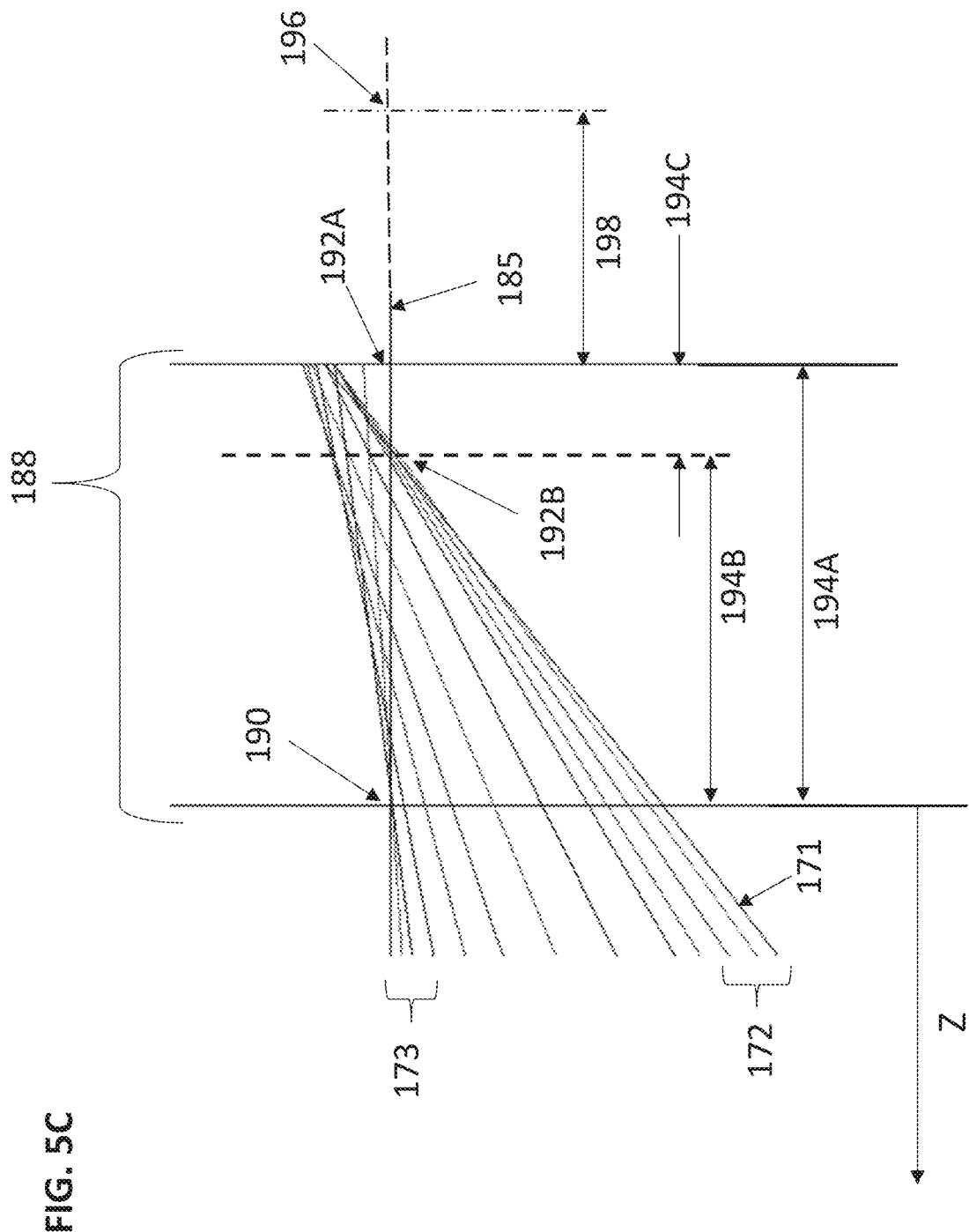
FIG. 5C depicts an example of a low parallax (LP) volume located near both a paraxial NP point or entrance pupil and a device center.

This is shown in greater detail in FIG. 5C, which essentially illustrates a further zoomed-in region A-A of FIG. 5B, but which illustrates an impact from vectoral projected ray paths associated with aberrated image rays, that converge at and near the paraxial entrance pupil (190), for an imaging lens system that was designed and optimized using the methods of the present approach. In FIG. 5C, the projected ray paths of green aberrated image rays at multiple fields from a camera lens system converge within a low parallax volume 188 near one or more "NP" points. Similar illustrations of ray fans can also be generated for Red or Blue light. The projection of paraxial rays 173 can converge at or near a nominal paraxial NP point 190, or entrance pupil, located on a nominal optical axis 185 at a distance Z behind the image plane 150. The projection of edge of field rays 172, including chief rays 171, converge at or near an offset NP point 192B along the optical axis 185. The NP point 192B can be quantitatively defined, for example, as the center of mass of all edge of field rays 172. An alternate offset NP point 192A can be identified, that corresponds to a "circle of least confusion", where the paraxial, edge, and intermediate or mid-field rays, aggregate to the smallest spot. These different "NP" points are separated from the paraxial NP point by offset distances 194A and 194B, and from each other by an offset distance 194C. Thus, it can be understood that an aggregate "NP point" for any given real imaging lens assembly or camera lens that supports a larger than paraxial FOV, or an asymmetrical FOV, is typically not a point, but instead can be an offset low parallax (LP) smudge or volume 188.

Within a smudge or low parallax volume 188, a variety of possible optimal or preferred NP points can be identified. For example, an offset NP point corresponding to the edge of field rays 172 can be emphasized, so as to help provide improved image tiling. An alternate mid-field (e.g., 0.6-0.8) NP point (not shown) can also be tracked and optimized for. Also the size and position of the overall "LP" smudge or volume 188, or a preferred NP point (e.g., 192B) therein, can change depending on the lens design optimization. Such parameters can also vary amongst lenses, for one fabricated lens system of a given design to another, due to manufacturing differences amongst lens assemblies. Although FIG. 5C depicts these alternate offset "NP points" 192A,B for non-paraxial rays as being located after the paraxial NP point 190, or further away from the lens and image plane, other lenses of this type, optimized using the methods of the present approach, can be provided where similar non-paraxial NP points 192A,B that are located with a low parallax volume 188 can occur at positions between the image plane and the paraxial NP point.

FIG. 5C also shows a location for a center of the low-parallax multi-camera panoramic capture device, device center 196. Based on optical considerations, an improved panoramic multi-camera capture device 300 can be preferably optimized to nominally position the device center 196 within the low parallax volume 188. Optimized locations therein can include being located at or proximate either of the offset NP points 192A or 192B, or within the offset distance 194B between them, so as to prioritize parallax control for the edge of field chief rays. The actual position therein depends on parallax optimization, which can be determined by the lens optimization relative to spherical aberration of the entrance pupil, or direct chief ray constraints, or distortion, or a combination thereof. For example, whether the spherical aberration is optimized to be over corrected or under corrected, and how weightings on the field operands in the merit function are used, can affect the positioning of non-paraxial "NP" points for peripheral fields or mid fields. The "NP" point positioning can also depend on the management of fabrication tolerances and the residual variations in lens system fabrication. The device center 196 can also be located proximate to, but offset from the low parallax volume 188, by a center offset distance 198. This approach can also help tolerance management and provide more space near the device center 196 for cables, circuitry, cooling hardware, and the associated structures. In such case, the adjacent cameras 120 can then have offset low parallax volumes 188 of "NP" points (FIG. 5D), instead of coincident ones (FIGS. 5A, B). In this example, if the device center 196 is instead located at or proximate to the paraxial entrance pupil, NP point 190, then effectively one or more of the outer lens elements 137 of the cameras 120 are undersized and the desired full FOVs are not achievable.

Thus, while the no-parallax (NP) point is a useful concept to work towards, and which can valuably inform panoramic image capture and systems design, and aid the design of low-parallax error lenses, it is idealized, and its limitations must also be understood. Considering this discussion of the NP point(s) and LP smudges, in enabling an improved low-parallax multi-camera panoramic capture device (e.g., lens design 320 of FIG. 8), it is important to understand ray behavior in this regime, and to define appropriate parameters or operands to optimize, and appropriate target levels of performance to aim for. In the latter case, for example, a low parallax lens with a track length of 65-70 mm can be designed for in which the LP smudge is as much as 10 mm wide (e.g., offset distance 194A). But alternate lens designs, for which this parameter is further improved, can have a low parallax volume 188 with a longitudinal LP smudge width or width along the optical axis (offset 194A) of a few millimeters or less.

The width and location of the low parallax volume 188, and the vectoral directions of the projections of the various chief rays, and their NP point locations within a low parallax volume, can be controlled during lens optimization by a method using operands associated with a fan of chief rays 170 (e.g., FIGS. 2A,B). But the LP smudge or LP volume 188 of FIG. 5C can also be understood as being a visualization of the transverse component of spherical aberration of the entrance pupil, and this parameter can be used in an alternate, but equivalent, design optimization method to using chief ray fans. In particular, during lens optimization, using Code V for example, the lens designer can create a special user defined function or operand for the transverse component (e.g., ray height) of spherical aberration of the entrance pupil, which can then be used in a variety of ways. For example, an operand value can be calculated as a residual sum of squares (RSS) of values across the whole FOV or across a localized field, using either uniform or non-uniform weightings on the field operands. In the latter case of localized field preferences, the values can be calculated for a location at or near the entrance pupil, or elsewhere within a low parallax volume 188, depending on the preference towards paraxial, mid, or peripheral fields. An equivalent operand can be a width of a circle of least confusion in a plane, such as the plane of offset NP point 192A or that of offset NP 192B, as shown in FIG. 5C. The optimization operand can also be calculated with a weighting to reduce or limit parallax error non-uniformly across fields, with a disproportionate weighting favoring peripheral or edge fields over mid-fields. Alternately, the optimization operand can be calculated with a weighting to provide a nominally low parallax error in a nominally uniform manner across all fields (e.g., within or across a Core FOV 205, as in FIG. 7). That type of optimization may be particularly useful for mapping applications.

The concept of parallax correction, with respect to centers of perspective, is illustrated in FIG. 5D. A first camera lens 120A collects and images light from object space 105 into at least a Core FOV, including light from two outer ray fans 179A and 179B, whose chief ray projections converge towards a low parallax volume 188A. These ray fans can correspond to a group of near edge or edge of field rays 172, as seen in FIG. 2B or FIG. 5C. As was shown in FIG. 5C, within an LP volume 188, the vectoral projection of such rays from object space, generally towards image space, can cross the optical axis 185 beyond the image plane, at or near an alternate NP point 192B that can be selected or preferred because it favors edge of field rays. However, as is also shown in FIG. 5C, such edge of field rays 172 need not cross the optical axis 185 at exactly the same point. Those differences, when translated back to object space 105, translate into small differences in the parallax or perspective for imaged ray bundles or fans within or across an imaged FOV (e.g., a Core FOV 205, as in FIG. 7) of a camera lens.

A second, adjacent camera lens 120B, shown in FIG. 5D, can provide a similar performance, and image a fan of chief rays 170, including ray fan 179C, from within a Core FOV 205 with a vectoral projection of these chief rays converging within a corresponding low parallax volume 188B. LP volumes 188A and 188B can overlap or be coincident, or be offset, depending on factors including the camera geometries and the seams between adjacent cameras, or lens system fabrication tolerances and compensators, or on whether the device center 196 is offset from the LP volumes 188. The more overlapped or coincident these LP volumes 188 are, the more overlapped are the centers of perspective of the two lens systems. Ray Fan 179B of camera lens 120A and ray fan 179C of camera lens 120B are also nominally parallel to each other; e.g., there is no parallax error between them. However, even if the lens designs allow very little residual parallax errors at the FOV edges, fabrication variations between lens systems can increase the differences.

Analytically, the chief ray data from a real lens can also be expressed in terms of perspective error, including chromatic errors, as a function of field angle. Perspective error can then be analyzed as a position error at the image between two objects located at different distances or directions. Perspective errors can depend on the choice of COP location, the angle within the imaged FOV, and chromatic errors. For example, it can be useful to prioritize a COP so as to minimize green perspective errors. Perspective differences or parallax errors can be reduced by optimizing a chromatic axial position ($\Delta z$) or width within an LP volume 188 related to a center of perspective for one or more field angles within an imaged FOV. The center of perspective can also be graphed and analyzed as a family of curves, per color, of the Z (axial) intercept position (distance in mm) versus field angle. Alternately, to get a better idea of what a captured image will look like, the COP can be graphed and analyzed as a family of curves for a camera system, as a parallax error in image pixels, per color, versus field.

Figure 7:
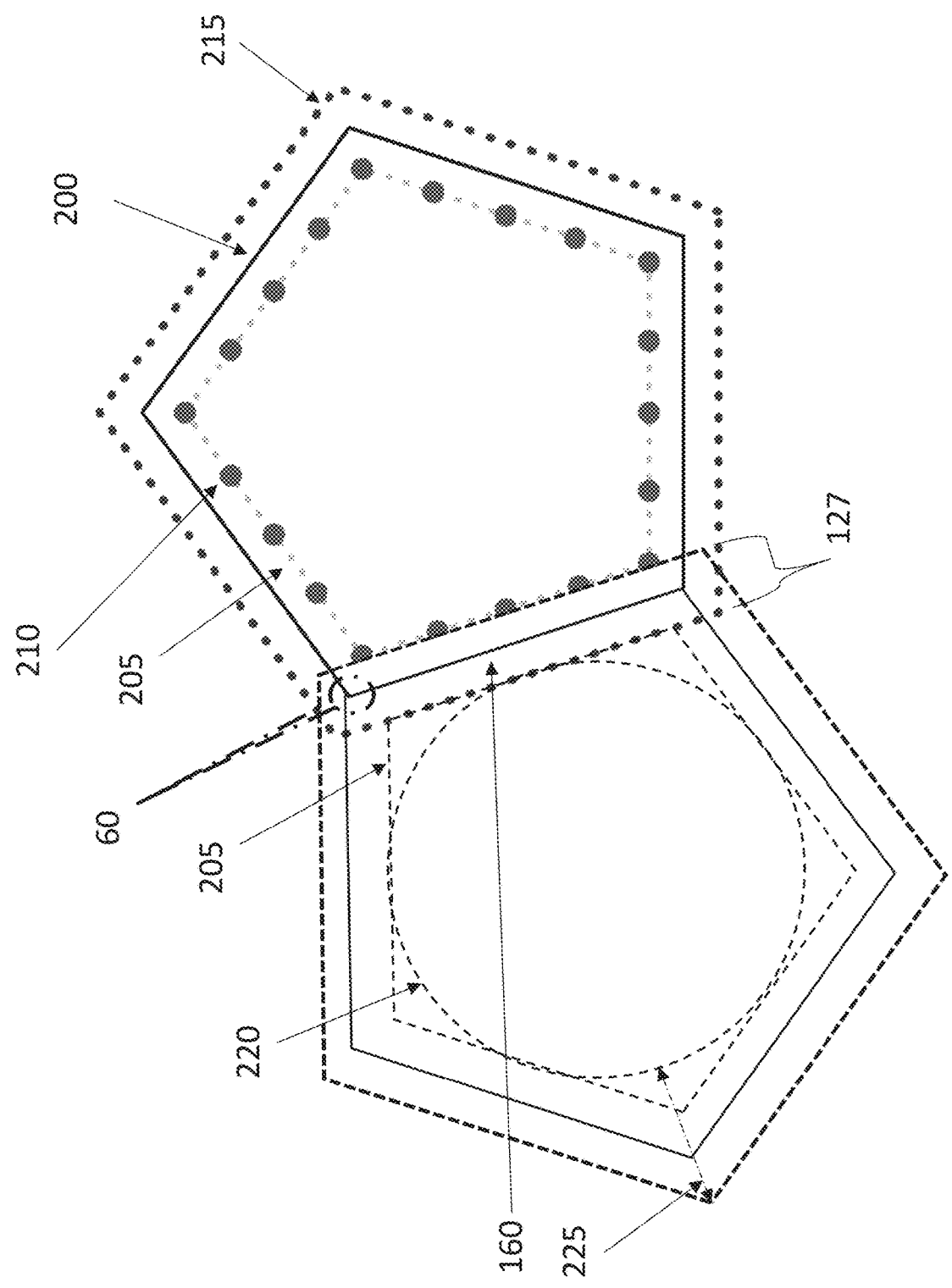
FIG. 7 depicts fields of view for adjacent cameras, including both Core and Extended fields of view (FOV), both of which can be useful for the design of an optimized panoramic multi-camera capture device.

During the design or a camera systems, a goal can be to limit the parallax error to a few pixels or less for imaging within a Core FOV 205 (FIG. 7). Alternately, it can be preferable to particularly limit parallax errors in the peripheral fields, e.g., for the outer edges of a Core FOV and for an Extended FOV region (if provided). If the residual parallax errors for a camera are thus sufficiently small, then the parallax differences seen as a perspective error between two adjacent cameras near their shared seam 160, or within a seam related region of extended FOV overlap imaging, can likewise be limited to several pixels or less (e.g., ≤3-4 pixels). Depending on the lens design, device design, and application, it can be possible and preferable to reduce parallax errors for a lens system further, as measured by perspective error, to ≤0.5 pixel for an entire Core FOV, the peripheral fields, or both. If these residual parallax errors for each of two adjacent cameras are small enough, images can be acquired, cropped, and readily tiled, while compensating for or hiding image artifacts from any residual seams 160 or blind regions 165.

In pursuing the design of a panoramic camera of the type of that of FIG. 1, but to enable an improved low-parallax multi-camera panoramic capture device (300), having multiple adjacent cameras, the choices of lens optimization methods and parameters can be important. A camera lens 120, or system of lens elements 135, like that of FIG. 2A, can be used as a starting point. The camera lens has compressor lens element(s), and inner lens elements 140, the latter of which can also be defined as consisting of a pre-stop wide angle lens group, and a post-stop eyepiece-like lens group. In designing such lenses to reduce parallax errors, it can be valuable to consider how a fan of paraxial to non-paraxial chief rays 125 (see FIG. 2A), or a fan of edge chief rays 170 (see FIG. 2B), or localized collections of edge of field rays 172 (see FIG. 5C) or 179 A,B (see FIG. 5D) are imaged by a camera lens assembly. It is possible to optimize the lens design by using a set of merit function operands for a collection or set (e.g., 31 defined rays) of chief rays, but the optimization process can then become cumbersome. As an alternative, in pursuing the design of an improved low-parallax multi-camera panoramic capture device (300), it was determined that improved performance can also be obtained by using a reduced set of ray parameters or operands that emphasizes the transverse component of spherical aberration at the entrance pupil, or at a similar selected surface or location (e.g., at an offset NP point 192A or 192B) within an LP smudge volume 188 behind the lens system. Optimization for a transverse component of spherical aberration at an alternate non-paraxial entrance pupil can be accomplished by using merit function weightings that emphasize the non-paraxial chief rays.

As another aspect, in a low-parallax multi-camera panoramic capture device, the fans of chief rays 170 that are incident at or near a beveled edge of an outer lens element of a camera 120 (see FIG. 2B) should be parallel to a fan of chief rays 170 that are incident at or near an edge 132 of a beveled surface of the outer lens element of an adjacent camera (see FIG. 1). It is noted that an "edge" of an outer lens element 137 or compressor lens is a 3-dimensional structure (see FIG. 2B), that can have a flat edge cut through a glass thickness, and which is subject to fabrication tolerances of that lens element, the entire lens assembly, and housing 130, and the adjacent seam 160 and its structures. The positional definition of where the beveled edges are cut into the outer lens element depends on factors including the material properties, front color, distortion, parallax correction, tolerances, and an extent of any extra extended FOV 215. An outer lens element 137 becomes a faceted outer lens element when beveled edges 132 are cut into the lens, creating a set of polygonal shaped edges that nominally follow a polygonal pattern (e.g., pentagonal or hexagonal).

A camera system 120 having an outer lens element with a polygonal shape that captures incident light from a polygonal shaped field of view can then form a polygonal shaped image at the image plane 150, wherein the shape of the captured polygonal field of view nominally matches the shape of the polygonal outer lens element. The cut of these beveled edges for a given pair of adjacent cameras can affect both imaging and the optomechanical construction at or near the intervening seam 160.

Figure 5E:
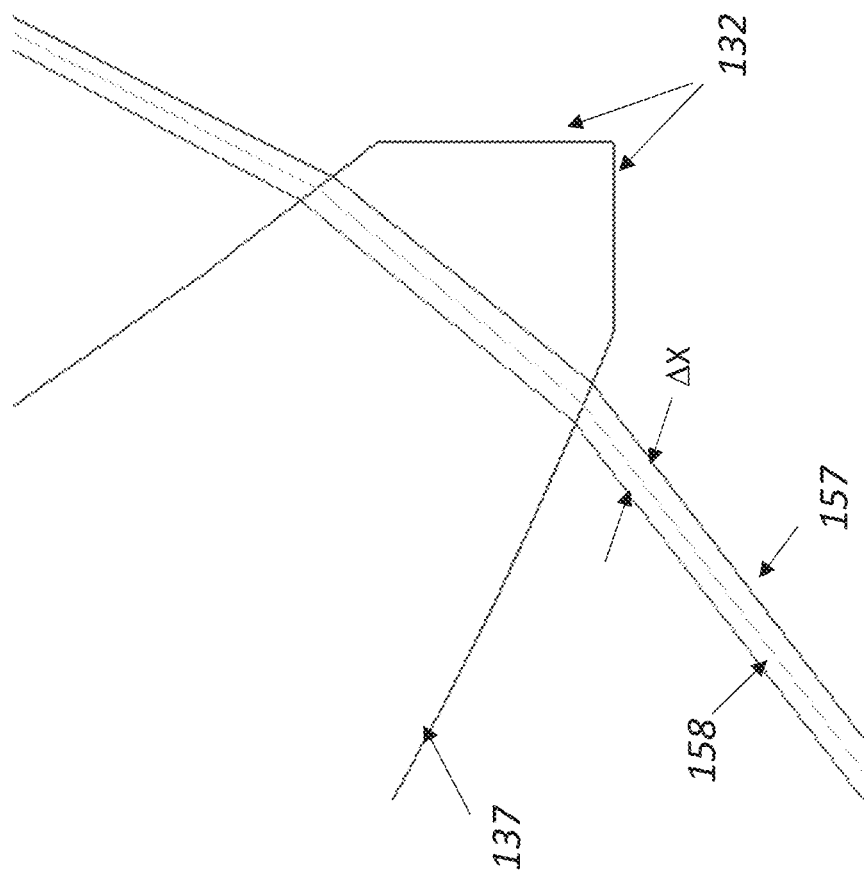
FIG. 5E depicts front color at an edge of an outer compressor lens element.

As another aspect, FIG. 5E depicts "front color", which is a difference in the nominal ray paths by color versus field, as directed to an off axis or edge field point. Typically, for a given field point, the blue light rays are the furthest offset. As shown in FIG. 5E, the accepted blue ray 157 on a first lens element 137 is $\Delta X \approx 1$ mm further out than the accepted red ray 158 directed to the same image field point. If the lens element 137 is not large enough, then this blue light can be clipped or vignetted and a color shading artifact can occur at or near the edges of the imaged field. Front color can appear in captured image content as a narrow rainbow-like outline of the polygonal FOV or the polygonal edge of an outer compressor lens element 437 which acts as a field stop for the optical system. Localized color transmission differences that can cause front color related color shading artifacts near the image edges can be caused by differential vignetting at the beveled edges of the outer compressor lens element 137, or from edge truncation at compressor lens elements 438 (FIG. 13A), or through the aperture stop 145. During lens design optimization to provide an improved camera lens (320), front color can be reduced (e.g., to $\Delta X \leq 0.5$ mm width) as part of the chromatic correction of the lens design, including by glass selection within the compressor lens group or the entire lens design, or as a trade-off in the correction of lateral color. The effect of front color on captured images can also be reduced optomechanically, by designing an improved camera lens (320) to have an extended FOV 215 (FIG. 7), and also the opto-mechanics to push straight cut or beveled lens edges 132 at or beyond the edge of the extended FOV 215, so that any residual front color occurs outside the core FOV 220. The front color artifact can then be eliminated during an image cropping step during image processing. The impact of front color or lateral color can also be reduced by a spatially variant color correction during image processing. As another option, an improved camera lens (320) can have a color dependent aperture at or near the aperture stop, that can, for example, provide a larger transmission aperture (diameter) for blue light than for red or green light.

Optical performance at or near the seams can be understood, in part, relative to distortion (FIG. 6) and a set of defined fields of view (FIG. 7). In particular, FIG. 7 depicts potential sets of fields of view for which potential image light can be collected by two adjacent cameras. As an example, a camera with a pentagonally shaped outer lens element, whether associated with a dodecahedron or truncated icosahedron or other polygonal lens camera assembly, with a seam 160 separating it from an adjacent lens or camera channel, can image an ideal FOV 200 that extends out to the vertices (60) or to the polygonal edges of the frustum or conical volume that the lens resides in. However, because of the various physical limitations that can occur at the seams, including the finite thicknesses of the lens housings, the physical aspects of the beveled lens element edges, mechanical wedge, and tolerances, a smaller core FOV 205 of transiting image light can actually be imaged. The coated clear aperture for the outer lens elements 137 should encompass at least the core FOV 205 with some margin (e.g., 0.5-1.0 mm). As the lens can be fabricated with AR coatings before beveling, the coatings can extend out to the seams. The core FOV 205 can be defined as the largest low parallax field of view that a given real camera 120 can image. Equivalently, the core FOV 205 can be defined as the sub-FOV of a camera channel whose boundaries are nominally parallel to the boundaries of its polygonal cone (see FIGS. 5A and 5B). Ideally, with small seams 160, and proper control and calibration of FOV pointing, the nominal Core FOV 205 approaches or matches the ideal FOV 200 in size.

During a camera alignment and calibration process, a series of image fiducials 210 can be established along one or more of the edges of a core FOV 205 to aid with image processing and image tiling or mosaicing. The resulting gap between a core FOV 205 supported by a first camera and that supported by an adjacent camera can result in blind regions 165 (FIG. 5A, B). To compensate for the blind regions 165, and the associated loss of image content from a scene, the cameras can be designed to support an extended FOV 215, which can provide enough extra FOV to account for the seam width and tolerances, or an offset device center 196. As shown in FIG. 7, the extended FOV 215 can extend far enough to provide overlap 127 with an edge of the core FOV 205 of an adjacent camera, although the extended FOVs 215 can be larger yet. This limited image overlap can result in a modest amount of image resolution loss, parallax errors, and some complications in image processing as were previously discussed with respect to FIG. 3, but it can also help reduce the apparent width of seams and blind regions. However, if the extra overlap FOV is modest (e.g., ≤5%) and the residual parallax errors therein are small enough (e.g. ≤0.75 pixel perspective error), as provided by the present approach, then the image processing burden can be very modest. Image capture out to an extended FOV 215 can also be used to enable an interim capture step that supports camera calibration and image corrections during the operation of an improved panoramic multi-camera capture device 300. FIG. 7 also shows an inscribed circle within one of the FOV sets, corresponding to a subset of the core FOV 205, that is the common core FOV 220 that can be captured in all directions from that camera. The angular width of the common core FOV 220 can be useful as a quick reference for the image capacity of a camera. An alternate definition of the common core FOV 220 that is larger, to include the entire core FOV 205, can also be useful. The dashed line (225) extending from the common core FOV 220 or core FOV 205, to beyond the ideal FOV 200, to nominally include the extended FOV 215, represents a region in which the lens design can support careful mapping of the chief or principal rays or control of spherical aberration of the entrance pupil, so as to enable low-parallax error imaging and easy tiling of images captured by adjacent cameras.

Across a seam 160 spanning the distance between two adjacent usable clear apertures between two adjacent cameras, to reduce parallax and improve image tiling, it can be advantageous if the image light is captured with substantial straightness, parallelism, and common spacing over a finite distance. The amount of FOV overlap needed to provide an extended FOV and limit blind regions can be determined by controlling the relative proximity of the entrance pupil (paraxial NP point) or an alternate preferred plane within a low parallax volume 188 (e.g., to emphasize peripheral rays) to the device center 196 (e.g., to the center of a dodecahedral shape). The amount of Extended FOV 215 is preferably 5% or less (e.g., ≤1.8° additional field for a nominal Core FOV of 37.5°), such that a camera's peripheral fields are then, for example, ~0.85-1.05). If spacing constraints at the device center, and fabrication tolerances, are well managed, the extended FOV 215 can be reduced to ≤1% additional field. Within an extended FOV 215, parallax should be limited to the nominal system levels, while both image resolution and relative illumination remain satisfactory. The parallax optimization to reduce parallax errors can use either chief ray or pupil aberration constraints, and targeting optimization for a high FOV region (e.g., 0.85-1.0 field), or beyond that to include the extra camera overlap regions provided by an extended FOV 215 (e.g., FIG. 7, a fractional field range of ~0.85-1.05).

In addition, in enabling an improved low-parallax multi-camera panoramic capture device (300), with limited parallax error and improved image tiling, it can be valuable to control image distortion for image light transiting at or near the edges of the FOV, e.g., the peripheral fields, of the outer lens element. In geometrical optics, distortion is a deviation from a preferred condition (e.g., rectilinear projection) that straight lines in a scene remain straight in an image. It is a form of optical aberration, which describes how the light rays from a scene are mapped to the image plane. In general, in lens assemblies used for image capture, for human viewing it is advantageous to limit image distortion to a maximum of +/−2%. In the current application, for tiling or combining panoramic images from images captured by adjacent cameras, having a modest distortion of ≤2% can also be useful. As a reference, in barrel distortion, the image magnification decreases with distance from the optical axis, and the apparent effect is that of an image which has been mapped around a sphere (or barrel). Fisheye lenses, which are often used to take hemispherical or panoramic views, typically have this type of distortion, as a way to map an infinitely wide object plane into a finite image area. Fisheye lens distortion (251) can be large (e.g., 15% at full field or 90° half width (HW)), as a deviation from f-theta distortion, although it is only a few percent for small fields (e.g., ≤30° HW). As another example, in laser printing or scanning systems, f-theta imaging lenses are often used to print images with minimal banding artifacts and image processing corrections for pixel placement. In particular, F-theta lenses are designed with a barrel distortion that yields a nearly constant spot or pixel size, and a pixel positioning that is linear with field angle θ, (h=f*θ).

Thus, improved low-parallax cameras 320 that capture half FOVs of ≤35-40° might have fisheye distortion 251, as the distortion may be low enough. However, distortion can be optimized more advantageously for the design of improved camera lens assemblies for use in improved low-parallax multi-camera panoramic capture devices (300). As a first example, as shown in FIG. 6, it can be advantageous to provide camera lens assemblies with a localized nominal f-theta distortion 250A at or near the edge of the imaged field. In an example, the image distortion 250 peaks at ~0.75 field at about 1%, and the lens design is not optimized to provide f-theta distortion 250 below ~0.85 field. However, during the lens design process, a merit function can be constrained to provide a nominally f-theta like distortion 250A or an approximately flat distortion 250B, for the imaged rays at or near the edge of the field, such as for peripheral fields spanning a fractional field range of ~0.9-1.0. This range of high fields with f-theta type or flattened distortion correction includes the fans of chief rays 170 or perimeter rays of FIG. 2B, including rays imaged through the corners or vertices 60, such as those of a lens assembly with a hexagonal or pentagonal outer lens element 137. Additionally, because of manufacturing tolerances and dynamic influences (e.g., temperature changes) that can apply to a camera 120, including both lens elements 135 and a housing 130, and to a collection of cameras 120 in a panoramic multi-camera capture device, it can be advantageous to extend the region of nominal f-theta or flattened distortion correction in peripheral fields to beyond the nominal full field (e.g., 0.85-1.05). This is shown in FIG. 6, where a region of reduced or flattened distortion extends beyond full field to ~1.05 field. In such a peripheral field range, it can be advantageous to limit the total distortion variation to ≤0.5% or less. Controlling peripheral field distortion keeps the image "edges" straight in the adjacent pentagonal shaped regions. This can allow more efficient use of pixels when tiling images, and thus faster image processing.

The prior discussion treats distortion in a classical sense, as an image aberration at an image plane. However, in low-parallax cameras, this residual distortion is typically a tradeoff or nominal cancelation of contributions from the compressor lens elements (137, or 437 and 438 in FIG. 13A) versus those of the aggregate inner lens elements (140, or 440 in FIG. 13A). Importantly, the ray re-direction caused by the distortion contribution of the outer compressor lens element also affects both the imaged ray paths and the projected chief ray paths towards the low parallax volume. This in turn means that for the design of at least some low-parallax lenses, distortion optimization can affect parallax or edge of field NP point or center of perspective optimization.

The definitions of the peripheral fields or a fractional field range 225 of (e.g., ~0.85-1.05, or including ≤5% extra field), in which parallax, distortion, relative illumination, resolution, and other performance factors can be carefully optimized to aid image tiling, can depend on the device and camera geometries. As an example, for hexagonal shaped lenses and fields, the lower end of the peripheral fields can be defined as ~0.83, and for pentagonal lenses, ~0.8. Although FIG. 7 was illustrated for a case with two adjacent pentagon-shaped outer lens elements and FOV sets, the approach of defining peripheral fields and Extended FOVs to support a small region of overlapped image capture, can be applied to multi-camera capture device designs with adjacent pentagonal and hexagonal cameras, or to adjacent hexagonal cameras, or to cameras with other polygonal shapes or with adjacent edges of any shape or contour generally.

For an Extended FOV 215 to be functionally useful, the nominal image formed onto an image sensor that corresponds to a core FOV 205 needs to underfill the used image area of the image sensor, by at least enough to allow an extended FOV 215 to also be imaged. This can be done to help account for real variations in fabricated lens assemblies from the ideal, or for the design having an offset device center 196, as well as fabrication variations in assembling an improved low-parallax multi-camera panoramic capture device (300). But as is subsequently discussed, prudent mechanical design of the lens assemblies can impact both the imaged field of view of a given camera and the seams between the cameras, to limit mechanical displacements or wedge and help reduce parallax errors and FOV overlap or underlap. Likewise, tuning the image FOV (core FOV 205) size and position with compensators or with fiducials and image centroid tracking and shape tracking can help. Taken together in some combination, optimization of distortion and low or zero parallax imaging over extended peripheral fields, careful mechanical design to limit and compensate for component and assembly variations, and the use of corrective fiducials or compensators, can provide a superior overall systems solution. As a result, a captured image from a camera can readily be cropped down to the nominal size and shape expected for the nominal core FOV 205, and images from multiple cameras can then be mosaiced or tiled together to form a panoramic image, with reduced burdens on image post-processing. However, an extended FOV 215, if needed, should provide enough extra angular width (e.g., $\theta_1 \leq 5\%$ of the FOV) to match or exceed the expected wedge or tilt angle $q_2$, that can occur in the seams, $\theta_1 \geq \theta_2$.

In designing an improved imaging lens of the type that can be used in a low-parallax panoramic multi-camera capture device (100 or 300), several first order parameters can be calculated so as to inform the design effort. A key parameter is the target size of the frustum or conical volume, based on the chosen polygonal configuration (lens size (FOV) and lens shape (e.g., pentagonal)) and the sensor package size. Other key parameters that can be estimated include the nominal location of the paraxial entrance pupil, the focal lengths of the compressor lens group and the wide-angle lens group, and the FOV seen by the wide-angle group.

But the design optimization for an improved camera lens (320) for use in an improved low-parallax panoramic multi-camera capture devices (300) also depends on how the numerous other lens attributes and performance metrics are prioritized. In particular, the relevant system parameters can include the control of parallax or the center of perspective (COP) error at the edges of an imaged field or for inner field locations or both, as optimized using fans of chief rays or spherical aberration of the entrance pupil). These parameters are closely linked with other key parameters including the width and positions of the "LP smudge" or volume 188, the size of any center offset distance between the entrance pupil or LP smudge and the device center 196, the target width of the gaps or seams, the extent of blind regions 165, and the size of any marginal or extended FOV to provide overlap. The relevant performance metrics can include image resolution or MTF, distortion (particularly in the peripheral fields, and distortion of the first compressor lens element and of the compressor lens group), lateral color, relative illumination, front color, and color vignetting, telecentricity, and ghosting. Other relevant design variables can include mechanical and materials parameters such as the number of compressor lens elements, the configuration of the compressor lens group, the wide-angle lens group and eyepiece lens group, glass choices, the allowed maximum size of the first compressor or outer lens element, the sensor package size, the track length, the nominal distance from the image plane to the nearest prior lens element (e.g., working distance), the nominal distance from the image plane to the entrance pupil, the nominal distance from the image plane or the entrance pupil to the polygonal center or device center, manufacturing tolerances and limits, and the use of compensators.

As a second illustrative example, FIG. 8 depicts a lens design for an alternate improved camera lens 320 or objective lens with lens elements 335, that is an enhanced version of the lens 120 of FIG. 2A that can be used in an improved low-parallax multi-camera panoramic capture device (300). FIG. 8 illustrates the overall lens form on the left, and a zoomed in portion that illustrates the inner lens elements 350 in greater detail, but FIG. 8 does not include an illustration of a lens housing to support these lens elements. This lens system, which is also designed for a dodecahedral system, has lens elements 335 that includes both a first lens element group or compressor lens group consisting of outer lens element 345a and compressor lens elements 345b and 345c, and inner lens elements 350. In this design, compressor elements 345b,c are not quite combined as a cemented or air space doublet. As also shown in FIG. 8, inner lens elements 350 consists of a front wide-angle lens group 365 and a rear eyepiece like lens group 367.

In FIG. 8, the lens system of camera 320 collects light rays 310 from object space 305 to provide image light 315 from a field of view 325, and directs them through lens elements 335, which consist of outer lens elements 340 and inner lens elements 350, to provide an image at an image plane 360. This lens system provides improved image quality, telecentricity, and parallax control, although these improvements are not obvious in FIG. 8. In this example, the outer lens elements 340 comprise a group of three compressor lens elements 345a, 345b, and 345c, and the optical power, or light bending burden, is shared amongst the multiple outer lens elements. Image light 310 from object space 305 is refracted and transmitted through a first lens element group or compressor lens group 340 having three lens elements, such that chief rays at 37.377 deg. at the vertices are redirected at a steep angle of ~80 deg. towards the optical axis 385.

This compressor lens element group is followed by a second lens element group or wide-angle lens element group 365, which consists of the two lens elements between the compressor lens element group and the aperture stop 355. A third lens element group or eyepiece lens group 367, which has five lens elements, redirects the transiting image light coming from the aperture stop 355 to provide image light telecentrically at F/2.8 to an image sensor at an image plane 360. As this lens is designed for a dodecahedral system, the first lens element 345a nominally accepts image light for a FOV width of 31.717 deg. at the mid-chords. The chief ray projections converge or point towards an LP smudge 392 which includes a paraxially defined entrance pupil.

Although this type of camera lens, or lens form, as exemplified by FIG. 8, with a first lens element group or compressor lens group or lens element (345a,b,c), a pre-stop second lens element group or wide angle lens group 365, and a post-stop third lens element group or eyepiece-like lens group 367, may in entirety, or in part, visually resemble a fisheye lens, it is quite different. Unlike the present lens design (e.g., FIG. 8A), a fisheye lens is an ultra-wide-angle lens that has heavily overcorrected spherical aberration of the pupil such that its entrance pupil is positioned near the front of the lens, in proximity to the first lens element. This pupil aberration also causes substantial shifts and rotations for the non-paraxial entrance pupils relative to the paraxial one. Such a lens is also reverse telephoto to provide a long back focal length, and a positive value for a ratio of the entrance pupil to image plane distance (EPID), divided by the lens focal length (EPID/EFL). A fisheye lens also provides a strong visual distortion that typically follows a monotonic curve (e.g., H=fθ (f-theta)), that images with a characteristic convex non-rectilinear appearance. The typical fisheye lens captures a nominal 180° wide full FOV, although fisheye lenses that capture images with even larger FOVs (270-310°) have been described in literature. By comparison, the improved low-parallax wide-angle camera lenses 320 of the present approach, used in an improved low-parallax multi-camera panoramic capture device (300), are purposefully designed with low distortion, particularly at or near the edges of the imaged FOV, so as to ease image cropping and tiling. Also, the present cameras, while wide angle, typically capture image light from a significantly smaller FOV than do fisheye lenses. For example, a camera for a regular dodecahedral device nominally captures images from a full width FOV of ≈63-75°. Whereas, an octahedral device can have cameras nominally capturing image light from a full width FOV of 71-110° width, a truncated icosahedral device can have cameras nominally capturing image light from a full width FOV of ≈40-45° width.

While the internal combination of the pre-stop wide angle lens group 365 and the post-stop eyepiece lens group 367, are not used as a stand-alone system for the present applications, if the compressor lens group 345a,b,c was removed, these two inner groups can also work together to form images at or near the image plane or sensor. In the optical designs of the camera lenses (320), these lens groups, and particularly the wide-angle lens group 365, visually resembles a door peeper lens design. However, while this combination of two groups of lens elements again may visually appear similar to a fisheye or door-peeper type lens, they again do not image with fisheye type f-theta lens distortion (e.g., H=fθ).

By comparison, the optical construction of the rear lens group (367), or sub-system, resembles that of an eyepiece, similar to those used as microscopic or telescopic eyepieces, but used in reverse, and without an eye being present. Eyepieces are optical systems where the entrance pupil is invariably located outside of the system. The entrance pupil of the eyepiece, where an eye would be located in a visual application, nominally overlaps with the plane where the aperture stop 355 is located. Likewise, the nominal input image plane in a visual application corresponds to the sensor plane (950) in the present application. The eyepiece lens group (367) was not designed to work with an eye, and thus does not satisfy the requirements for an actual eyepiece relative to eye relief, accommodation, FOV, and pupil size. But this eyepiece-like lens group solves a similar problem, and thus has a similar form to that of an eyepiece. Depending on the application, the optical design can more or less provide nominal optical performance similar to that of a more typical eyepiece.

This improved lens 320 of FIG. 8, is similar to the camera lens 120 of FIGS. 2A,B, but it has been designed for a more demanding set of conditions relative to parallax correction, a larger image size (4.3 mm wide), and a further removed entrance pupil to provide more room for use of a larger sensor board. This type of configuration, with multiple compressor lens elements, can be useful for color correction, as the glass types can be varied to advantageously use both crown and flint type glasses. In this example, the outer lens element 345a, or first compressor lens is a meniscus shaped lens element of SLAH52 glass, with an outer surface 338 with a radius of curvature of ~55.8 mm, and an inner surface with a radius of curvature of ~74.6 mm. Thus, an overall optimized improved multi-camera capture device 500 can have a nominal radius from the vertex of the outer lens element to a nominal NP point location of ~65 mm. In this example, incident light 310 from object space 305 that becomes image light 315 is significantly refracted inwards (towards the optical axis 385) when it encounters the outer surface 338, but it is refracted inwards less dramatically than is provided by the first surface of the FIG. 2A lens.

The requirement to use a larger sensor board increases the distance between the image sensor plane and the entrance pupil or low parallax volume 392. In particular, the focal length is larger (5.64 mm) so as to project the image onto a large sensor. Within the LP smudge or low parallax volume 392, there are several potentially useful planes or locations of reference, including the paraxial entrance pupil, or a location of a center of perspective, or locations for non-paraxial chief ray NP points, or a location of a circle of least confusion where the LP smudge or parallax volume has a minimal size in the plane tangent to the optical axis. The entrance pupil is a good reference as it is readily calculated from a common first order optics equation. The axial location of a center of perspective is also a good reference as it is directly relatable to perceived image quality. While the distance from the image plane 360 to any of these locations can be used as a reference, an offset distance 375 to a paraxial entrance pupil can be preferred. In this example (FIG. 8), the entrance pupil is located ~30 mm behind the image plane 360, for a negative entrance pupil distance to focal length ratio, EPID/EFL=−5.3:1. Depending on how it is measured, the LP smudge 392 can have an axial width of ≤2 mm.

The improved camera lens systems 320 of FIG. 8 provides an example for how the lens form can vary from that depicted in FIGS. 2A,B. In general, the lens form for enabling an improved low-parallax multi-camera panoramic capture device (300) has a common feature set, consisting of an initial compressor lens group which bends the light sharply towards the optical axis, a physically much smaller wide angle lens group which redirects the light into the aperture stop, and an eyepiece-like lens group which directs and focuses the transiting image light to an image plane. The requirement to reduce parallax or perspective errors, while enabling multiple polygonal shaped cameras to be adjacently abutted to form a larger improved low-parallax multi-camera panoramic capture device (300) brings about an extreme lens form, where lens elements in the compressor lens group can be rather large (e.g., 80-120 mm in diameter), while typically at least some lens elements in the wide-angle and eyepiece lens groups are simultaneously rather small (e.g., 5-10 mm in diameter). In these type of lens designs, the first compressor lens element or outermost lens element 345a, and adjacent outer lens elements of adjacent lens systems, can alternately be part of a contiguous faceted dome or shell. It is also typical that several (e.g., 2-4) of the lens element surfaces have aspheric or conic surface profiles, so as to bend or direct light rays transiting near the edges of the lens elements differently than those transiting near the center or optical axis. Typically, the wide-angle lens group 365 also has a lens element with a deeply concave surface. In some cases, during optimization, that surface can want to become hyper-hemispherical, although to improve element manufacturability, such profiles are preferably avoided. Another measure of the extreme characteristics of this lens form, is the offset distance of the paraxial entrance pupil (or similarly, the LP smudge) behind or beyond the image plane. Unlike typical lenses, the entrance pupil is not in front of the image plane but is instead pushed far behind or beyond it. This is highlighted by the negative entrance pupil to image plane distance/focal length ratio, EPID/EFL, which can range from −2:1 to −10:1, but which is typically ≥−4:1 in value.

Optimization of the size, position, and characteristics of the LP smudge or low parallax volume 392, as depicted in exemplary detail in FIG. 8, impacts the performance and design of the improved camera lens systems 320. The low parallax volume optimization is heavily impacted by the merit function parameters and weightings on chief rays for both spherical aberration of the entrance pupil and axial or longitudinal chromatic aberration of the entrance pupil. Lens element and lens barrel fabrication tolerances can also impact the size and positioning of this volume, or equivalently, the amount of residual parallax error, provided by the lens. Thus, even though these lenses can be considered to have an extreme form, optimization can help desensitize the designs to fabrication errors, and provide insights on how and where to provide corrective adjustments or compensators.

Enhanced situational awareness can be directly enabled by an improved low-parallax multi-camera panoramic capture device (300) with a low parallax camera lens 300, such as that of FIG. 8, with an appropriate lens design and use of optical detectors or sensors. For example, an optical event detection sensor, such the Oculi SPU, can be positioned at the image plane 360, and use its fast response and large dynamic range to detect abrupt changes of an object in a scene. The neuromorphic or event sensor technology is still relatively early in its development, and at present these sensors tend to have low spatial resolution compared to CCD or CMOS image sensors. Thus, as an alternative for providing situational awareness, a high resolution, large pixel count image sensor, such as the Teledyne Emerald 67M, with an addressable 67 mega-pixels, can be located at the image plane 360 of an appropriately designed lens 320. However, as this sensor is large, and a camera channel 320 needs to fit within a conical volume or frustum, the front compressor lens elements (345a,b,c) can become very large and be difficult to fabricate. These issues can be addressed by a reducing the sensor size (such as to a Teledyne Emerald 16M or 36M), or by reducing the FOV imaged by the camera lens, or a combination thereof. For example, if the overall polygonal form is changed from a dodecahedron to a regular truncated icosahedron, the imaged field of view captured by a camera lens (32) is decreased, a larger sensor can be supported, and the lens image quality improved, resulting in an improved angular resolution.

As another approach that can enable higher resolution imaging or dual modality sensing, and various situational awareness possibilities, an improved low-parallax multi-camera panoramic capture device (300) can include a low parallax camera lens 320, acting as an objective lens, paired with an imaging relay optical system. FIG. 9 depicts such a system, with objective or camera lens 320, including a compressor lens group 340, paired with an imaging relay 400, where the relay is a lens system having a nominal magnification of 1.5×. These lenses are nominally aligned along an optical axis 385. In FIG. 9, the example camera lens 320 is similar to the one of FIG. 8, although the front compressor lens group 340 includes a cemented doublet. In this type of system, the original image plane 360 corresponds to a real aerial image that is an intermediate image to a second image plane 410 at the far end of the imaging relay. A large high resolution image sensor, such as the Teledyne 67M, can then be provided at this second image plane 410. The optical system would be appropriately designed so that the optical resolution and the sensor resolution approximately match. The aperture stop 355 of the objective lens (320) is nominally re-imaged to a secondary aperture stop 455 with the relay optics. The optical relay design 400 also includes a gap or clearance 420 between the outer surface of the last field lens element 430 and subsequent lens elements. The relay optical system can also include one or more beamsplitters to direct light to a secondary optical sensor, such as an IR imaging sensor or an event sensor, that is provided at an offset or secondary image plane. The optical system of FIG. 9 can be assembled around and through a nexus type internal frame (e.g., FIG. 11) that provides a hollow center or open space through which multiple imaging beams of image light from multiple camera channels can cross through each other.

Figure 10:
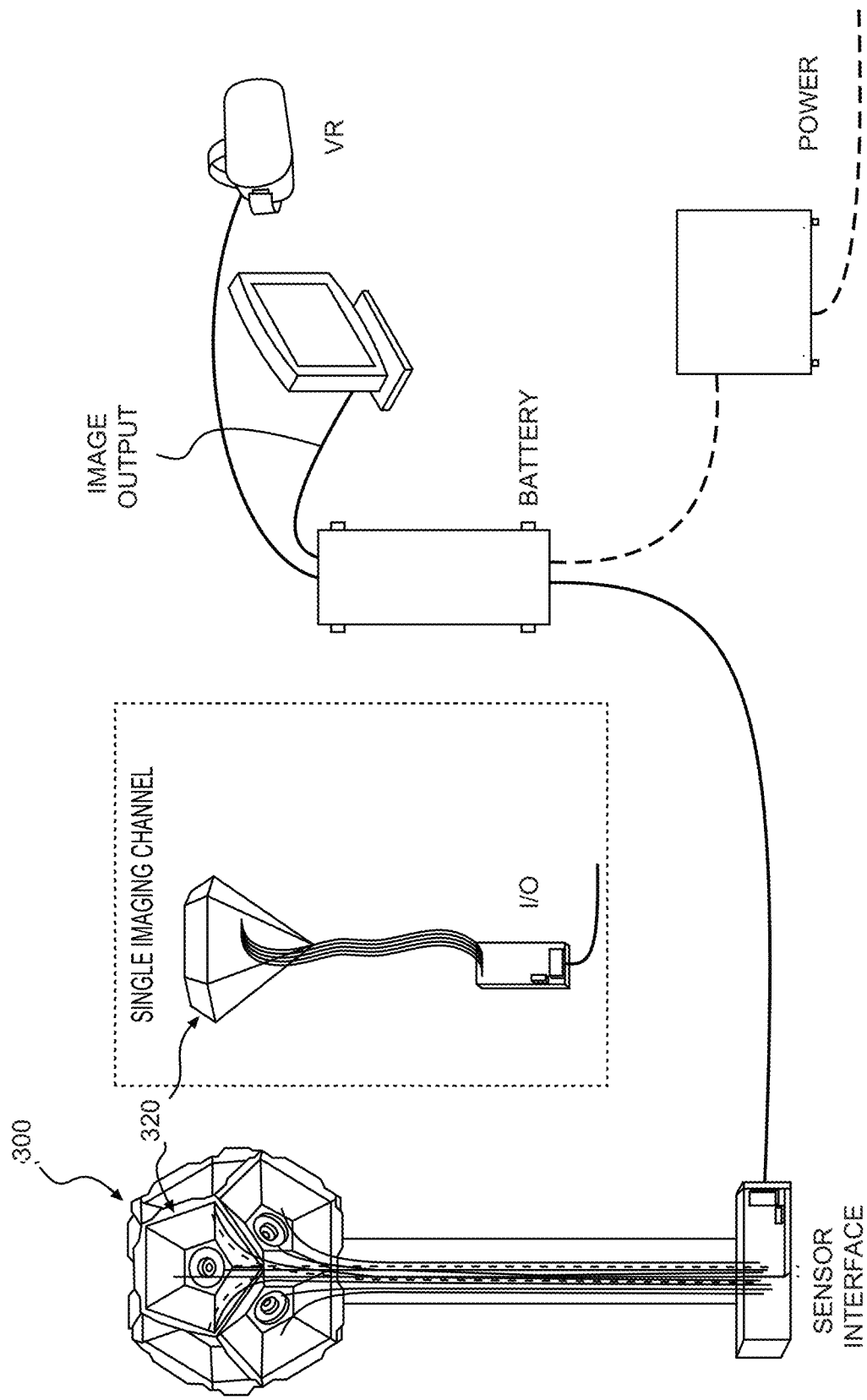
FIG. 10 depicts an electronics system diagram for a multi-camera capture device.

FIG. 10 then depicts an example electronics system diagram for a multi-camera capture device 300 of the type of FIG. 1, where the camera channels 120 are arranged in a dodecahedral geometry and directly image to the respective sensors. Image data can be collected from each of the 11 cameras 320, and directed through an interface input-output module, through a cable or bundle of cables, to a portable computer that can provide image processing, including live image cropping and stitching or tiling, as well as camera and device control. The output image data can be directed to an image display, a VR headset, or to further computers, located locally or remotely. Electrical power and cooling can also be provided as needed. To help reduce thermal gradients between the sensors and their electronics, and the optics, micro-heat pipes or Peltier devices can be used to cool the sensors and re-direct the heat. The heat may be removed from the overall device by either active or passive cooling provided through the electro-mechanical interface in the twelfth camera position, shown in FIG. 10. This cooling can be provided by convection or conduction (including liquid cooling) or a combination thereof. Outside ambient or environmental factors can also affect performance of a multi-camera capture device 300. This approach can also be used with multi-camera capture devices 300 having other geometries, including ones have camera channels that include imaging relays (FIG. 9).

Figure 11:
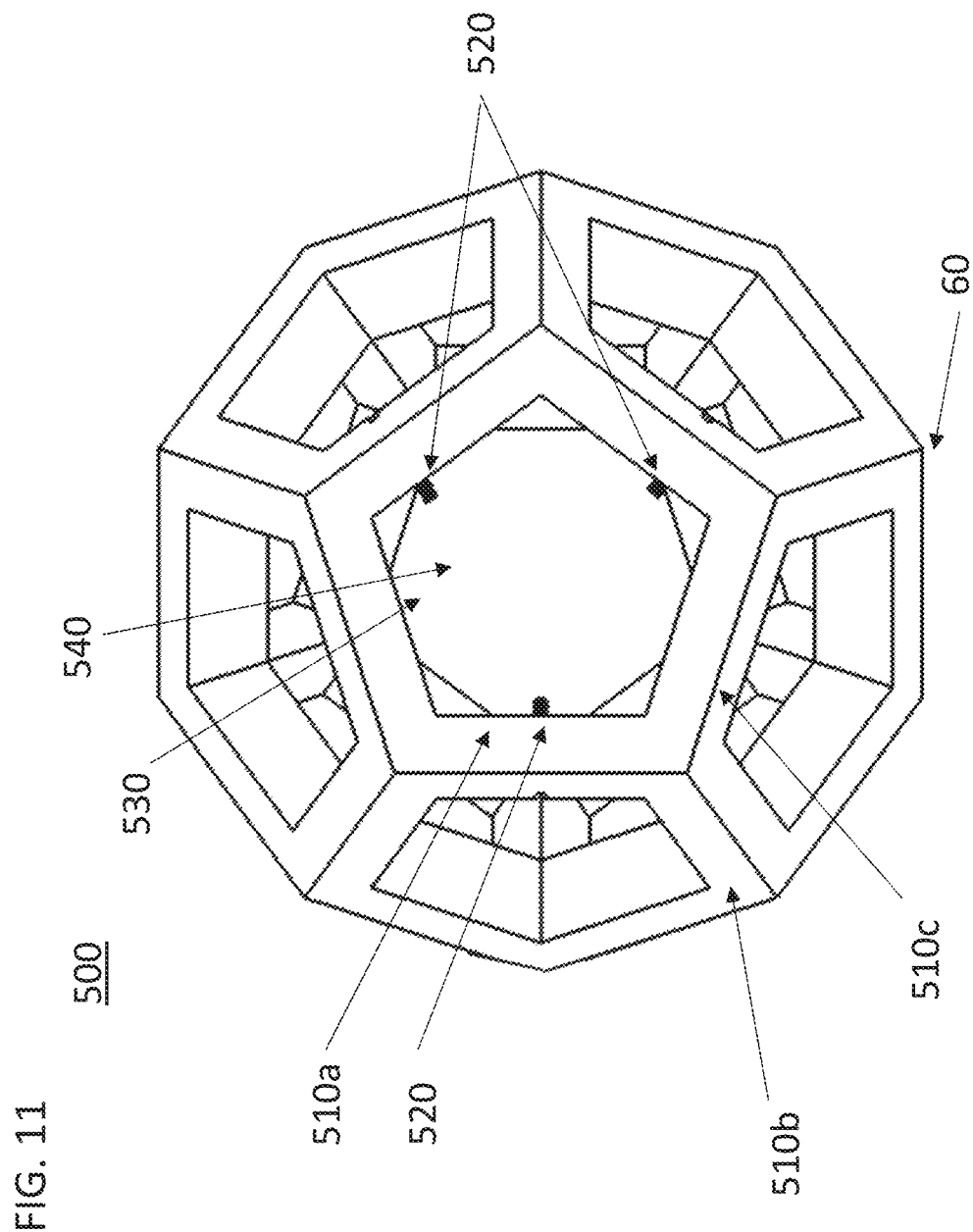
FIG. 11 depicts a concept for an internal space frame, as can be used to mount the camera channels in a multi-camera capture device.

FIG. 11 depicts an example mechanical configuration for an internal space frame that can be used in an improved multi-camera capture device 300. In particular, FIG. 11 illustrates a mounting assembly comprising a nexus internal frame 500, with numerous pentagonal faces 510 arranged in a regular dodecahedral pattern with a hollow center. Generally, the internal frame 500 is a polygonal-shaped frame that has an array of adjacent mechanical faces have peripheral edges that form a polygonal shape and have mounting and alignment features. The internal frame 500 can be designed as a mount or mechanical assembly to support an 11-camera system, with a support post attaching in the 12th position (similar to FIG. 10). A polygonal internal frame, or half or partial internal frame can also be used in a partial or hemispheric system, where the camera assemblies, including imaging sensors are mounted directly or indirectly to the frame. Connections, cables, and wiring for data transfer and cooling can then be directed out through the open polygonal portion 530 of a face 510 and into the hollow center of the internal frame 500 and out through an open polygonal portion 530 of another face 510. Alternately, a hemispherical system with an internal mounting frame 500 can provide a central hollow or open space (e.g., a nexus) to enable image light beams to cross through an opposing pair of open polygonal portion 530 of faces 510 so as to transit subsequent relay optical systems (400) and reach remote optical sensors at a secondary image plane 410. Positionally, the width of the gap or clearance 420 in the relay optics (see FIG. 9) between the outer surface of the last field lens element 430 and the nearest subsequent lens elements 435 nominally matches the width of the central hollow volume between opposing faces 510 provided by the nexus internal frame 500. For example, clearance 420 can be 75 mm wide. But it is noted that the objective lens housings or the relay lens field lens elements 430 and their housing can protrude modestly through the open polygonal portion 530 of face 510, and into the central volume of the hollow center 540, as long as they do not block imaging light of an adjacent objective lens 320. In such a case, the clearance between lens elements would be less than the width of the hollow center of the internal frame 800. For example, width of clearance 420 can be several millimeters smaller than the central width of the hollow center 540.

As shown in FIG. 11, a nexus internal frame 500 can have a pentagonal face (510A) that can have three adjustors 520, such as set screws or flexures, oriented nominally 120° apart, that can interact with mounting and alignment features on the camera housing and thus be used to help align a given camera channel. For an improved multi-camera panoramic image capture device 300 constructed in a dodecahedral pattern, the internal frame would also be dodecahedral with pentagonal faces and it would be oriented with the internal pentagonal faces nominally aligned with the external pentagonal geometry. The internal space frame approach can be used with other polygonal device structures, such as that for an octahedron, an icosahedron, or a chamfered dodecahedron. In such cases, at least some of the space frame faces include edges along their periphery that correspond to other polygonal shapes, such as hexagonal.

An internal frame 500 can be machined separately and assembled from 2 or more pieces that are mounted together, or it can be made as a single piece structure by casting or 3D printing. Although the fabrication of a single piece frame could be more complex, the resulting structure can be more rigid and robust, and may support tighter mechanical tolerances. For example, a dodecahedral frame (500) with a hollow center could be cast in stainless steel, and then selectively post-casting machined on the faces 510 to provide precision datum features, including flats, vee-slots, or ball mounting features. In particular, one or more pentagonal faces 510A, 510B, or 510C can be provided with one or more adjustors 520 that can be used to nudge the respective camera channel against a precision v-groove structure (not shown in FIG. 11). These v-groove structures can be fabricated into, or protruding from, an inside edge of a pentagonal vertex 60 of a pentagonal face. Alignment balls can be mounted to the faces 510 or to the interfacing adjacent lens housings, or to a combination thereof. A variety of features, including balls, vees, flats, and sockets can be used to enable kinematic constraints between the lens housings or between the lens housings and the space frame 500. This internal frame 500 can then be provided with flexures or adjustors on all or most of the pentagonal faces, to provide kinematic type adjustments and to reduce or avoid over constraint during device assembly and use.

As previously, the mounting and adjustments for secondary channels can have a different design or configuration than those for a primary channel. In these improved devices (300), springs, flexures, magnets, or adhesives can be used on or within an internal frame 500 to provide a low stress mechanical linkage or connection between the lens housings of adjacent camera channels, and also between the camera channels and the nexus internal frame 500, or between different portions of the internal frame, so at help limit under-constraint or over-constraint between the assemblies or lens housings. As another option, an internal frame can be at least in part made with a more compliant material, such as brass or Invar. A 3D printed frame can be fabricated from materials including plastic, bronze, or steel.

An internal space frame for an improved multi-camera capture device 300 can also be a kinematic structure, in which individual faces (510) are attached to each other using kinematic features. While the resulting space frame structure can be less rigid, it can be easier and less costly to fabricate and assemble the individual faces than to machine or cast an entire or unitary space frame. However, in that case, the assembled space frame should be a kinematic structure, so that it can respond and compensate or correct for external loads. Kinematic interfaces between the space frame faces can also help the kinematic interactions between the adjacent camera channels that are attached to the space frame. An exactly constrained or kinematic structure (these terms can be used interchangeably) will also largely avoid stress and deformation when assembled in the face of manufacturing variation. It will also exhibit precision, returning to a consistent position as it experiences uniform temperature changes. These properties make it ideal for optical supporting structures. The number of kinematic components can be based on the requirements of the system.

Figure 12A:
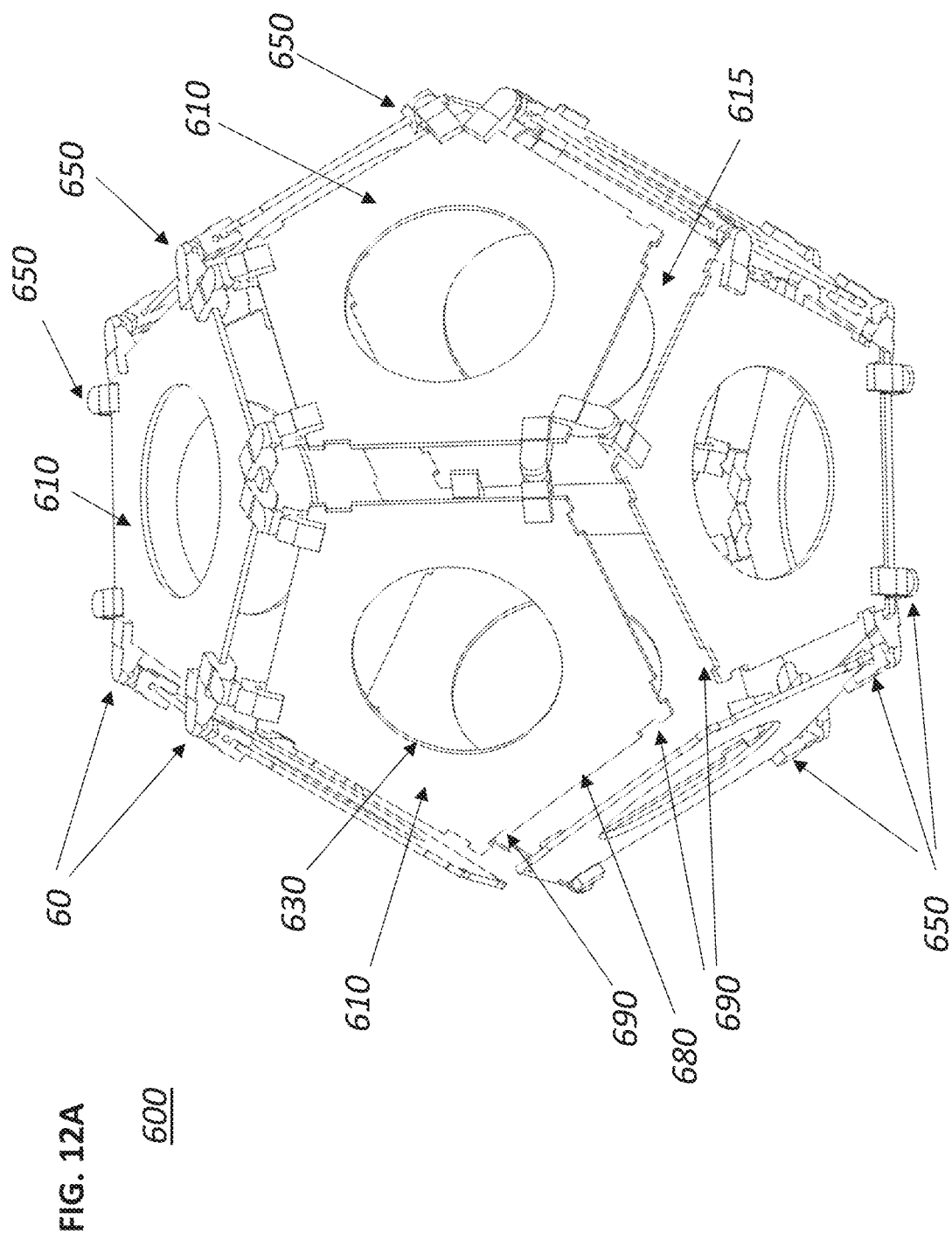
FIG. 12A depicts concepts for a kinematic space frame.

FIG. 12A depicts an example of a dodecahedral exactly constrained space frame structure or kinematic space frame 600 with each pentagonal face 610 (or facet or side) being an independent exactly constrained element. Each face 610 has nominally straight edges along the periphery to form a polygonal shape, which in this example, is pentagonal. In other examples, the edges may be other than straight, and/or there may be more or fewer edges. FIG. 12A is illustrated to show key features that enable the kinematics of the space frame 600. Each pentagonal face 610 includes ten mounting points 690, e.g., two per polygonal edge 680. A constrained face 610 is provided with a particular set of kinematic elements 650 at a subset of its ten common mounting points 690, where the type of kinematic element 650 used depends on the location of the face 610 and the associated mounting point 690 within the overall structure (space frame 600). In FIG. 12A, some of the faces 610 are depicted with kinematic elements 650 at the mounting points 690, and some without, so that the mounting points can be seen. These mounting points 690 are depicted as rectangular cut outs. The locations of the mounting points 690 along an edge 680 can be anywhere, but the positioning the mounting points 690 close to the vertices 60 may improve structural stability. A kinematic element 650 straddles a seam 615 between adjacent mounting points 690 of two adjacent faces 610 to provide a kinematic interface or connection. The combination of kinematic elements 650 arrayed about the space frame 600 will act to prevent or reduce over-constraint within the assembly. FIG. 12A depicts an example kinematic space frame structure with faces 610 that include an open polygonal center 630 or opening through which a camera channel lens housing (not shown) can be mounted or inserted. However additional example features on the pentagonal faces 610 for mounting or aligning a lens housing of a camera channel are not shown.

Figure 12B:
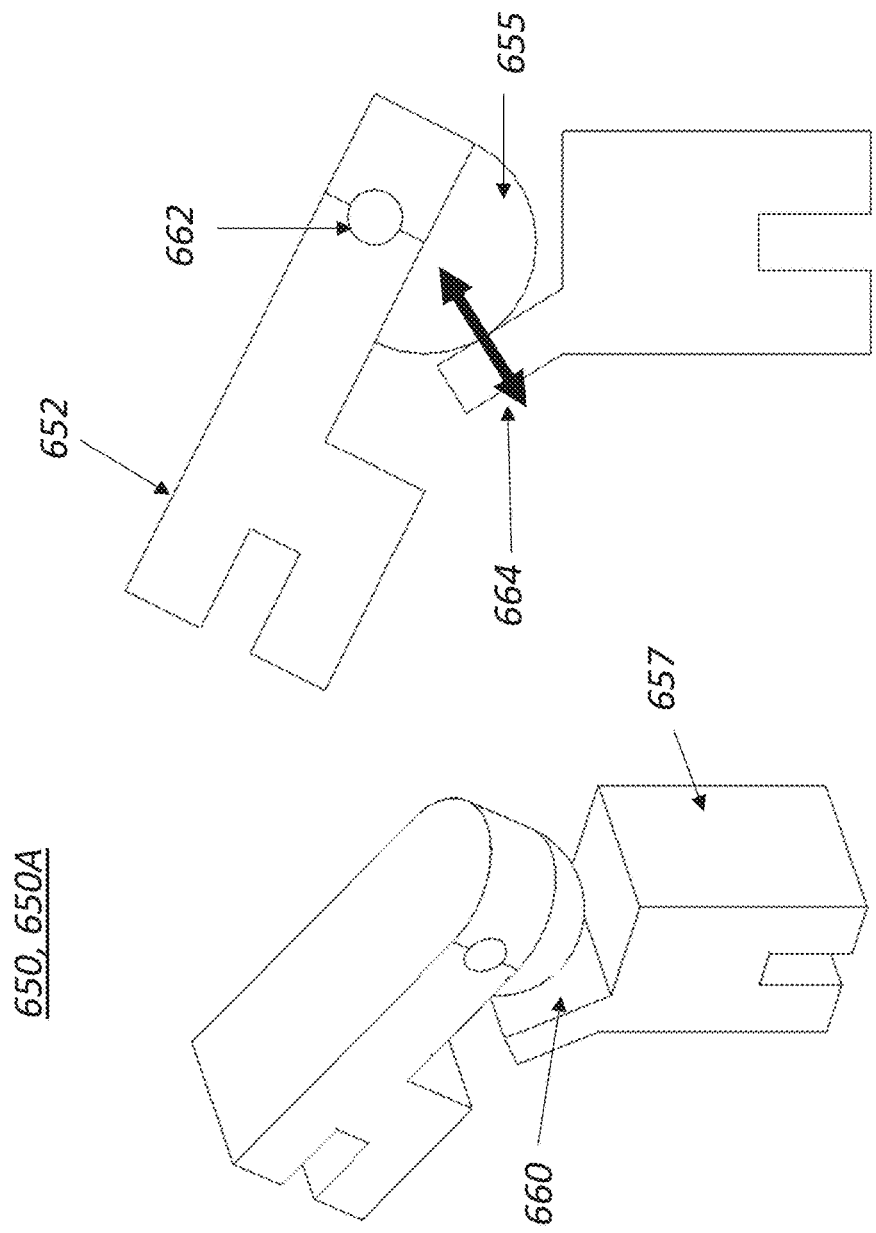
FIGS. 12B and 12C depict side and perspective views of kinematic elements that can be used in a kinematic space frame.

The kinematic elements 650, mounted at points 690, can properly orient themselves at angles between the faces 610 so as to remove different numbers of degrees of freedom (DOF). Embodiments of these types of kinematic elements 650 are shown. In FIG. 12B, a kinematic element 650A, e.g., as an example of the kinematic element 650, that can be used to remove a single degree of freedom is depicted in both a perspective view and a side view. This kinematic element 650A is embodied as a sphere on plane. It includes two components, a ball mount 652 with a ball 655 or partial ball, and a flat mount 657 with a flat 660. Features 662 for providing a holding force or constraint vector 664 are only partially shown in this figure. Balls or partial balls for use in this type of kinematic element can be obtained from Bal-tec (Los Angeles, CA).

Figure 12C:
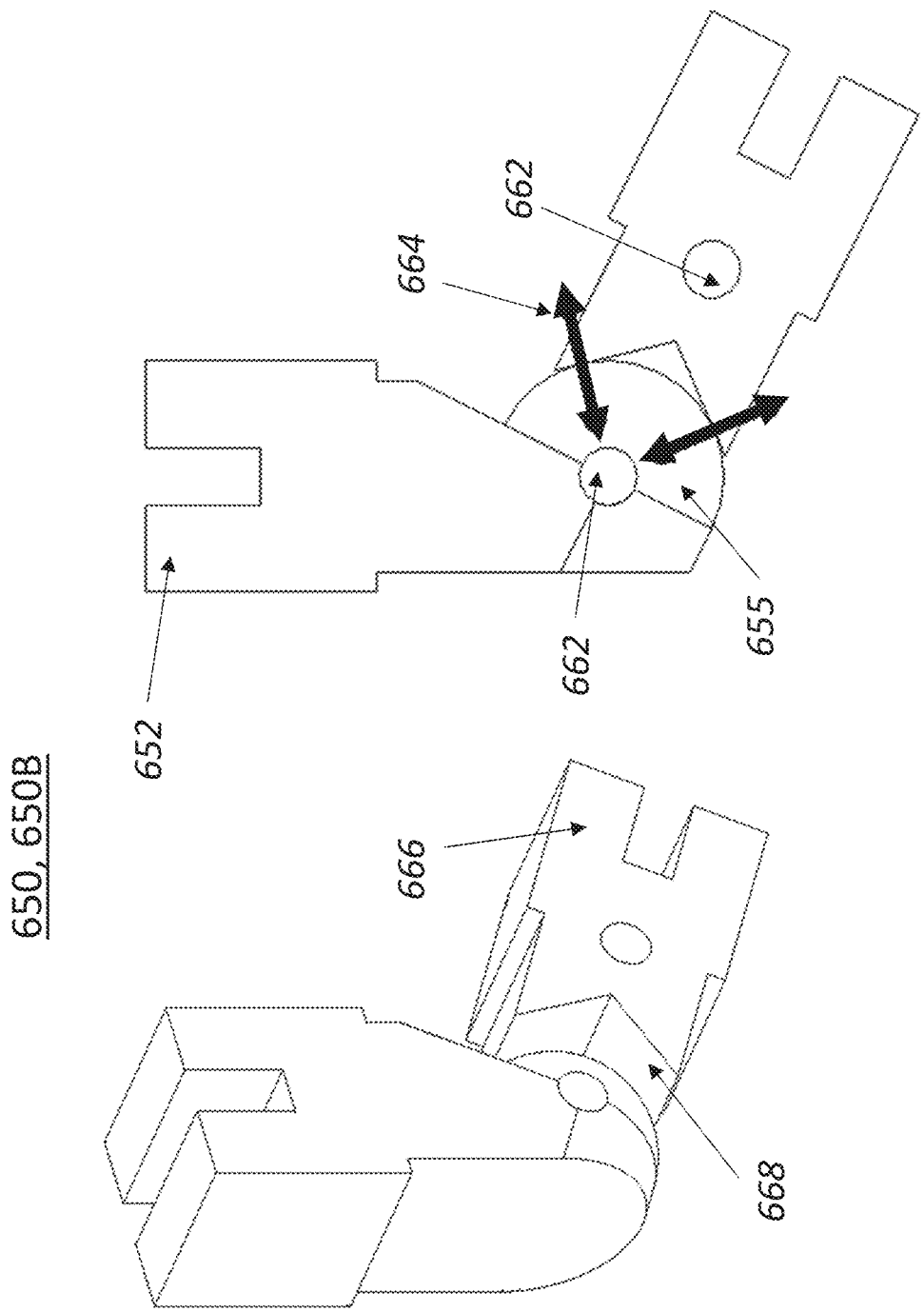

In FIG. 12C, a second kinematic element 650B, e.g., as an example of the kinematic element 650, that can be used to remove two degrees of freedom is depicted in both a perspective view and a side view. In this example, the kinematic element 650B is embodied as a sphere in a vee socket, and it includes two components, a ball mount 652 with a single ball 655 or single partial ball, and a vee mount 666 with a vee 668. In this figure, both components, the ball and flat mounts, include a hole 662. A mechanism such as a spring (not shown) can provide a holding force that provides along constraint vectors 664.

In FIG. 12D, a third kinematic element 650C is depicted in perspective view, showing two adjoining components that can be used to remove three degrees of freedom. In this example, the kinematic element 650C is embodied as a sphere in a trihedral socket, and it includes two components, a ball mount 652 with a single ball 655 or partial ball, and a socket mount 670 with a socket 672. Again, example hole features (662) are provided for attaching a holding force mechanism. This kinematic element can operate like a spherical joint or Heim joint.

In a kinematic space frame 600, substitution of these kinematic elements 650 can be employed consisting of alternative elements such as combinations of wire, blade or notch flexures or ball and socket joints and act only to remove the indicated degrees of freedom between attached elements. The sum of the constraint vectors 664 will nominally align with the bisecting angle between adjacent faces 610. For the example kinematic elements 650 that are shown, it is assumed that nesting or holding forces can be applied to keep the surfaces in contact and prevent under-constraint. These forces, represented by constraint vectors 664 can be accomplished via force elements such as holding springs (not shown) that are mounted at holes 662. Alternately, or in addition, holding forces can be provided by magnets, elastics, adhesives, gravity, or by active externally applied forces such as from piezo-electric devices, solenoids, or air or electromotive cylinders (pneumatics), or combinations thereof.

There are several different ways to create the constraint pattern necessary for an exactly constrained structure using these elements. Although any face 610 of the space frame 600 can be considered fixed, for this explanatory discussion, it will be assumed that the top surface is fixed to ground (e.g., to a stable mounting surface during fabrication). On the left, FIG. 12E shows a partial space frame 600 with a top face 611 and one of the adjacent faces 610 pointing downward at an appropriate angle for a dodecahedral shaped structure. Two kinematic elements 650 are shown connecting the faces 610 across a seam 615. In this example, the kinematic element 650 on the left is of the type of 650C that removes three degrees of freedom (DOF), and the kinematic element on the right is of the type of 650B that removes two DOF. The pattern of constraints produced will allow a single degree of freedom of rotation around the line (shown as a dashed line) connecting the centers of the two spheres. On the right, FIG. 12E depicts a more complete partial space frame 600 with an additional adjacent face 610 provided with the same constraints pattern attaching it to the upper face 611 or ground, having a left-to-right pair of connecting kinematic elements 650C and 650B as were provided with the prior face. The two constraints here will remove two rotational degrees of freedom (one for each face 610, the top face 611 is fixed to ground). A kinematic element 650B of the ball and vee type (FIG. 12C) to remove two DOFs is provided in the lower seam 615 to connect the left and right faces 610 together. The result is a rigid structure. The rest of a hemisphere portion of this example dodecahedral space frame 500 is then built upon this sub-structure.

Figure 12F:
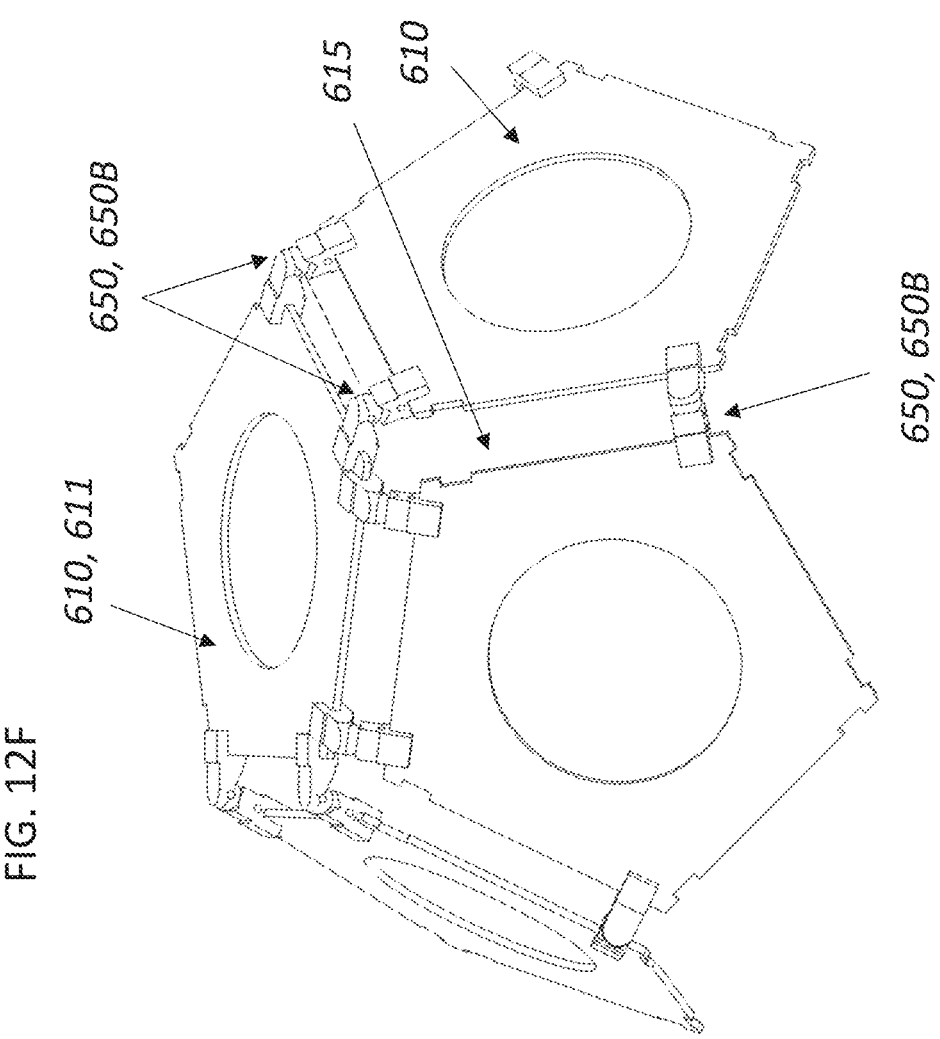
FIG. 12F depicts a third perspective view for a partial assembly of a kinematic space frame.

FIG. 12F depicts a further assembly of the partial kinematic space frame 600, including a next face 610 added to this the hemispheric portion. As the three previously added faces 610 described in FIG. 12E result in a rigid structure, the remaining faces 610 in the hemispheric portion may be constrained differently. An added face 610, on the lower right is constrained to the grounded upper face 611 via two elements of the type of 650B with the orientation of the vees (668) aligned in the direction of the intersection of the two faces 610 and 611. This will allow rotation around the dashed line shown as well as translation along that line. Again, a kinematic element 650B of the ball and vee type (FIG. 12C) to remove 2 DOFs is provided in the lower seam 615 to connect the right face 610 to the pair of faces to the left. This kinematic element in the style of 650B between the prior rigid structure and this new face will remove an additional 2 degrees of freedom and result in an additional rigid element. Faces 610 can be added around the top face 611 in a similar manner to complete a hemisphere portion of the partial kinematic space frame 600.

Alternately, a similar rigid structure for a partial kinematic space frame 600 can be achieved by having the two initial faces (single degree of freedom faces) at the end of the chain of faces 610 as well as the beginning. Also, the single degree of freedom faces can straddle the faces with 4 degrees of freedom with the same rigid kinematic structure resulting.

FIG. 12G then shows two hemispheres or partial kinematic space frames combined into a single dodecahedral kinematic space frame 600. The two hemispheres are connected via a connection that is in the spirit of a "Maxwell" or 2-2-2 type kinematic connection. In principle, a 2-2-2 connection consists of three spheres or balls in three vees largely at 120 degree spacing. A portion of a 2-2-2 connection 675 is shown in FIG. 12G, where space frame 600 has two single degree of freedom kinematic elements 650A (e.g., FIG. 12B) on either side of a vertex, connecting the upper and lower hemispheric portions of the space frame together. These two nearly adjacent single degree of freedom kinematic elements 650A effectively act as a dual degree of freedom kinematic element 650B. Note that the connection in this case is generated by a simple rotation of the planar element 90 degrees about the line that is largely through the center of the sphere that lies in the plane that is perpendicular to both faces 610 and in the plane of the face with the planar element attachment. The two other kinematic connections, being the two degrees of freedom v-groove type kinematic elements 650B are on the opposite side of the space frame and are not shown as they are not visible. Those two kinematic elements 650B in the style of FIG. 12C, can be mounted near the upper to lower hemisphere vertices 60 of two adjacent faces 610. The orientation of the kinematic elements three are symmetric to a large extent to minimize decentration with thermal movement. Alternatively, these two kinematic elements 650B can be mounted at two mounting points (690) of a single face 610, potentially sacrificing some kinematic purity for increased robustness.

The size, assembly considerations, and/or requirements of the system may drive modifications or adaptations in the constraint pattern. FIG. 13A shows an alternative example dodecahedral kinematic space frame 700 with a crown-like "solid" upper hemispheric portion 720 with an arrangement of six fixed continuous faces 730 with solid joints or continuous seams 745. The crown 715 may be machined from a bulk material, created via an additive manufacturing processing, or the like. The lower hemisphere portion consists of discretized faces 710 connected with the kinematic elements 650, such as the kinematic elements 650A, B,C presented previously. The crown structure 715 in the upper hemispheric portion 720 can be useful in interfacing with other system mechanics that require greater robustness or rigidity. Lens housings can be mounted on both the fixed faces 730 and the kinematic faces 710.

However, the crown structure 715 is more likely used as to mechanically interface to other devices or structures, including a lattice work (not shown) that can support image relay systems (FIG. 9). As an alternative, the crown structure 715 can have a cylindrical base and a set of outward flared extensions that come to points at the vertices. This could be an alternate upper structure in FIG. 13A, while the lower hemisphere still comprises discretized faces 710 with kinematic elements 650.

Figure 13B:
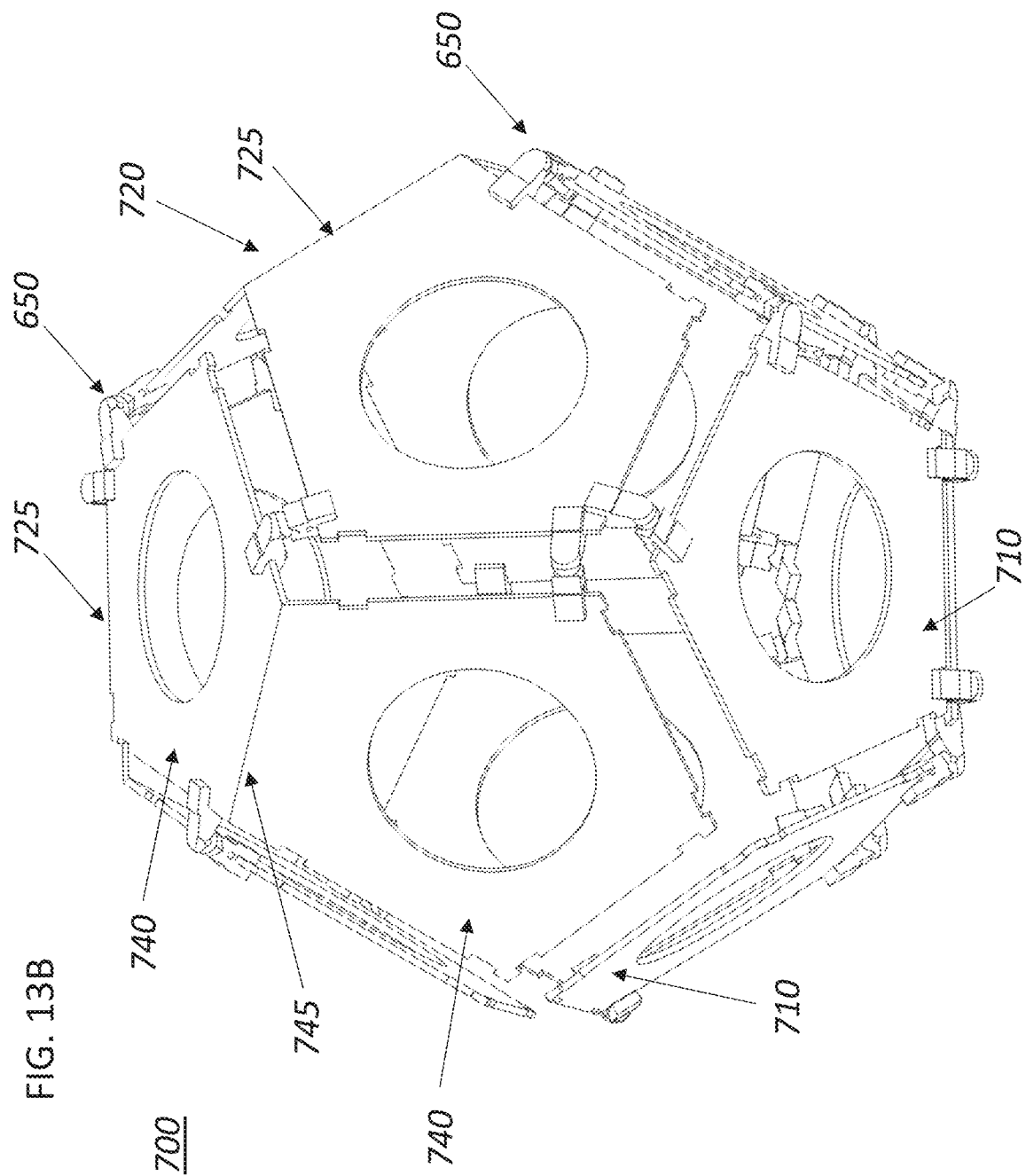

As another alternative kinematic space frame 700, FIG. 13B shows a hemisphere upper portion 720 that includes a "fixed" section 725 having two adjacent solid or continuous polygonal faces 740 that have a solid joint or continuous seam 745. For instance, the second 725 may be machined from a bulk material. In this example, the upper hemisphere is broken into three identical sections 725, each with two faces 740. One fixed section 725 includes the top face, and the other fixed sections are connected to it using a 2-2-2 type connection using an array of kinematic elements 650 of the type (650B of FIG. 12C). Thus, two fixed sections 725 are connected to each other with 3 spheres in 3 vees. Again, the lower hemispheric portion consists of discretized faces 710 that are interconnected with the kinematic elements 650, such as the kinematic elements 650A,B,C presented previously.

FIG. 13C depicts a third alternative example, where the space frame 700 consists of two hemispheric crown portions 715A and 715B that are machined, cast, or printed to each have a set of continuous faces 740. Kinematic mounting using an appropriate set of kinematic elements 650 locate the two crown halves to each other to provide a complete space frame 700. When the two crown halves are apart, access to the fasteners that hold the camera lens housings to the space frame is comparatively easy. The two crown halves can be held together with fasteners that are accessed through an opening at the bottom. Each crown 715 can be a single piece cast part, with selective external machining. In general, the inside surfaces of the crowns do not need precise features. However, for improved camera devices 300 with crown-like space frame portions (e.g., FIGS. 13A and 13C) that require high precision alignment tolerances, a 5 or 6 axis milling machine may be needed to fabricate these structures.

For the example alternate space frames of FIG. 13A, FIG. 13B, and FIG. 13C, the upper and lower hemispheric portions of the space frames 700 are connected to each other using an appropriate arrangement of kinematic elements 650 (e.g., kinematic elements 650A or 650B). These alternative space frames 700 can be useful in reducing the number of constituent individual parts and in improving robustness of the overall space frame. Also, other combinations are possible. For example, a crown structure 715 as depicted in the upper hemisphere 720 of FIG. 13A can be combined with the approach depicted in the upper hemisphere of FIG. 13B that uses an intermediate number of continuous faces 725. These types of space frames with partial combinations of discrete and solid faces kinematically connected can be extended to other multi-face polygonal shapes, such as the truncated icosahedron (soccer ball) or the chamfered dodecahedron.

Figure 14A:
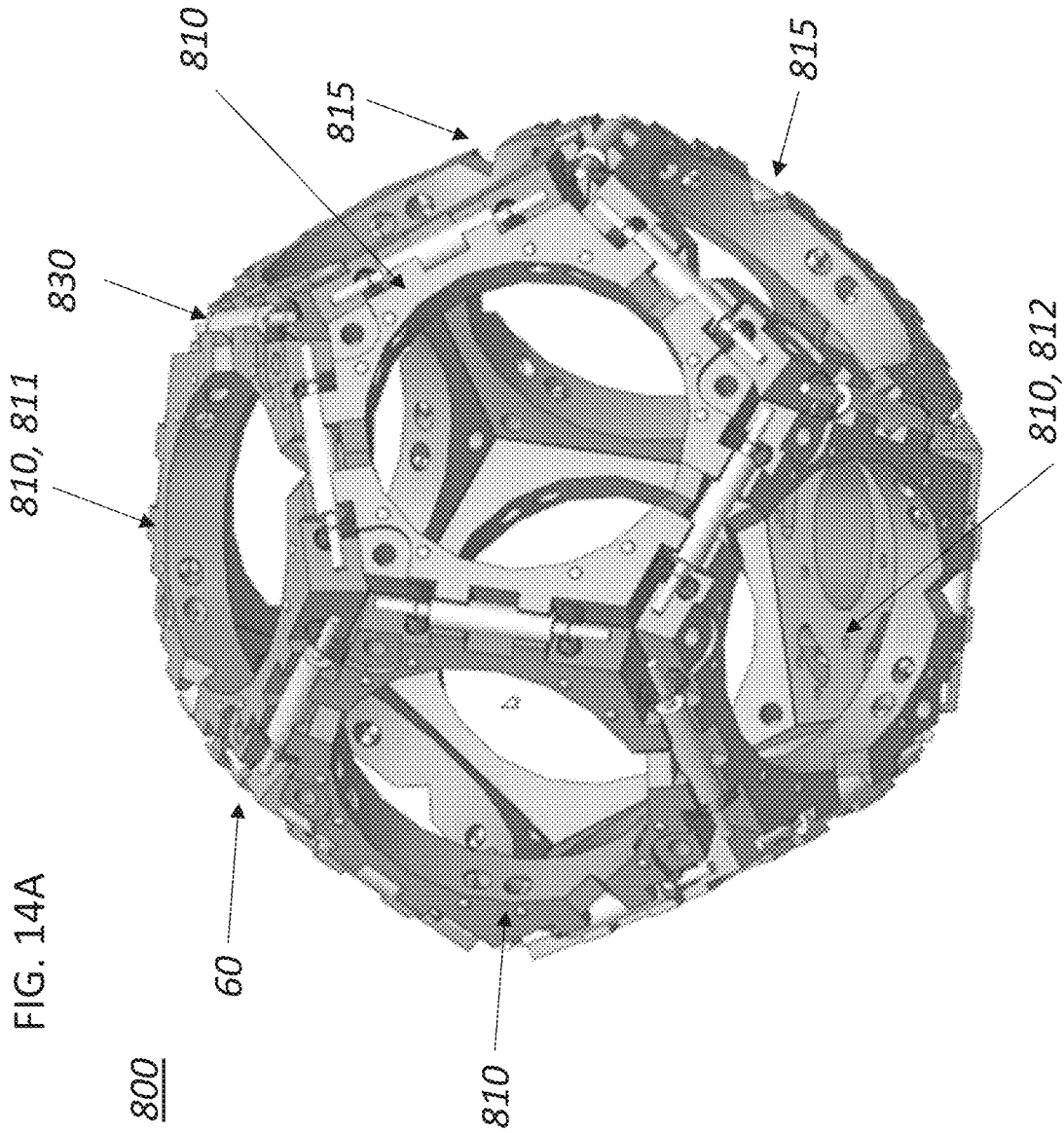
FIG. 14A depicts an alternative kinematic space frame structure.
Figure 14C:
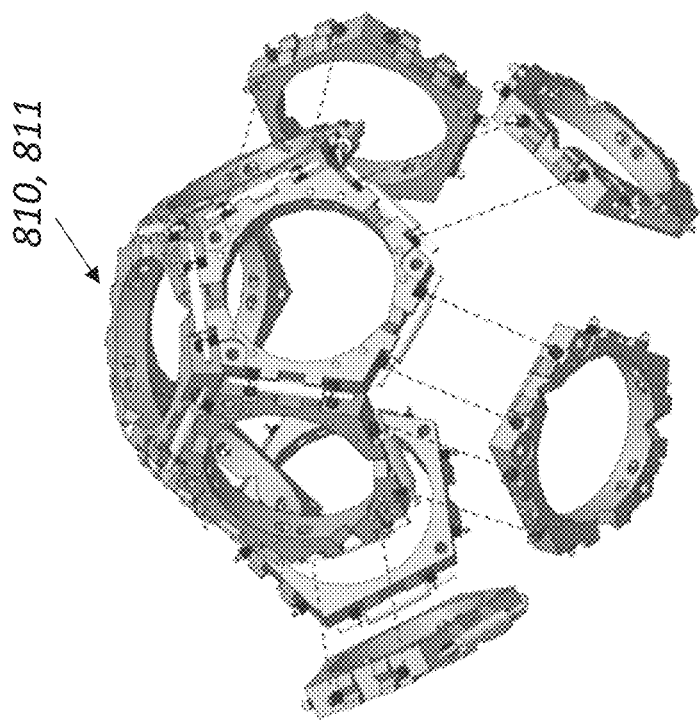
FIG. 14B and FIG. 14C depict aspects of the assembly of the FIG. 14A space frame.
Figure 14B:
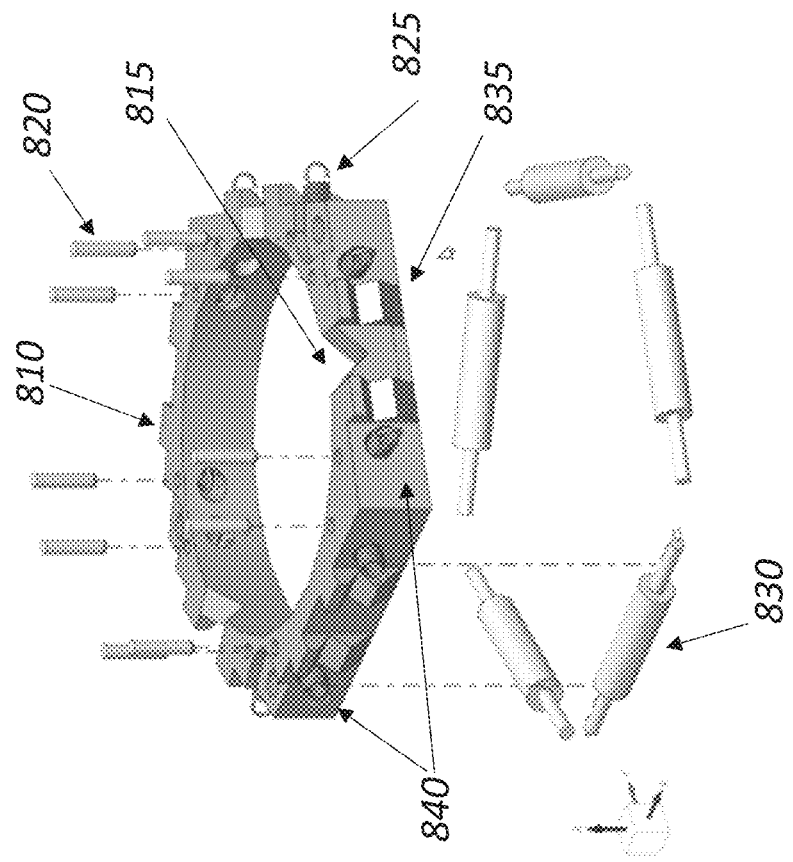

FIG. 14A depicts another alternative example kinematic space frame 800 to that of FIG. 12A and FIGS. 13A, 13B, 13C, again having a dodecahedral geometry with 12 faces or facets. Faces 810 can include channel vees 815 to which camera channel lens housings (not shown) can be mounted. FIG. 14B depicts an example assembly process for a plate or face 810 that can be used in the FIG. 14A space frame. A series of retention pins 820 are added to the face 810, by mounting them into drilled holes with springs 825 secured within the face 810 to the available end of the pins 820. Thereafter, a rolling pin like cylindrical pin 830 is added, and is pulled by springs 825 against a pair of machined v-grooves 835 that are provided on edges 840. Each spring spans a distance from a retention pin 820 to a narrow end of a rolling-pin like cylindrical pin 830. To resist bending under load, these cylindrical pins 830 can be made of steel.

This same assembly process can then be repeated for all 12-space frame faces 810 and their accompanying pins, springs, and cylinders, although not all edges 840 of all faces 810 will be initially equipped with cylindrical pins 830. Then as depicted in FIG. 14C, the individual faces 810 are connected to form a space frame 800 of the type of FIG. 14A. One face 811, and corresponding lens channel, which is opposite the mounting plate or face 812, can be identified as a primary channel. The secondary faces 810 are connected to the primary face using the springs, with springs on a polygonal edge of two adjacent faces 810 connecting to the turned down or reduced radius portions of a rolling pin cylinder 830. Once the five pentagonal secondary faces 810 are connected to the primary face 811, they can be connected to each other. The tertiary faces can be similarly connected to the secondary faces, and then to each other, and then to the mounting plate face 812, to complete the space frame. In this design, a cylindrical pin 830 and the contacting offset v-grooves 835 from the two adjacent edges 840 of the adjacent faces 810 act or function as a kinematic element. Contact of the cylinder with the offset vees prevents or resists over-constraint and the attached pairs of springs 825 prevent or resist under-constraint. Thus, this kinematic element using a cylindrical pin and a pair or offset vees or vee groves is an example of a different kinematic element than the kinematic elements 650A,B,C that were discussed previously.

Although the space frame 800 of FIG. 14A provides kinematic assembly elements with spring loaded connections, it also includes redundant constraints of the cylinder and vee connections along common edges 840. As a result, the rigidity of the system is significantly increased, and the assembly method is common for every edge 840, simplifying overall manufacture. But intermediate designs to that of FIG. 14A, using a combination of the kinematic elements with the cylindrical pins 830 and the kinematic elements 650 (e.g., 650A, 650B, or 650C), located on other or different edges 840 of the polygonal faces 810 can also be used to provide improved or different kinematics between two or more polygonal faces 810. This system also creates a large interior hollow space. and can readily enable complete or partial disassembly for field replacement of components. Again, this space frame construction is not limited to the dodecahedral geometry, and it also can be constructed using a combination of discrete and solid continuous faces.

As an alternative for a lower cost version of the space frame 800 of FIG. 14A, the individual rolling pin cylinders 830 can be replaced with a stiff wire that is wrapped around the edges 840 that form the periphery of a polygonal face 810. In this example, alternating face 810 would have these wires. While the space frame would then be cheaper to manufacture, some mechanical precision would be sacrificed.

In accordance with FIG. 11, an internal space frame 500 can be a solid structure with machined, cast, or printed, continuous faces 510. Alternately, a kinematic space frame 600, as depicted in FIGS. 12A-G, can be provided using a set of discrete faces 610 and interfacing kinematic elements 650. Alternative kinematic or partially kinematic space frames 700 can also be provided that have a combination of discrete and solid or continuous faces, as depicted in FIGS. 13A,B,C. Another alternative example space frame 800, depicted in FIG. 14A, can also have a partially kinematic structure. The comparative kinematic performance of these example space frames varies because of the design choices that are made in the design and selection of the kinematic elements used, the use of a full set of discrete polygonal space frame faces (e.g., FIG. 12A or FIG. 14A) versus using a construction with a few continuous polygonal faces (e.g., FIG. 13B) versus using a construction with one or more larger structures with several continuous polygonal faces (e.g., the crown structures of FIGS. 13A,C). The comparative kinematic performance can also depend on other factors, such as the materials the polygonal faces or kinematic elements are fabricated from (e.g., steel, aluminum, zinc, bronze, invar, or FRP). An assembled space frame can be pre-tested for kinematic performance. For example, a high precision kinematic space frame can control the relative positioning of one face to another to spatial tolerances of ±0.025 mm or less.

As depicted, the space frame 600 of FIGS. 12A and 12G are nominally fully kinematic due to an appropriate selection of kinematic elements 650A,B,C between the various faces 610. Notably, although the space frame 800 of FIG. 14A has cylinder pin (830) based kinematic elements located in all the seams between all the polygonal edges 840, this space frame 800 is over constrained or partially kinematic. However, the kinematics can be improved by replacing some of the cylinder pin (830) based kinematic elements with alternate kinematic elements, such as using appropriate selections of the kinematic elements 650A,B,C (see FIGS. 12B-D) amongst the different seams. With appropriate selections, this space frame 800 can become nearly or fully kinematic.

By comparison, the space frame 700 of FIG. 13B includes both seams across which adjacent faces 710 are continuous or solid and rigid, and many other open seams where adjacent faces are connected by kinematic elements 650 (e.g., 650A, 650B, or 650C). This frame can be fully kinematic relative to the appropriate selection of kinematic elements to span the open seams. However, it is also partially kinematic as the seams between the adjacent continuous faces are nominally rigid as these faces were fabricated (e.g., machined, cast, or printed) as a continuous material (e.g., steel). The rigidity of these multi-face structures can be enhanced by fabricating the faces with stiffening ridges. Alternately, the rigidity can be reduced by fabricating these continuous faces from one or more compliant materials (e.g., a polymer or plastic). Likewise, the space frames 700 of FIGS. 13A and 13C, which include crown-like portions, are only partially kinematic, but the open seams can be kinematically bridged, to for example, provide a fully kinematic lower hemisphere (e.g., FIG. 13A).

Thus, a partially kinematic space frame can have kinematic elements in all the seams between adjacent faces, but not have an appropriate selection of kinematic elements across all the seams so as to provide a fully kinematic structure. The resulting structure can be either over or under constrained. A partially kinematic space frame can alternately or also have some seams between adjacent faces that are rigid, as for example, the faces were fabricated from a single continuous material. In examples of this disclosure, an element or body is "fully kinematic" if it is exactly constrained with the six degrees of freedom (DOFs) being deliberately and properly removed, and there being no redundant constraints nor under constraints (e.g., the element or body is not partially constrained). For the space frames, this means that the individual elements or bodies (e.g., the individual faces or structures with multiple continuous faces) are exactly constrained in the seams between these bodies, so as to act or behave in composites as a rigid structure.

Any of these example kinematic space frames, or variants thereof, can be applied to the purpose of enabling an improved panoramic multi-camera capture device 300 that has enhanced kinematic performance to both maintain structural integrity during conditions of potential over or under constraint (e.g., changes in loading forces, gravity, thermal conditions) and thus help keep the camera channels (320) properly co-aligned. But in addition, applying any of these example space frames for the purpose of supporting a camera channels 320 for an improved panoramic multi-camera capture device 300 can also involve providing kinematic interfaces between the space frame faces and the lens housings or camera channels.

Also, in the design of the space frame, it is useful to define a primary face. In turn, it can be useful to define a primary camera channel that corresponds to the primary face. In some designs the mounting and adjustments for secondary or tertiary camera channels can have a different design or configuration than those for a primary camera channel.

Figure 15B:
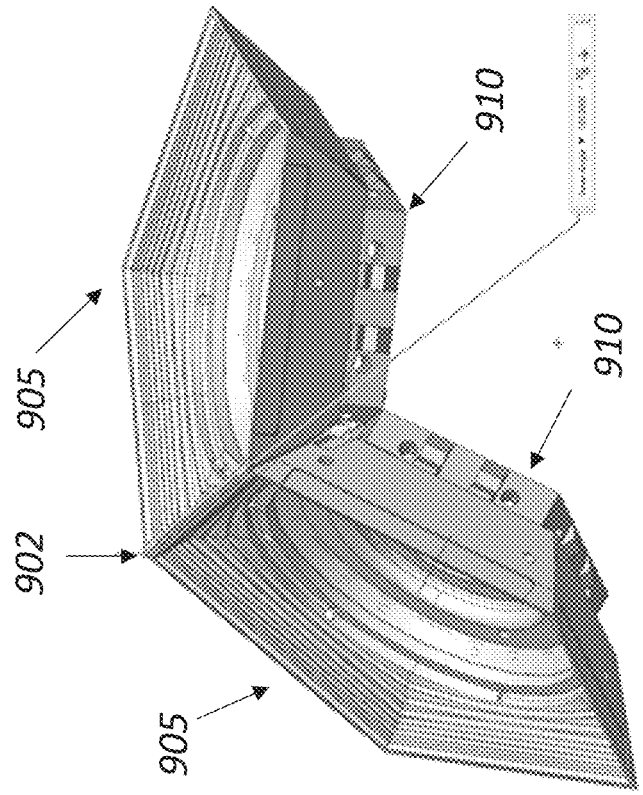

FIGS. 15A-C show a preferred approach for mounting lens housings to faces or facets of a space frame that uses kinematic ball and vee contacts or features. In this design, nominally all camera channels and their lens housings 905 are identically assembled to the polygonal space frame facets 910. For example, they can be attached with 4-40 bolts passing through Belleville washers and a facet 910 of the space frame 900 to attach to a lens housing 905 although nesting forces (e.g., 20 N) can be provided by other means. The interaction of the balls 930 to the vees 940 provides kinematic positioning that limits constraint issues. In particular, each ball 930 would sit in a vee 940 which would remove two degrees of freedom at each ball 930, one on each face of the vee 940. As the ball and v-groove features are placed on the underside of the lens housing 905, rather than in the seams 902 between adjacent camera channels, it is easier to limit the seam width (e.g., ≤1 mm).

Figure 15D:
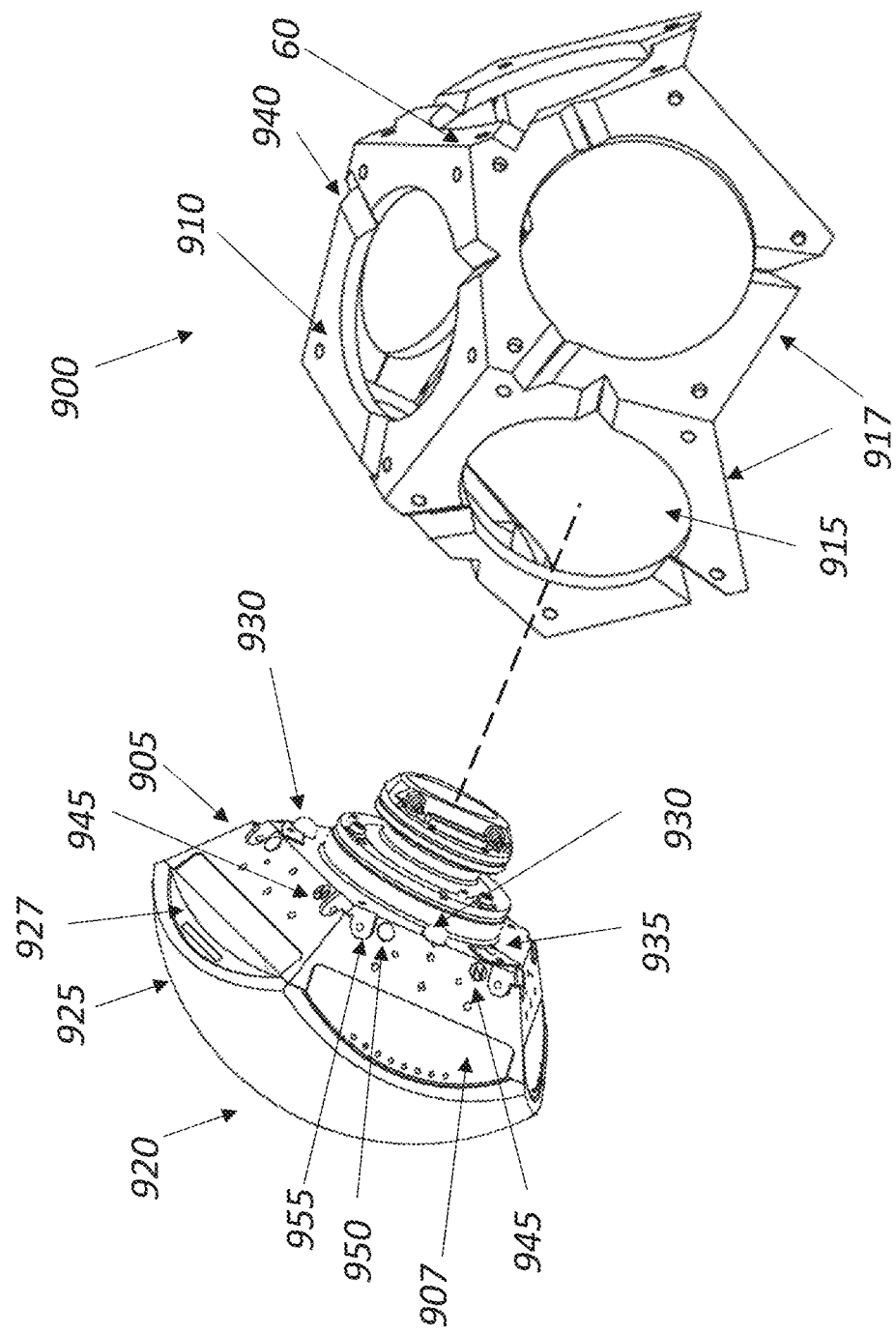
FIG. 15D depicts a second example of the assembly of a camera channel lens housing to a space frame.

FIG. 15D depicts a second example of mounting a camera channel 920 with lens housing 905 to a face 910 or facet of a space frame 900. In this illustration, the example space frame portion can be a one-piece crown structure as is depicted, but it can also be a structure with multiple kinematically attached pieces (e.g., FIG. 12A, FIG. 14A, or FIGS. 13A,B). The camera channel 920 with lens housing 905 shows the protruding shape of an outer compressor lens element 925. The faces 910 of the space frame 900 include three channel vee slots or vees 940 which are used to kinematically align the face to the lens housing 905. The lens housing 905 also has three precision balls 940 that are used to precisely align that assembly to the vees 940 of the adjacent face 910. Three fasteners (not shown), such as bolts or magnets, then provide holding forces to retain the lens housing 905 to the face 910 of the space frame 900.

As an alternative to the balls 930, three pins (not shown), which are attached on the lower sides of the lens channel housing 905, can contact three corresponding vees in a facet 910 of the spaceframe. The pin locations on the lens housing are 120° apart. Each pin is perpendicular to the lower edge of the lens channel on the face where it is placed. Nesting forces could be achieved by placing cantilevered beams directly over each pin. In order to remove an ambiguity of exact location of the pin/vee contact, the vees can have a slight curvature to ensure a point contact. As compared to the balls and vees approach which create point contacts, the pins would provide line contacts that can result in much lower mechanical stress. However, the protruding pins occupy more space, which can be difficult to provide for this application.

In either case, it is also desirable to minimize the range of the forces at the six contacts of a camera channel. This is to ensure positive contact forces on all interfaces without exceeding yield stress values. The design approaches of FIGS. 15A-C can have improved performance relative to other approaches, as the mechanical contacts can be closer to the center of mass, thereby reducing the moment arm.

To ensure the constraint pattern designed between the lens housing 920 and the spaceframe (e.g., 500, 600, 700, or 800) results in exact constraint, the design was evaluated against Maxwell's criteria for exact constraint (Douglass L. Blanding, 1995). In this design example, a lens housing contacts the associated spaceframe polygonal facet using pins, 120° apart, that rest in v-grooves. The lens housing 905 can be bolted to the associated spaceframe polygonal facet, which prevents under constraint between the two.

Over constraint between a lens housing and the associated polygonal facet can also be examined using Maxwell's criteria. These criteria are designed for four constraints as Maxwell does not discuss cases for five or six constraints, but nonetheless can be used to evaluate over-constraint by considering three initial constraints, and ensuring each of the remaining constraints, when added, do not violate Maxwell's criteria. Since all six constraints are sets of three coplanar constraint pairs, no four lie in the same plane and thus the first criterion is satisfied. Furthermore, the maximum number of constraints intersecting at an arbitrary point is two, and thus the second criterion is also satisfied. By inspection, it is clear that no two constraints are parallel, and thus we pass Maxwell's third check. The final criterion states that a fourth constraint must not belong to the same set of generators of a hyperboloid of one sheet as the initial three constraints. Identifying the initial three, skew, constraints as those protruding from the same equivalent face of each vee, it is clear that each of the remaining constraints is not a part of this set, as each of the remaining constraints intersects two of the original skew lines. It must, therefore, sit on the reciprocal generators of the hyperboloid, and thus Maxwell's fourth and final criterion is satisfied. One final remaining check is to ensure that the constraint pattern is insensitive to thermal expansion. To do so, it is observed that each constraint surface is located radially from the origin, which is defined to be the center of the spaceframe face. Since all are located on a radial path, expansion will be the same proportional distance from the origin for all constraints, meaning the center will not change and thus the kinematic coupling is thermally stable.

FIG. 15B then depicts two adjacent lens channel housings 905 (lens elements not shown) mounted to two adjacent faces 910 of the space frame. To enable the intended optical performance, the width or gap of the mechanical seam 902 between adjacent camera channels 920 should be small (e.g., <1 mm), while avoiding interference and being robustly maintained during use. Small geometry changes at the spaceframe level such as changing vee angle, vee dimensions, edge length, pin size, and ball size all have a significant impact on seam width. FIG. 15C then depicts a fully assembled space frame with an array of lens housings 905 assembled to it, to enable an improved panoramic multi-camera capture device 300 (note: lens elements and other components are not shown). During device assembly, one or more of the lens housings 905, or other components, such as the image sensors or datapath or power electronics or cooling hardware will need to be attached. This can be done using a variety of features and tools, including tools with flexible cable extender.

As noted previously, the camera channels can be identically assembled to the space frame using 4-40 bolts that pass-through Belleville washers and a facet of the space frame to attach to a lens housing. However, the order of assembly can be important. For example, the tertiary camera channels can be mounted first while accessing their 4-40 bolts via the secondary channel faces. The secondary camera channels, adjacent to the primary camera channel, can be added next, accessing their 4-40 bolts via the top or primary face while using a flexible drive. The primary or top channel can be added last, accessing its 4-40 bolts via the base plate if the associated mount point can be removed.

It is noted that the balls, vees, and pins should all be surface hardened so as to avoid structural failure. It may be advantageous to conduct a surface hardening process on the steel used to construct the faces of the spaceframe, but due to strict tolerancing requirements and high cost of hardening small, localized areas, it can be more beneficial to design a recess in the faces of the spaceframe, and then attach pre-hardened vees. Such vees are readily available from suppliers such as Bal-tec and could easily be incorporated into a space frame design.

In several of the illustrated embodiments, springs are shown to couple the faces of the space frame together, although other holding mechanisms, including magnets, can be used. In particular, magnets may be used to help hold a space frame together, and/or to hold the lens a housing to a space frame face. As an example, permanent rare earth magnets, part number D32SH from K&J Magnetics of Pipersville, PA, that are 3/16" dia.×1/8" thick, with a pull force or 1-2 lbs., can be used. With an approximate gap between two facing magnets of 0.75 mm, the attracting strength between two magnets can be ~0.5 lbs.

Also, as shown in FIG. 15D, during device assembly, the lens housing 905 will fit into opening 915 with a mounting surface 935 being positioned in close proximity to the outer surface 912 of the face 910, where the precise mounting is determined by the interaction of balls 930 with vees 940. Balls 930 and vees 940 are located at nominally 120 degree spacing. As shown, mounting surface 935 is about midway up the length of the lens housing 905. However, alternately a mounting surface 935 can be provided either closer to the position of the image plane or the image sensor, or closer to the position of the outer compressor lens element 925. As preferred approaches, the mounting surface 935 can be located near the center of mass or the center of gravity of the camera channel.

As is also shown in FIG. 15D, the lens housing 905 of camera channel 920 can include magnets 945, balls 950, and flats 955 on the sidewalls of the lens housings. These features can provide kinematic constraints between adjacent camera channels. In particular, the magnets can be used to assist the kinematic mounting and alignment of a first camera channel to a second adjacent camera channel by providing a loading force. The use of such sidewall magnets (or latches or other mechanisms) can have greater value if the mounting surface 935 is closer to the image plane or is closer to the outer compressor lens, rather than being proximate to the middle of the lens housing (as shown in FIG. 15D) or to the center of mass of the camera channel. In such cases where the mounting points are at or near an extreme mechanical position relative to the length of a camera channel or objective lens assembly, sidewall kinematic features can help prevent a moment arm type rotation or pivot relative to an applied force (including gravity).

In an alternate design where a space frame (900) supports the camera channels from mounting points near the outer polygonal edges of the outer compressor lens elements 925, the width of material between the outer edges of opening 915 and an adjacent edge 917 can impact the width of seams 902 between adjacent camera channels 920. In such cases, where a space frame is provided proximate to the outer compressor lens element, or the compressor lens group, compensating optical and mechanical design changes can be advantageous to reduce the impact on seam width. For example, the outer compressor lens element 925 and the lens housing 905 can be designed to hide the space frame 900 so it does not protrude through the seams and into the outer environment. Optically, this can mean that the outer compressor lens element 925 bends incident light so steeply away from the polygonal lens edges that more space is created for an underlying space frame. As another option to provide room for the space frame, superior design control to limit Front Color (FIG. 5E) to ≤0.5 mm and particularly to ≤0.1 mm can be helpful.

Also, as was suggested in FIG. 2B (see edges 132), the cut or cuts of the polygonal beveled edges 927, or the design of the lens housing 905 and an associated lens holding plate 907 can be modified to provide more room for a space frame (900). Additionally, or alternately, the width between the aforementioned edges (opening 915 to edges 917) of the space frame faces can be thinned so as to reduce an impact on the width of seams 902 between adjacent camera channels. The design of the faces 910 can be less flat, and more 3-dimensional, to provide useful features and improved structural integrity.

As another option, the camera channels can be designed to have additional extended FOV 215 (FIG. 7) so as to optically hide an expanded seam width (902). Depending on the amount of an extended FOV 215 that is added to hide expanded seams 902 and a space frame 900, the optical correction of residual parallax or perspective errors in the lens design can be compromised. Preferably these errors remain sub-pixel, but for some applications, a few pixels of error may be an acceptable trade-off for having a space frame positioned near the outer circumference of the improved multi-camera panoramic capture device (300).

Pre-assembled camera channels can be tested against an alignment fixture to help ensure control over size, shape, and datum features, and adjustments can be made as appropriate. Then when an improved multi-camera panoramic capture device 300 is assembled, the individual camera channels can be held or retained against the associated face of the polygonal space frame using one or more bolts, magnets, or latches, or adhesive(s), or combinations thereof. But in some instances, ready replacement of components or a camera channel, for example, in the instance of a failed sensor, broken lens element, or the like, may be necessary. Such a change can be done in a factory, but enabling field replaceability is desirable. The space frame approach can enable the camera channels to be field replaceable units (FRUs).

As one approach to remove one or more camera channels, the device can be accessed via a polygonal facet through which any data and power cabling passes through the space frame perimeter. If necessary, to access the mounting features, this cabling can be removed. An appropriate tool can be extended into the internal hollow central cavity of the space frame to the attachment points of a camera channel that needs to be removed, whether for replacement or repair, or to aid removal of another camera channel. Given the polygonal geometry, a tool used for this purpose can have a flexible shaft or extension so as to help access the mounting features or mechanisms of the imaging channels that are angled away from the access port facet. Once released, a camera channel can then be extracted or removed by pulling it away from the device center. Datapath and power cabling can then be removed if that has not already occurred. A replacement pre-assembled camera channel can then be attached or mounted in place of one that was removed. If one or more materials or adhesives are being used to seal the seams or gaps between adjacent camera channels, then they will also likely have to be replaced during this process.

In some examples, a support post or stalk would first be detached from a space frame face that is the mounting interface. This allows access to the base plate and the fasteners in the bottom of the primary assembly. Once the post is removed, the fasteners or bolts screws for the primary channel can be accessible. Thereafter, the fasteners for the tertiary channels may be the next most accessible. Lastly the screws to the secondary assemblies are accessible. The space frame does not need to be disassembled, and the lens housing assemblies have kinematic balls so replacement with a new camera channels assembly would be possible to exacting tolerances. In some examples, the camera channels, including lens housings and lens assemblies are nominally identical. Thus, only one part number is needed for assembly, storage and/or replacement.

It is noted that when replacing an image sensor assembly of a camera channel, the corresponding circuit board may also need to be changed, as they are typically matched sets. Also, in cases in which the device has other than a dodecahedral geometry, and has more camera channels, the size and number space frame faces and camera channels can complicate an assembly or repair activity. In particular, the available space to access components and the number of components, may be complicating. Alternately, or in addition, for some device designs, a retention or locking mechanism, such as a latch, can be located within a seam between the imaging channels. In this case, a tool can be inserted into a seam to release a retention mechanism.

In other instances, a face of a space frame may be damaged and need to be replaced. It can be expected that the associated camera channel, whether damaged or not, would first be removed. However, it may be necessary to first remove multiple camera channels. The holding mechanisms at the attached kinematic elements, whether springs, magnets, adhesives, or other mechanisms, would then be relaxed to release the face and to enable a replacement to be installed.

Although the illustrated space frame examples all show a dodecahedron, other overall shapes also are contemplated. For instance, the space frame may be constructed to form other three-dimensional shapes, including but not limited to other polyhedral shapes (including geodesic and Goldberg polyhedrons). Moreover, although the examples are generally directed to structures providing 360-degree fields of view, in other systems, a space frame may support different arrangements. For example, without limitation, a space frame can support multiple camera channels in a hemispherical, quarter sphere, annular, or other shape.

In the prior examples, the lens housings and/or the space frame parts (e.g., the polygonal faces) can be formed using machined metals or cast and machined metals like stainless steel. In other examples, other materials may be used. Some of these alternate materials include plastics, including engineered or composite materials. For example, fiber-reinforced plastic (FRP) is a composite material made of a polymer matrix reinforced with fibers. The fibers are usually glass (in fiberglass), carbon (in carbon fiber reinforced polymer), aramid, or basalt. The polymer is usually an epoxy, vinyl ester, or polyester thermosetting plastic. Composite plastics refers to those types of plastics that result from bonding two or more homogeneous materials with different material properties to derive a final product with certain desired material and mechanical properties. Fiber-reinforced plastics are a category of composite plastics that specifically use fiber materials to mechanically enhance the strength and elasticity of plastics. The glass fibers are extruded and drawn from materials including $SiO_2$, $Al_2O_3$, $B_2O_3$, $CaO$, or $MgO$, and then formed or woven into mats that are then imbedded in polymer during molding. Specifying the orientation of reinforcing fibers can increase the strength and resistance to deformation of the polymer. Glass reinforced polymers are strongest and most resistive to deforming forces when the polymers fibers are parallel to the force being exerted, and are weakest when the fibers are perpendicular. In some cast resin components made of glass reinforced polymers, the orientation of fibers can be oriented in two-dimensional and three-dimensional weaves. This means that when forces are possibly perpendicular to one orientation, they are parallel to another orientation; this eliminates the potential for weak spots in the polymer. Fiber-reinforced plastics are best suited for any design program that demands weight savings, precision engineering, definite tolerances, and the simplification of parts in both production and operation. A molded polymer product is cheaper, faster, and easier to manufacture than a cast aluminum or steel product, and can be machined post molding, while maintaining similar and sometimes better tolerances and material strengths.

In some examples, a lens housing or a space frame facet can be molded from a fiber-reinforced plastic. Although the CTE of glass fiber reinforced plastics varies with fiber direction, parallel or perpendicular (e.g., $15\text{-}55\times10^{-6}/°$ C.)., the values generally span the range between those of glass to those of optical plastics. A lens housing molded with cross woven fibers can advantageously have a CTE that is an average between that of optical glasses and plastics, thereby aiding thermal stability of the lens element positioning therein.

Still further examples may include fabricating die cast metal lens housings or polygonal space frame facets using zinc-based alloys. Zinc die casting provides thin walls and excellent surface smoothness. The zinc alloys advantageously have a CTE relatively between that of most optical glasses and most optical plastics, and thus it can readily enable thermal stability of an imaging lens assembly. Die cast zinc alloy parts can be machined post casting, but typically very little machining is required on precision zinc die castings because of the accuracy that can be obtained, which is ~5× better than that obtained with molded fiberglass parts. Also, in other examples, materials may vary from part-to-part. For example, some faces of a space frame can consist of one type of material, while other faces consist of a second material.

In examples of this disclosure, a polygonal space frame has been developed as an engineered kinematic structure to provide both precise, robust mounting support for an array of camera channels, to enable improved multi-camera panoramic capture devices (300). The space frame provides a useful hollow central volume that can be advantageously used by imaging hardware (e,g., power and datapath cables) or as a pass through for relayed image light. As another alternative, the supported cameras 320 can act as objective lenses that provide light to fiber optic relays rather than lens system based imaging relays (e.g., FIG. 9). In such a system, the fiber optic relays can be using optical fiber bundles that transfer image light from the respective image planes provided by the objective lenses to a sensor. For image transfer, coherent optical fiber bundles can be used to relay the image light to an image sensor without free space optics. Each camera channel can have an associated image sensor, or several coherent fiber optic bundles can be directed to a single image sensor.

This type of engineered kinematic space frame may have other optical applications or configurations. For example, it can be used to support an array of cameras that look inwards into the hollow center, rather than outwards. It can also support other optical devices, such as light sources, lasers, or sensors, that are directed either inwards or outwards. As another example, a kinematic space frame can support an array of light projection channels instead of camera channels. As an enablement, the image sensors can be replaced by addressable light source array devices that have light emitting pixels. For example, these devices can be micro-LED arrays, organic LED arrays (OLEDs), or laser arrays. Alternately, the image sensors can be replaced by optical modulator arrays (e.g., LCOS or DLP/DMDs) and illuminating light can be provided by one or more separate light sources. Notably, these space frames can be used to enable improved multi-lens system devices, whether for image capture, image projection, or other optical purposes, in which the optical designs of the lens systems have not been optimized for parallax or perspective correction. This type of projection device can be used in simulators, planetariums, or other domed theatres. Also in examples, the space frame with mounted lenses may be contained inside a concentric dome or a faceted dome. Without limitation, the dome may provide optical properties as well as a casing or covering for the lens elements mounted to the frame.

This type of engineered kinematic space frame may have other non-optical applications or configurations. For example, polygonal space frames have also been used for interactive children's toys. However, space frames are more commonly used in architectural engineering to build lattice work roofing supports or geodesic domes. Typically, a geodesic dome is a hemispherical or spherical thin-shell structure (lattice-shell) that have a polyhedral shape based on a geodesic polyhedron. Engineering emphasis is often directed at node structures that mount at the truss joints. Domes can have a steel framework with the struts having flattened ends and a single bolt secures a vertex of struts. Domes can also be constructed with a lightweight aluminum framework which can either be bolted or welded together or can be connected with a more flexible nodal point/hub connection. The triangular elements of the dome are structurally rigid and distribute the structural stress throughout the structure, making geodesic domes able to withstand very heavy loads for their size.

Geodesic domes can have a system of cables that help hold the structure together. As such, they are referred to as tensile integrity or tensegrity structures, and they are comprised of elements that are under simple tension or compression. Although a subset of these structures may represent or appear as exactly constrained structures, in actuality they may not be statically determinate structures. Whereas exactly constrained structures are always statically determinate. Additionally, tensegrity structures may not necessarily be precision structures that can maintain tight tolerances such as those that are required for most optical applications.

The engineered kinematic space frames of the present invention may have non-optical applications that include architectural applications. For example, although many skyscrapers are designed to be earthquake resistant, including by providing a compliant frame or foundation, a building designed and assembled using the types of kinematic space frames of the present invention may have improved resistance to earthquakes, wind, or other directional forces. As an architectural structure, a space frame may robustly and precisely hold a piece of equipment in a pre-determined position. Alternately, the present approaches for engineered kinematic space frames may enable robust, easy to assemble, emergency shelters (e.g., similar to, but different than the structures by Shigeru Ban). A roof or covering can be provided over the outside of the space frame.

What is claimed is:

1. An imaging device comprising:
   a frame comprising:
   a first polygonal face having a plurality of first edges defining a first periphery,
   a second polygonal face having a plurality of second edges defining a second periphery, and
   one or more kinematic elements coupling a first edge of the plurality of first edges to a first edge of the plurality of second edges;
   a first camera coupled to the first polygonal face and having a first lens, the first lens having a plurality of first lens sides defining a first lens periphery; and
   a second camera coupled to the second polygonal face and having a second lens, the second lens having a plurality of second lens sides defining a second lens periphery, a first lens side of the first lens sides contacting a second lens side of the second lens sides.

2. The imaging device of claim 1, the frame further comprising:
   a third polygonal face having a plurality of third edges defining a third periphery; and
   additional kinematic elements coupling a first edge of the plurality of third edges to a second edge of the plurality of first edges and coupling a second edge of the plurality of third edges to a second edge of the plurality of second edges, the imaging device further comprising:
   a third camera coupled to the third polygonal face.

3. The imaging device of claim 2, the frame further comprising:
   additional polygonal faces coupled to at least one of the first polygonal face, the second polygonal face, or the third polygonal face, to form a kinematic space frame, the imaging device further comprising:
   additional cameras coupled to the additional polygonal faces, the first camera, the second camera, the third camera, and the additional cameras configured to provide substantially adjacent fields of view.

4. The imaging device of claim 1, wherein the one or more kinematic elements comprise a first kinematic element and a second kinematic element, wherein the first kinematic element couples the second polygonal face to the first polygonal face about three degrees of freedom and the second kinematic element fixes the second polygonal face to the first polygonal face about two degrees of freedom.

5. The imaging device of claim 1, wherein the one or more kinematic elements comprise a cylindrical pin having a longitudinal axis extending generally parallel to the first edge of the plurality of first edges and the first edge of the plurality of second edges, an outer surface of the cylindrical pin contacting a first datum surface on the first edge and a second datum surface on the second edge;
- a first spring coupled to the first polygonal face and to the cylindrical pin; and
- a second spring coupled to the second polygonal face and to the cylindrical pin.

6. The imaging device of claim 1, wherein the first periphery nominally matches the first lens periphery and the second periphery nominally matches the second lens periphery.

7. The imaging device of claim 1, wherein a kinematic element of the one or more kinematic elements comprises a first portion secured to one of the first polygonal face or the second polygonal face and a second portion secured to the other of the first polygonal face or the second polygonal face, the first portion comprising a ball and the second portion comprising at least one of a flat, a vee-groove, or a trihedral socket contacted by the ball.

8. The imaging device of claim 1, wherein the one or more kinematic elements comprise a cylindrical pin and offset vees.

9. The imaging device of claim 1, further comprising magnets or springs associated with the one or more kinematic elements to provide holding forces.

10. The imaging device of claim 1, further comprising a ball disposed along a first edge of the first lens periphery and at least one of a flat or a vee disposed along a second edge of the second lens periphery, the ball contacting the at least one of the flat or the vee to maintain a seam between the first lens and the second lens.

11. The imaging device of claim 1, wherein at least one of the first camera is coupled to the first face or the second camera is coupled to the second face using at least one of magnets, vee groves, flats, and alignment balls.

12. The imaging device of claim 1, wherein the first camera is positioned relative to the second camera such that a first low-parallax volume associated with the first camera at least partially overlaps a second low-parallax volume associated with the second camera.

13. The imaging device of claim 1, wherein the frame defines a hollow center.

14. The imaging device of claim 13, further comprising:
- a relay optical system extending at least partially into the hollow center and through an opening in a face of the frame opposite the first face.

15. A frame for an imaging device comprising:
- a first polygonal face having a plurality of first edges defining a first periphery,
- a second polygonal face having a plurality of second edges defining a second periphery, and
- one or more kinematic elements coupling a first edge of the plurality of first edges to a first edge of the plurality of second edges.

16. The fame of claim 15, wherein a kinematic element of the one or more kinematic elements comprises
- a cylindrical pin having a longitudinal axis extending generally parallel to the first edge and the second edge, an outer surface of the cylindrical pin contacting a first datum surface on the first edge of the plurality of first edges and contacting a second datum surface on the first edge of the plurality of second edges;
- a first spring coupled to the first polygonal face and to the cylindrical pin; and
- a second spring coupled to the second polygonal face and to the cylindrical pin.

17. The frame of claim 15, further comprising:
- a third polygonal face having a plurality of third edges defining a third periphery; and
- additional kinematic elements coupling a first edge of the plurality of third edges to a second edge of the plurality of first edges and coupling a second edge of the plurality of third edges to a second edge of the plurality of second edges.

18. The frame of claim 17, further comprising:
- additional polygonal faces coupled to at least one of the first polygonal face, the second polygonal face, or the third polygonal face, to form a rigid kinematic space frame.

19. The frame of claim 15, wherein the one or more kinematic elements comprise a first kinematic element and a second kinematic element, wherein the first kinematic element couples the second polygonal face to the first polygonal face about three degrees of freedom and the second kinematic element fixes the second polygonal face to the first polygonal face about two degrees of freedom.

20. The frame of claim 15, further comprising one or more magnets or springs associated with the one or more kinematic elements to provide holding forces.

* * * * *